US012792151B2

(12) United States Patent
Sohn et al.

(10) Patent No.: US 12,792,151 B2
(45) Date of Patent: Nov. 10, 2026

(54) VIBRATION APPARATUS, DISPLAY APPARATUS INCLUDING THE SAME, AND VEHICULAR APPARATUS INCLUDING THE VIBRATION APPARATUS

(71) Applicant: LG Display Co., Ltd., Seoul (KR)

(72) Inventors: MinHo Sohn, Paju-si (KR); Seunghyeon Kim, Paju-si (KR); Saseong Moon, Paju-si (KR); Sunbok Song, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 219 days.

(21) Appl. No.: 18/422,672

(22) Filed: Jan. 25, 2024

(65) Prior Publication Data

US 2024/0264676 A1 Aug. 8, 2024

(30) Foreign Application Priority Data

Jan. 30, 2023 (KR) ........................ 10-2023-0012116
Dec. 13, 2023 (KR) ........................ 10-2023-0180285

(51) Int. Cl.

| | |
|---|---|
| ***G06F 3/01*** | (2006.01) |
| ***B60K 37/20*** | (2024.01) |
| ***G06F 3/041*** | (2006.01) |
| ***G06F 3/16*** | (2006.01) |

(52) U.S. Cl.

CPC .............. *G06F 3/016* (2013.01); *B60K 37/20* (2024.01); *G06F 3/0412* (2013.01); *G06F 3/16* (2013.01); *B60K 2360/1434* (2024.01)

(58) Field of Classification Search

CPC .......... G06F 3/016; G06F 3/0412; G06F 3/16; B60K 37/20; B60K 2360/1434
See application file for complete search history.

(56) References Cited

U.S. PATENT DOCUMENTS

| | | | | |
|---|---|---|---|---|
| 11,601,738 | B2 * | 3/2023 | Jang | G06F 3/016 |
| 11,849,281 | B2 * | 12/2023 | Kim | H04R 7/04 |
| 12,393,276 | B2 * | 8/2025 | Moon | G06F 3/1423 |
| 2013/0069863 | A1 * | 3/2013 | Lee | G06F 3/016 345/156 |

(Continued)

FOREIGN PATENT DOCUMENTS

| | | | | |
|---|---|---|---|---|
| KR | 101664257 B1 | * 10/2016 | | G06F 3/016 |
| WO | WO-2012111352 A1 | * 8/2012 | | G06F 3/016 |

OTHER PUBLICATIONS

Moreno, et al., "Design and Construction of a Bolt-Clamped Langevin Transducer", 2nd International Conference on Electrical and Electronics Engineering (ICEEE) and XI Conference on Electrical Engineering (CIE 2005), IEEE Catalog. No. 05EX1097, ISBN: 0-7803-9230-2, Mexico, Sep. 7-9, 2005, 3 pages.

*Primary Examiner* — Rufus C Point
(74) *Attorney, Agent, or Firm* — Morgan, Lewis & Bockius LLP

(57) ABSTRACT

A vibration apparatus according to an aspect of the present disclosure includes a vibration generating part, and a vibration transfer part coupled to the vibration generating part, the vibration transfer part including a plurality of vibration transfer members spaced apart from one another. Each of the plurality of vibration transfer members is configured to convert an in-plane vibration mode of the vibration generating part into an out-plane vibration mode.

42 Claims, 20 Drawing Sheets

(56) References Cited

U.S. PATENT DOCUMENTS

| | | | | |
|---|---|---|---|---|
| 2015/0355714 | A1* | 12/2015 | Colgate | G06F 3/041<br>345/173 |
| 2020/0209973 | A1* | 7/2020 | Kim | B06B 1/0688 |
| 2021/0026590 | A1* | 1/2021 | Nam | B60K 35/22 |

* cited by examiner

ITM: DIS2, DIS3, DIS4, DIS5

VIBRATION APPARATUS, DISPLAY APPARATUS INCLUDING THE SAME, AND VEHICULAR APPARATUS INCLUDING THE VIBRATION APPARATUS

CROSS-REFERENCE TO RELATED APPLICATIONS

This application claims the benefit of and priority to Korean Patent Application No. 10-2023-0012116, filed on Jan. 30, 2023, and No. 10-2023-0180285 filed on Dec. 13, 2023, the entirety of each which is incorporated herein by reference for all purposes as if fully set forth herein.

BACKGROUND

Technical Field

The present disclosure relates to a vibration apparatus, a display apparatus including the same, and a vehicular apparatus including the vibration apparatus.

Discussion of the Related Art

As information-oriented society advances, the needs for display apparatuses for displaying an image are variously increasing.

Electronic devices using a display apparatus as a display screen provide a user interface of a touch screen type, for convenience of a user input. Display apparatuses capable of touch interface processing are advancing to provide more various functions.

Display apparatuses including a touch panel or display apparatuses with touch screen integrated therein, which are capable of touch sensing based on a touch pen (e.g., a stylus pen) as well as finger touch sensing based on a finger, are being widely used.

Recently, haptic technology, which provides a haptic feedback to a user when the user touches a screen of a display apparatus, is being developed. Display apparatuses to which the haptic technology is applied generate an attractive force for stimulating a tangoreceptor of a human body, and stimulate a tactile sense of a user by using the attractive force, thereby enabling the user to recognize a touch and a texture of the touch.

SUMMARY

The inventors of the present disclosure have recognized the issues and disadvantages of the related art and have performed extensive research and experiments for implementing a vibration apparatus and an apparatus including the same, which may provide an ultrasonic vibration or an ultrasonic haptic to a user when a user touch is applied thereto. Based on the extensive research and experiments, the inventors of the present disclosure have invented a new vibration apparatus, a display apparatus including the same, and a vehicular apparatus including the vibration apparatus, which may provide an ultrasonic vibration or an ultrasonic haptic to a user.

Accordingly, embodiments of the present disclosure are directed to a vibration apparatus, a display apparatus including the same, and a vehicular apparatus including the vibration apparatus that substantially obviates one or more of the problems due to limitations and disadvantages of the related art.

One or more aspects of the present disclosure are directed to providing a vibration apparatus, a display apparatus including the same, and a vehicular apparatus including the vibration apparatus, which may increase an intensity of an ultrasonic generated based on a vibration of a display member.

One or more aspects of the present disclosure are directed to providing a vibration apparatus, a display apparatus including the same, and a vehicular apparatus including the display apparatus, which may generate an out-plane vibration mode.

One or more aspects of the present disclosure is directed to providing a vibration apparatus, a display apparatus including the same, and a vehicular apparatus including the vibration apparatus, which may vibrate a display member in an out-plane vibration mode to provide an ultrasonic vibration or an ultrasonic haptic to a user.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a vibration apparatus may comprise a vibration generating part, and a vibration transfer part coupled to the vibration generating part, the vibration transfer part including a plurality of vibration transfer members spaced apart from one another. Each of the plurality of vibration transfer members may be configured to convert an in-plane vibration mode of the vibration generating part into an out-plane vibration mode.

In another aspect, a display apparatus may comprise a display member configured to display an image, one or more vibration generating apparatuses configured to vibrate the display member, and a connection member between the display member and the one or more vibration generating apparatuses. The one or more vibration generating apparatuses may comprise a vibration generating part, and a vibration transfer part coupled to the vibration generating part, the vibration transfer part including a plurality of vibration transfer members spaced apart from one another. Each of the plurality of vibration transfer members may be configured to convert an in-plane vibration mode of the vibration generating part into an out-plane vibration mode.

In another aspect, a vehicular apparatus may comprise an instrument panel module in a dashboard, the instrument panel module including a first display, a driver seat, a passenger seat, and an infotainment module in one or more of the dashboard, the driver seat, and the passenger seat, the infotainment module including one or more second displays. The one or more of the first display and the one or more second displays may comprise a display member configured to display an image, one or more vibration generating apparatuses configured to vibrate the display member, and a connection member between the display member and the one or more vibration generating apparatuses. The one or more vibration generating apparatuses may comprise a vibration generating part, and a vibration transfer part coupled to the vibration generating part, the vibration transfer part including a plurality of vibration transfer members spaced apart from one another. Each of the plurality of vibration transfer members may be configured to convert an in-plane vibration mode of the vibration generating part into an out-plane vibration mode.

A vibration apparatus according to one or more aspects of the present disclosure may generate an out-plane vibration mode.

An apparatus and a vehicular apparatus each including a vibration apparatus according to one or more aspects of the present disclosure may vibrate a display member in an out-plane vibration mode of the vibration apparatus to provide an ultrasonic vibration or an ultrasonic haptic to a user.

According to one or more aspects of the present disclosure, by using a base member and a vibration transfer member of a vibration transfer part, an in-plane vibration mode based on a vibration of a vibration generating part may be converted into an out-plane vibration mode to vibrate a display member, and thus, an ultrasonic vibration or an ultrasonic haptic may be provided to a user.

According to one or more aspects of the present disclosure, the base member and the vibration transfer member of the vibration transfer part may include different materials, and thus, a squeeze film effect generated based on a vibration of the display member may be maximized or optimized, thereby enhancing the recognition of a user on a virtual texture and/or an ultrasonic vibration or an ultrasonic haptic.

According to one or more aspects of the present disclosure, a frequency of an ultrasonic haptic or an ultrasonic vibration may be optimized or maximized to correspond to a resonance frequency of a vibration object, based on a material, size, and/or a thickness of the base member configuring the vibration transfer part and/or a material, a height, and a width of the vibration transfer member.

According to one or more aspects of the present disclosure, a connection process (or attachment process) and connection quality (or attachment performance) between a display member and a vibration apparatus may be improved.

According to one or more aspects of the present disclosure, as a signal supply member and a vibration apparatus are provided as one body, the signal supply member and the vibration apparatus may be configured as one part (or one component), and thus, an effect of uni-materialization may be obtained.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this disclosure, illustrate example embodiments of the disclosure and together with the description serve to explain principles of the disclosure.

Figure 1:
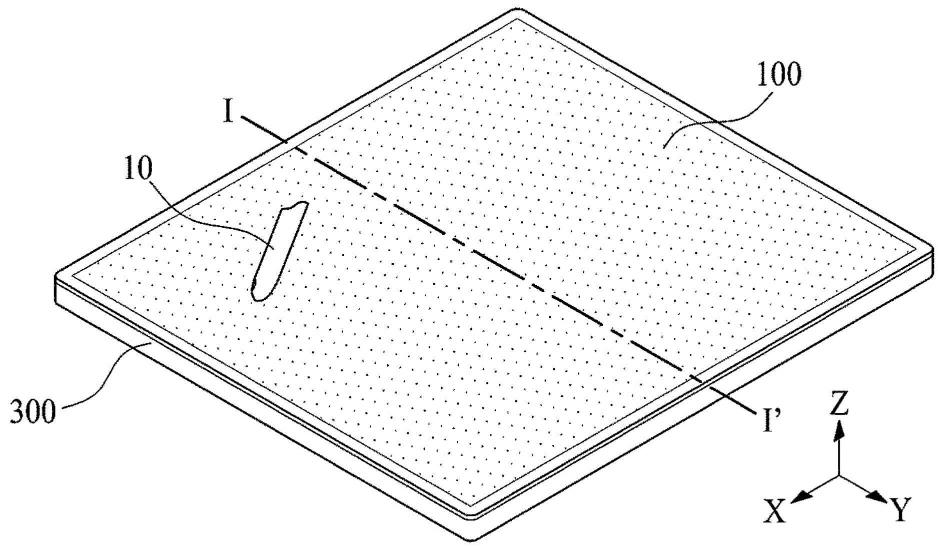
FIG. 1 is a perspective view illustrating a display apparatus according to an aspect of the present disclosure.

Throughout the drawings and the detailed description, unless otherwise described, the same drawing reference numerals should be understood to refer to the same elements, features, or structures. The sizes, lengths, and thicknesses of layers, regions and elements, and depiction thereof may be exaggerated for clarity, illustration, and/or convenience.

DETAILED DESCRIPTION

Reference is now made in detail to aspects of the present disclosure, examples of which may be illustrated in the accompanying drawings. In the following description, when a detailed description of well-known functions, structures or configurations may unnecessarily obscure aspects of the present disclosure, a detailed description of such known functions or configurations may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the aspects described with reference to the accompanying drawings. The present disclosure may, however, be embodied in different forms and should not be construed as limited to the example aspects set forth herein. Rather, these example aspects are examples and are provided so that this disclosure may be thorough and complete to assist those skilled in the art to understand the inventive concepts without limiting the protected scope of the present disclosure.

Shapes (e.g., sizes, lengths, widths, heights, thicknesses, locations, radii, diameters, and areas), dimensions, ratios, angles, numbers, and the like disclosed herein, including those illustrated in the drawings, are merely examples, and thus, the present disclosure is not limited to the illustrated details. Any implementation described herein as an "example" is not necessarily to be construed as preferred or advantageous over other implementations. It is, however, noted that the relative dimensions of the components illustrated in the drawings are part of the present disclosure.

Where a term like "comprise," "have," "include," "contain," "constitute," "made of," "formed of," or the like is used with respect to one or more elements, one or more other elements may be added unless a term such as "only" or the like is used. The terms used in the present disclosure are merely used in order to describe example aspects, and are not intended to limit the scope of the present disclosure. The terms of a singular form may include plural forms unless the context clearly indicates otherwise.

The word "exemplary" is used to mean serving as an example or illustration, unless otherwise specified. Aspects are example aspects. Aspects are example aspects. "Aspects," "examples," and the like should not be construed as preferred or advantageous over other implementations. An aspect, an example, an example aspect, an aspect, or the like may refer to one or more aspects, one or more examples, one or more example aspects, or the like, unless stated otherwise. Further, the term "may" encompasses all the meanings of the term "can."

In one or more aspects, unless explicitly stated otherwise, element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship between two parts (e.g., layers, films, regions, components, sections, or the like), for example, using "on," "upon," "on top of," "over," "under," "above," "below," "beneath," "near," "close to," "adjacent to," "beside," "next to," "at or on a side of," or the like, one or more other parts may be located between the two parts unless a more limiting term, such as "immediate(ly)," "direct(ly)," or "close(ly)," is used. For example, where a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

The terms, such as "below," "lower," "above," "upper" and the like, may be used herein to describe a relationship between element(s) as illustrated in the drawings. It will be understood that the terms are spatially relative and based on the orientation depicted in the drawings.

It is understood that, although the terms "first," "second," or the like may be used herein to describe various elements (e.g., layers, films, regions, components, sections, or the like), these elements should not be limited by these terms, for example, to any particular order, precedence, or number of elements. These terms are used only to distinguish one element from another. For example, a first element could be termed a second element, and, similarly, a second element could be termed a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is described as "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phrase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phrase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms may mean a wider range of lines or directions within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, and a third item", may represent (i) a combination of items provided by two or more of the first item, the second item, and the third item or (ii) only one of the first item, the second item, or the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any of A, B, and C (e.g., A, B, or C); or some combinations of A, B, and C (e.g., A and B; A and C; or B and C); and all of A, B, and C. Furthermore, an expression "A/B" may be understood as A and/or B. For example, an expression "A/B" can refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as different from one another. In another example, an expression "different from one another" may be understood as different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various aspects of the present disclosure may be partially or entirely coupled to or combined with each other, may be technically associated with each other, and may be operated, linked, or driven together in various ways. Aspects of the present disclosure may be implemented or carried out independently from each other, or may be implemented or carried out together in a co-dependent or related relationship. In one or more aspects, the components of each apparatus according to various aspects of the present disclosure may be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example aspects.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

X-axis direction", "Y-axis direction" and "Z-axis direction" should not be construed by a geometric relation only of a mutual vertical relation and may have broader directionality within the range that elements of the present disclosure may act functionally.

In the present disclosure, "a display apparatus" may include a display apparatus such as display modules (or display members) including a display panel and a driver for driving the display panel. Moreover, the display modules may include a set device (or a set apparatus) or a set electronic device such as a notebook computer, a TV, a computer monitor, an equipment apparatus including an automotive apparatus or another type of apparatus for vehicles, or a mobile electronic device such as a smartphone or an electronic pad, which is a complete product (or a final product) including display modules such as a liquid crystal display module and a light emitting display module (for example, a quantum dot light emitting display module, an organic light emitting display module) or the like.

Therefore, in the present disclosure, examples of the apparatus may include a display apparatus itself, such as a liquid crystal display module or an organic light emitting display module, or the like, and a set device which is a final consumer device or an application product including the liquid crystal display module or the organic light emitting display module, or the like.

A display panel applied to one or more aspects of the present disclosure may use any types of display panels such as a liquid crystal display panel, an organic light emitting display panel, a micro light emitting diode display panel, a quantum dot light emitting display module, or the like, but aspects of the present disclosure are not limited. For example, the display panel may be a display panel capable of generating (or outputting) one or more of a sound and a vibration by being vibrated by a vibration apparatus according to an aspect of the present disclosure. A display panel applied to a display apparatus according to an aspect of the present disclosure is not limited a shape or a size of the display panel. For example, a shape of the display panel may include rectangle, square, circle, oval, polygon, etc, and a size of the display panel may include a large-scale display panel, a small-scale display panel, a mini display panel etc., without limited thereto.

According to one or more aspects of the present disclosure, when the display panel is the liquid crystal display panel, the liquid crystal display panel may include a plurality of gate lines, a plurality of data lines, and a plurality of pixels respectively provided in the intersection area of the gate lines and the data lines. Moreover, the liquid crystal display panel may be configured to include a first substrate including a thin film transistor (TFT) which is a switching element for adjusting a light transmittance of each of the plurality of pixels, a second substrate including a color filter and/or a black matrix or the like, and a liquid crystal layer between the first substrate and the second substrate.

According to another aspect of the present disclosure, when the display panel is the organic light emitting display panel, the organic light emitting display panel may include a plurality of gate lines, a plurality of data lines, and a plurality of pixels respectively provided in the intersection area of the gate lines and the data lines. Moreover, the organic light emitting display panel may include a substrate including a TFT which is an element for selectively applying a voltage to each of the plurality of pixels, an organic light emitting device layer on the substrate, and an encapsulation layer (or an encapsulation substrate) disposed at the substrate to cover the organic light emitting device layer, or the like. The encapsulation substrate may protect the TFT and the organic light emitting device layer or the like from an external impact such as an external force applied to the display apparatus when it is dropped or by a user and may prevent or reduce foreign matters such as moisture or oxygen from penetrating into the organic light emitting device layer. Furthermore, the organic light emitting device layer may further include an inorganic light emitting layer (for example, a nano-sized material layer and/or a quantum dot light emitting layer, or the like). As another aspect of the present disclosure, the organic light emitting device layer may be changed to a micro light emitting diode or a mini light emitting diode.

In the present disclosure, a display apparatus including a vibration apparatus may be applied to vehicles by being implemented as a user interface apparatus, such as a central control panel or the like in automobiles. For example, the user interface apparatus for vehicles may be configured between two front seats or other locations at the front of the vehicle so that a sound generated based on a vibration of the display module may be transmitted to interior of a vehicle. Therefore, an audio experience within a vehicle may be improved in comparison with a case where speakers are disposed at interior sides of the vehicle. Further, all the components of each vibration apparatus and each display apparatus having the vibration apparatus according to all exemplary aspects of the present disclosure are operatively coupled and configured.

In the following description, various example aspects of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, aspects of the present disclosure are not limited to a scale, dimension, size, and thickness illustrated in the drawings.

Figure 2:
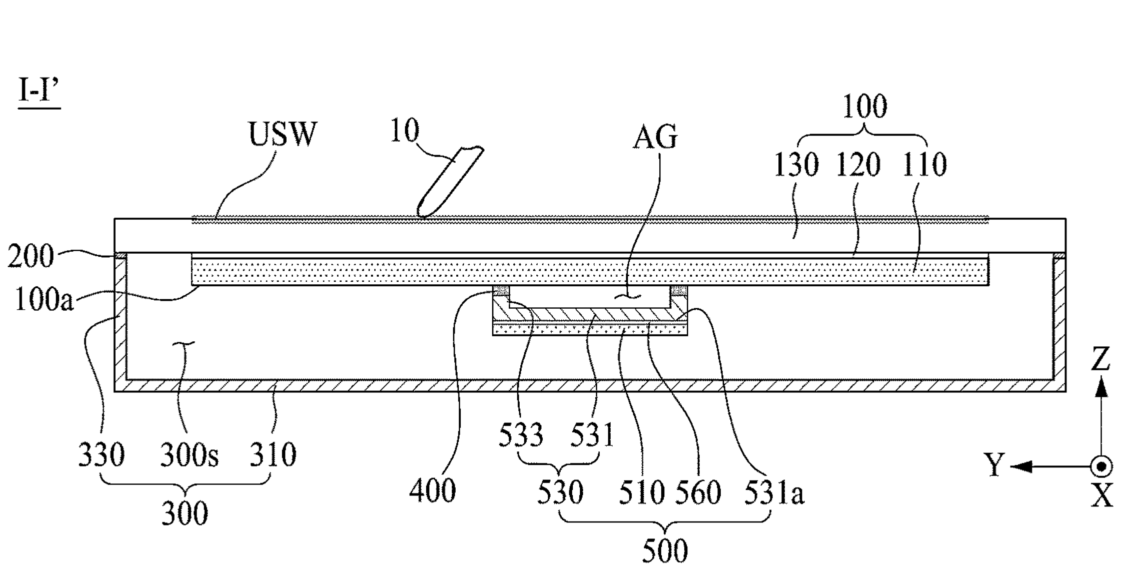
FIG. 2 is a cross-sectional view of a display apparatus taken along line I-I' illustrated in FIG. 1 according to an aspect of the present disclosure.

FIG. 1 is a perspective view illustrating a display apparatus according to an aspect of the present disclosure. FIG. 2 is a cross-sectional view of a display apparatus taken along line I-I' illustrated in FIG. 1 according to an aspect of the present disclosure.

With reference to FIGS. 1 and 2, a display apparatus according to an aspect (or a first aspect) of the present disclosure may be configured to sense one or more of a finger touch based on a finger 10 and a touch based on a touch pen (e.g., a stylus pen). For example, the display apparatus according to an aspect of the present disclosure may be a display apparatus added a touch panel or a display apparatus with touch screen integrated therein. For example, the display apparatus according to an aspect of the present disclosure may be used as a display apparatus for mobile electronic devices such as mobile phones, smartphones, smart glasses, smart watches, tablet personal computers (PCs), or watch phones, smart televisions, electronic whiteboards, bidirectional information transfer transparent displays, bidirectional digital signage, netbook computers, laptop computers, washing machines, monitors, or refrigerators, or the like, but aspects of the present disclosure are not limited thereto.

The display apparatus according to an aspect of the present disclosure may include a display member 100 and a vibration apparatus 500.

The display member 100 may be configured to display an image and output (or generate) an ultrasonic vibration or an ultrasonic haptic, based on a vibration of the vibration apparatus 500. For example, the display member 100 may be used as a vibration plate of the vibration apparatus 500.

The display member 100 may include a display panel 110 and a touch panel 120.

The display panel 110 may be configured to display an image. For example, the display panel 110 may include a plurality of pixels configured to display an image. The image may include an electronic image, a digital image, a still image, or a video image or the like. For example, the display panel 110 may be an organic light emitting display panel including a plurality of pixels which implement a black/white or color image, but a type of display panel is not limited thereto. For example, the display panel 110 may include a liquid crystal display panel, an electrophoresis display panel, a micro light emitting diode display panel, a mini light emitting diode display panel, an electro-wetting display panel, an inorganic light emitting display panel such as a nano-sized material layer and/or a quantum dot light emitting display panel or the like. Hereinafter, an example where the display panel 110 is an organic light emitting display panel will be described, but aspects of the present disclosure are not limited thereto.

The organic light emitting display panel may include a base substrate, a display part, and a plate member, without limited thereto.

The base substrate may be configured as including one or more of a glass material and a plastic material. The plastic material may be configured as polycarbonate (PC), polyethylene terephthalate (PET), polyarylate (PAR), polyethylene naphthalate (PEN), polysulfone (PSF), polyethersulfone (PES), or cyclo-olefin copolymer (COC), or the like, without limited thereto. The display part may include a pixel array part having a plurality of pixels which is disposed respectively at a pixel area provided by a plurality of gate lines and/or a plurality of data lines. Each of the plurality of pixels may include an organic light emitting layer. The plate member may be configured to cover the display part. The plate member may be attached to the display part by an adhesive member. The plate member may protect the display part or the display panel from an external impact such as an external force applied to the display apparatus when it is dropped or by a user and may prevent or reduce foreign matters such as moisture or oxygen from penetrating into the organic light emitting layer or the organic light emitting device layer.

The display panel 110 according to an aspect of the present disclosure may further include an encapsulation layer. The encapsulation layer may be configured between the display part and the adhesive member to directly surround the display part. The encapsulation layer may be configured to prevent or reduce foreign matters such as moisture or oxygen from penetrating into the organic light emitting layer or the organic light emitting device layer. The encapsulation layer may be formed in an inorganic material layer or an organic material layer, or may be formed in a multi-layer structure where an inorganic material layer and an organic material layer are alternately stacked, but aspects of the present disclosure are not limited thereto. For example, the encapsulation layer may be omitted based on a structure of the display panel 110.

The touch panel (or a touch screen) 120 may be configured to sense a user touch applied to the display member 100. For example, the touch panel 120 may be configured to sense a user touch based on a touch pen (e.g., a stylus pen)

or a finger 10. The touch panel 120 may be coupled, connected, or integrated with the display panel 110. For example, the display panel 110 may be an organic light emitting display panel with a touch screen integrated therein.

The touch panel 120 according to an aspect of the present disclosure may be configured to cover a front surface of the display panel 110. For example, the touch panel 120 may be disposed to cover a front surface of base substrate or a front surface of the plate member.

The touch panel 120 according to another aspect of the present disclosure may be configured between the display part of the display panel 110 and the plate member, but aspects of the present disclosure are not limited thereto. For example, the touch panel 120 may be disposed within the pixel array part of the display panel 110. In this case, the touch panel 120 may be an in-cell touch panel, a touch electrode layer, or a touch sensor layer, but aspects of the present disclosure are not limited thereto. The touch panel 120 may include an electrode structure corresponding to a mutual-capacitance type configured so that a plurality of touch driving electrodes and a plurality of touch sensing electrodes cross each other or a self-capacitance type configured with only a plurality of touch sensing electrodes, but aspects of the present disclosure are not limited thereto.

The display member 100 according to an aspect of the present disclosure may further include a front member 130 at the front surface of the display panel 110.

The front member 130 may configure a foremost structure of the display apparatus and may protect a screen of the display panel 110. The front member 130 may be disposed at the front surface of the display panel 110. For example, the front member 130 may cover the front surface (or the screen) of the display panel 110, and thus, may protect the display panel 110 and the touch panel 120 from an external impact such as an external force applied to the display apparatus when it is dropped or by a user. For example, the front member 130 may be disposed at a front surface of the touch panel 120. For example, the touch panel 120 may be disposed between the front member 130 and the display panel 110. For example, the touch panel 120 may be connected or attached to a rear surface of the front member 130.

The front member 130 according to an aspect of the present disclosure may include a transparent plastic material, a glass material, or a reinforced glass material, but aspects of the present disclosure are not limited thereto. For example, the front member 130 may include a front structure, a front window, a cover window, a glass window, a cover screen, a screen cover, or a window glass or the like, but aspects of the present disclosure are not limited thereto.

The display apparatus according to an aspect of the present disclosure may further include a supporting member 300. The supporting member 300 may be configured or disposed at a rear surface (or a rear surface side) 100*a* of the display member 100. The supporting member 300 may be configured to cover or surround the rear surface 100*a* of the display member 100.

The supporting member 300 may include an internal space 300*s* which covers the rear surface 100*a* of the display member 100. For example, the supporting member 300 may have a box shape where one side (or one portion or an upper side or an upper portion) of the internal space 300*s* is opened. The internal space 300*s* may be referred to as a gap space, an air gap, an accommodating space, a vibration space, or a sounding box, but embodiments of the present disclosure are not limited thereto.

The supporting member 300 according to an aspect of the present disclosure may include a first supporting portion 310 and a second supporting portion 330.

The first supporting portion 310 may be at the rear surface (or a rear surface side) 100*a* of the display member 100. For example, the first supporting part 310 may be configured to cover the rear surface 100*a* of the display member 100. For example, the first supporting portion 310 may be configured to cover an entire rear surface 100*a* of the display panel 110. The first supporting portion 310 may be spaced apart from the rear surface 100*a* of the display member 100 (or display panel 110). For example, the first supporting portion 310 may be spaced apart from the rear surface 100*a* of the display member 100 (or display panel 110) with an internal space 300*s* therebetween. For example, the first supporting portion 310 may be a bottom portion, a bottom plate, a supporting plate, a housing plate, or a housing bottom portion, or the like, but aspects of the present disclosure are not limited thereto.

The second supporting portion 330 may be at a periphery portion of the display member 100. For example, the second supporting portion 330 may be configured or disposed at a periphery portion of the rear surface 100*a* of the display member 100. For example, the second supporting part 330 may be connected to a periphery portion of the first supporting part 310. For example, the second supporting part 330 may include a structure where the periphery portion of the first supporting part 310 is bent. For example, the second supporting part 330 may be a lateral portion, a sidewall, a supporting sidewall, a housing lateral surface, or a housing sidewall, or the like, but aspects of the present disclosure are not limited thereto.

The second supporting part 330 may be integrated into the first supporting part 310. For example, the first supporting part 310 and the second supporting part 330 may be integrated as one body, and thus, the internal space 300*s* surrounded by the second supporting part 330 may be provided on the first supporting part 310. Accordingly, the supporting member 300 may include a box shape where one side (or one portion such as an upper side or an upper portion) may be opened by the first supporting part 310 and the second supporting part 330, however, present disclosure is not limited to the box shape.

The display apparatus according to an aspect of the present disclosure may further include a coupling member 200 between the display member 100 and the supporting member 300.

The supporting member 300 may be coupled to or connected to the display member 100 by the coupling member 200. The supporting member 300 may be connected or coupled to a rear periphery portion of the display member 100 by the coupling member 200. For example, the supporting member 300 may be connected or coupled to a rear periphery portion of the front member 130 by the coupling member 200, but aspects of the present disclosure are not limited thereto. For example, the supporting member 300 may be connected or coupled to a rear periphery portion of the front member 130 by the coupling member 200 and may be configured to surround lateral surfaces (or side surfaces) of each of the touch panel 120 and the display panel 110. For example, the supporting member 300 may surround all lateral surfaces of each of the touch panel 120, the display panel 110, and the vibration device 500. For example, each of the touch panel 120, the display panel 110, and the vibration device 500 may be accommodated (or inserted) into the internal space 300*s* of the supporting member 300.

According to an aspect of the present disclosure, the front member 130 of the display member 100 may be omitted. In this case, the coupling member 200 may be configured between the display panel 110 and the supporting member 300. For example, when the front member 130 is omitted, the coupling member 200 may be disposed between a rear periphery portion of the display panel 110 and a front periphery portion of the first supporting part 310.

The vibration apparatus 500 may be configured at the rear surface (or a rear surface side) 100*a* of the display member 100. For example, the vibration apparatus 500 may be configured to vibrate the display member 100. For example, the vibration apparatus 500 may vibrate the display member 100 to generate (or output) an ultrasonic USW. The vibration apparatus 500 may vibrate based on a driving signal applied from a driving circuit part to shift or vibrate the display member 100, and thus, may generate (or output) an ultrasonic vibration or an ultrasonic haptic. For example, the vibration apparatus 500 may vibrate the display member 100 to generate (or output) the ultrasonic vibration to a surface (or screen) of the display member 100. For example, when a user touches the surface (or screen) of the display member 100 with a finger 10 or a touch pen (e.g. a stylus pen), the vibration apparatus 500 may generate (or output) the ultrasonic USW so that the user recognizes the ultrasonic vibration or the ultrasonic haptic through the finger 10 or the touch pen. For example, the finger 10 of the user or the touch pen (e.g. a stylus pen) may be a touch object. In the following descriptions, a touch object 10 may be the finger 10 of the user or the touch pen (e.g. a stylus pen).

The ultrasonic USW which is generated (or output) based on a vibration of the display member 100 caused by a vibration of the vibration apparatus 500 may generate a squeeze film effect. The squeeze film effect may be referred to as surface ultrasonic lubrication, and the surface ultrasonic lubrication may change a friction coefficient (or a friction force) between the touch object 10 and the display member 100 through changing of a surface friction coefficient of the display member 100 to implement fine texture or roughness recognizable by the user. Accordingly, when there is a user touch, the vibration apparatus 500 may generate the ultrasonic USW corresponding to a haptic driving signal to change the friction coefficient (or the friction force) between the touch object 10 and the display member 100, and thus, may provide a virtual texture effect to the touch object 10, thereby providing the user with a virtual texture which is equal or similar to an actual texture.

The vibration apparatus 500 according to an aspect of the present disclosure may be configured to generate an out-plane vibration mode. For example, the vibration apparatus 500 may vibrate the display member 100 in the out-plane vibration mode to provide an ultrasonic vibration or an ultrasonic haptic to a user. For example, the out-plane vibration mode may be a vertical-direction vibration, a thickness-direction vibration, or a longitudinal-direction vibration. For example, the out-plane vibration mode may be a vertical-direction vibration, a thickness-direction vibration, or a longitudinal-direction vibration with respect to the display member 100. For example, the display member 100 may be supplied with an out-plane vibration from the vibration apparatus 500 to vibrate (or displace or drive), and thus, may generate (or output) an ultrasonic USW.

The vibration apparatus 500 may be configured to include a piezoelectric material or an electroactive material which have a piezoelectric characteristic. For example, the vibration apparatus 500 may be an active vibration member, a vibration generating apparatus, a vibration generating device, an ultrasonic vibration apparatus, an ultrasonic generating apparatus, an ultrasonic generating device, a haptic vibration apparatus, a haptic vibration device, a haptic generating apparatus, or a haptic generating device, but aspects of the present disclosure are not limited thereto.

The vibration apparatus 500 according to an aspect of the present disclosure may include one or more vibration generating parts 510 and a vibration transfer part 530.

The one or more vibration generating parts 510 may include a piezoelectric material having a piezoelectric characteristic. The one or more vibration generating parts 510 may be configured as a ceramic-based piezoelectric material capable of implementing a relatively strong vibration, or may be configured as including a piezoelectric ceramic having a perovskite-based crystalline structure. For example, the one or more vibration generating parts 510 may be a vibration device, a vibration generating device, a vibration film, a vibration generating film, a vibrator, a vibration generator, an active vibrator, an active vibration generator, an actuator, an exciter, a film actuator, a film exciter, an ultrasonic actuator, or an active vibration member, or the like, but aspects of the present disclosure are not limited thereto.

The one or more vibration generating parts 510 may autonomously vibrate (or displace or drive) based on a vibration (or displacement or driving) of the piezoelectric material based on a driving signal applied to the piezoelectric material. The one or more vibration generating parts 510 may alternately repeat contraction and/or expansion by a piezoelectric effect (or a piezoelectric characteristic) to vibrate (or displace or drive). For example, the one or more vibration generating parts 510 may alternately and repeatedly perform contraction and/or expansion based on an inverse piezoelectric effect to vibrate (or displace or drive) in an in-plane vibration mode. For example, the in-plane vibration mode may be a horizontal-direction vibration or a lateral-direction vibration. For example, the in-plane vibration mode may be a horizontal-direction vibration or a lateral-direction vibration with respect to the display member 100.

The one or more vibration generating parts 510 may vibrate based on the driving signal to generate (or output) the ultrasonic USW having a frequency of 20 kHz or more. For example, the driving signal may be an ultrasonic driving signal or a haptic driving signal, but aspects of the present disclosure are not limited thereto.

The driving signal according to an aspect of the present disclosure may have a frequency of 20 kHz or more. For example, the driving signal may have a frequency which is a same as or different from a resonance frequency of the one or more vibration generating parts 510, to generate ultrasonic resonance.

The driving signal according to another aspect of the present disclosure may include an ultrasonic signal and a texture signal, to provide a virtual texture using a squeeze film effect to the user. For example, the ultrasonic signal may have a frequency of 20 kHz or more. For example, the texture signal may have a low frequency signal or a virtual texture signal, and may have a frequency of 100 Hz to 600 Hz. For example, the texture signal may have one or more frequencies of 100 Hz to 600 Hz (e.g., 200 Hz, 300 Hz, 500 Hz, etc.) based on a texture (or surface roughness) of a textured object. For example, the textured object may include one or more materials of paper, plastic, rubber, leather, fur, fabric, cloth, glass, mirror, wood, or metal, or the like, but aspects of the present disclosure are not limited thereto.

The driving signal according to another aspect of the present disclosure may be an amplitude modulation signal of an ultrasonic signal using a low frequency signal, but aspects of the present disclosure are not limited thereto. For example, the driving signal may be generated by the amplitude modulation of the ultrasonic signal based on the low frequency signal of 100 Hz to 600 Hz (e.g., 200 Hz, 300 Hz, 500 Hz, etc.), but aspects of the present disclosure are not limited thereto. Accordingly, a user may recognize a virtual texture corresponding to the frequency of the texture signal instead of a texture of the display member 100, based on a variation of the friction coefficient (or the friction force) between the display member 100 and the touch object 10 based on the ultrasonic USW included in a frequency of the texture signal.

The vibration transfer part 530 may be configured to transfer vibrations of the one or more vibration generating parts 510 to the display member 100. For example, the vibration transfer part 530 may be a vibration conversion member, a vibration mode conversion member, or a converter, but aspects of the present disclosure are not limited thereto.

The vibration transfer part 530 according to an aspect of the present disclosure may be configured to convert the in-plane vibration mode (or a first vibration mode) of the one or more vibration generating parts 510 into the out-plane vibration mode (or a second vibration mode) of the one or more vibration generating parts 510. For example, the vibration transfer part 530 may be configured to convert the in-plane vibration mode, transferred to the display member 100, into the out-plane vibration mode based on vibrations of the one or more vibration generating parts 510. For example, the vibration transfer part 530 may be configured to convert the in-plane vibration mode into the out-plane vibration mode based on vibrations of the one or more vibration generating parts 510 and transmit the converted out-plane vibration mode to the display member 100. For example, the vibration transfer part 530 may be configured to convert an ultrasonic vibration direction (or lateral-direction vibration or horizontal-direction vibration), transferred to the display member 100, into a thickness-direction vibration (or longitudinal-direction vibration) of the display member 100 based on vibrations of the one or more vibration generating parts 510. For example, the vibration transfer part 530 may convert the vibrations of the one or more vibration generating parts 510 into a normal-direction vibration (or a horizontal-direction vibration) with respect to a surface of the vibration generating part 510 or a thickness-direction vibration (or longitudinal-direction vibration) of the display member 100 and may allow the normal-direction vibration or the thickness-direction vibration of the display member 100 to be transferred to the display member 100, thereby increasing (or maximizing) the efficiency of a squeeze film effect generated based on a vibration of the display member 100.

The vibration transfer part 530 may be configured to include a material having relatively high stiffness or a material having a Young's modulus or a modulus of 1 GPa or more, to transfer vibrations of the one or more vibration generating parts 510 to the display member 100.

The vibration transfer part 530 according to an aspect of the present disclosure a metal material or a plastic material.

According to an aspect of the present disclosure, the metal material of the vibration transfer part 530 may include any one or more materials of stainless steel, aluminum (Al), an Al alloy, a magnesium (Mg), a Mg alloy, copper (Cu) alloy, and a magnesium-lithium (Mg—Li) alloy, but aspects of the present disclosure are not limited thereto.

According to an aspect of the present disclosure, the vibration transfer part 530 may be configured as a plastic material such as plastic or styrene material, but aspects of the present disclosure are not limited thereto. For example, the plastic material of the vibration transfer part 530 may be configured as polycarbonate (PC), polyethylene terephthalate (PET), polyarylate (PAR), polyethylene naphthalate (PEN), polysulfone (PSF), polyethersulfone (PES), or cycloolefin copolymer (COC), or the like, but aspects of the present disclosure are not limited thereto. For example, the styrene material may be an ABS material. The ABS material may be acrylonitrile, butadiene, and styrene.

The one or more vibration generating parts 510 may be adhered to or connected to the vibration transfer part 530. For example, the one or more vibration generating parts 510 may be adhered to or connected to a first surface (or rear surface) 531*a* of the vibration transfer part 530 by an adhesive member 560. For example, the adhesive member 560 may be a first connection member or a first adhesive member, but aspects of the present disclosure are not limited thereto.

The adhesive member 560 according to an aspect of the present disclosure may be a double-sided tape, an adhesive, a double-sided adhesive, bond, or a thermo-curable resin, or the like, but aspects of the present disclosure are not limited thereto. For example, the adhesive member 560 may include one or more of a thermo-curable adhesive, a photo-curable adhesive, and a thermal bonding adhesive (or a thermosetting adhesive). For example, the adhesive member 560 may include the thermal bonding adhesive. The thermal bonding adhesive may be a heat-active type or a thermo-curable type. For example, the adhesive member 560 including the thermal bonding adhesive may attach or couple the one or more vibration generating parts 510 and the vibration transfer part 530 by heat and pressure. For example, the adhesive member 560 including the thermal bonding adhesive (or the thermosetting adhesive) may minimize or reduce or prevent the loss of vibration of the one or more vibration generating parts 510.

The adhesive member 560 according to another aspect of the present disclosure may include a vibration transfer particle. For example, the vibration transfer particle may reduce or prevent or minimize a loss of vibration transferred from the one or more vibration generating parts 510 to the vibration transfer part 530. For example, the vibration transfer particle may include piezoelectric materials (or metal materials, metal nanowires, or metal nanoparticles) included or added in an adhesive material such as a pressure sensitive adhesive (PSA), an optically cleared adhesive (OCA), or an optically cleared resin (OCR), but aspects of the present disclosure are limited thereto.

The vibration apparatus 500 or the vibration transfer part 530 according to another aspect of the present disclosure may be connected or coupled to the display member 100. For example, the vibration apparatus 500 or the vibration transfer part 530 may be connected to or supported at the rear surface 100*a* of the display member 100 by a connection member 400. For example, the vibration apparatus 500 or the vibration transfer part 530 may be partially (or locally) connected to or partially (or locally) supported at the rear surface 100*a* of the display panel 110 by the connection member 400. For example, the connection member 400 may be a second connection member or a second adhesive member, but aspects of the present disclosure are not limited thereto.

The connection member 400 may include a material or an adhesive material for preventing or reducing or minimizing the loss of a vibration (or vibration force or displacement force) transferred to the display member 100 from the vibration apparatus 500 or the vibration transfer part 530. For example, the connection member 400 may include a material or an adhesive material having a modulus or a Young's modulus which is equal or similar to the vibration transfer part 530, to transfer a vibration of the vibration transfer part 530 to the display member 100 without loss.

The connection member 400 according to an aspect of the present disclosure may have a modulus of 1 GPa (gigapascal) or more. For example, the connection member 400 may have a modulus of 1 GPa to 10 GPa, but aspects of the present disclosure are not limited thereto. For example, when the display apparatus according to an aspect of the present disclosure is applied to a vehicular apparatus (or vehicle) and the connection member 400 includes a material or an adhesive material having a modulus of 1 GPa or more, the transfer efficiency of a vibration force (or displacement force) transferred from the vibration apparatus 500 or the vibration transfer part 530 to the display member 100 may increase, and the transfer efficiency of a vibration force (or displacement force) transferred from the vibration apparatus 500 or the vibration transfer part 530 to the display member 100 may not decrease in a high temperature environment and a low temperature environment.

The material or the adhesive material of the connection member 400 according to an aspect of the present disclosure may include epoxy or cyanoacrylate, but aspects of the present disclosure are not limited thereto.

The material or the adhesive material of the connection member 400 according to another aspect of the present disclosure may include such as a pressure sensitive adhesive (PSA), an optically cleared adhesive (OCA), an optically cleared resin (OCR), an epoxy resin, an acrylic resin, a silicone resin, or a urethane resin, or the like, but aspects of the present disclosure are not limited thereto. For example, the connection member 400 may include an acrylic-based adhesive material (or substance) having a characteristic where an adhesive force is better and hardness is higher.

When the display apparatus according to an aspect of the present disclosure is applied to a non-vehicular apparatus instead of a vehicular apparatus, the connection member 400 according to another aspect of the present disclosure may have a modulus (or Young's modulus) of less than 1 GPa. For example, the connection member 400 may have a modulus of 10 MPa (megapascal) or less. For example, the connection member 400 may have a modulus of 1 MPa to 10 MPa, but aspects of the present disclosure are not limited thereto. For example, when the connection member 400 has a modulus of less than 1 GPa or 10 MPa or less, the connection member 400 may have a thickness of 1 μm (micrometer) or more and 0.5 mm (millimeter) or less so as to prevent or minimize or reduce the loss, caused by a relatively low modulus, of a vibration (or vibration force) transferred from the vibration apparatus 500 or the vibration transfer part 530 to the display member 100, but aspects of the present disclosure are not limited thereto. For example, the connection member 400 may include a double-sided adhesive, a double-sided tape, a double-sided foam tape, a double-sided foam pad, or an adhesive, or the like, but aspects of the present disclosure are not limited thereto.

The connection member 400 according to another aspect of the present disclosure may include a material or an adhesive material which is high in thermal conductance or large in thermal capacity, to dissipate heat, occurring in vibration of the vibration apparatus 500, to the display member 100. For example, the connection member 400 may be a heat dissipation member. For example, the connection member 400 may include a heat transfer particle. For example, the heat transfer particle may increase a vibration (or vibration force) transferred from the vibration apparatus 500 to the display member 100, or may increase a heat transfer rate of heat transferred from the vibration apparatus 500 to the display member 100. The heat transfer particle may include metal materials, metal nanoparticles, or metal nanowires, but aspects of the present disclosure are not limited thereto.

The connection member 400 according to an aspect of the present disclosure may have a thickness for reducing or preventing a physical contact between the vibration apparatus 500 and the display member 100. For example, the connection member 400 may be adjusted based on heat transfer efficiency (or thermal capacity) transferred from the vibration apparatus 500 to the display member 100. For example, the connection member 400 may be adjusted based on one or more of the thickness for reducing or preventing the physical contact between the vibration apparatus 500 and the display member 100 and a thickness for maximizing or increasing heat transfer efficiency (or thermal capacity) transferred from the vibration apparatus 500 to the display member 100, but aspects of the present disclosure are not limited thereto.

The display apparatus according to an aspect of the present disclosure may further include an air gap AG between the display member 100 and the vibration generating part 510.

The air gap AG may be configured between the display member 100 and the vibration apparatus 500 (or the vibration transfer part 530). For example, the air gap AG may be disposed (or provided) by a partial connection (or a partial coupling) between the display member 100 and the vibration apparatus 500 (or the vibration transfer part 530). For example, the vibration apparatus 500 or the vibration transfer part 530 may be disposed at the rear surface 100*a* of the display member 100 with the air gap AG therebetween. The air gap AG may allow the vibration apparatus 500 and the display member 100 to independently vibrate without depending on each other. Moreover, the air gap AG may enable a smooth vibration of the vibration apparatus 500 in vibration of the vibration apparatus 500 and a free strain of the display member 100 based thereon, and thus, may increase a vibration width of the display member 100, thereby increasing an intensity of an ultrasonic USW generated based on a vibration of the display member 100.

Figure 3:
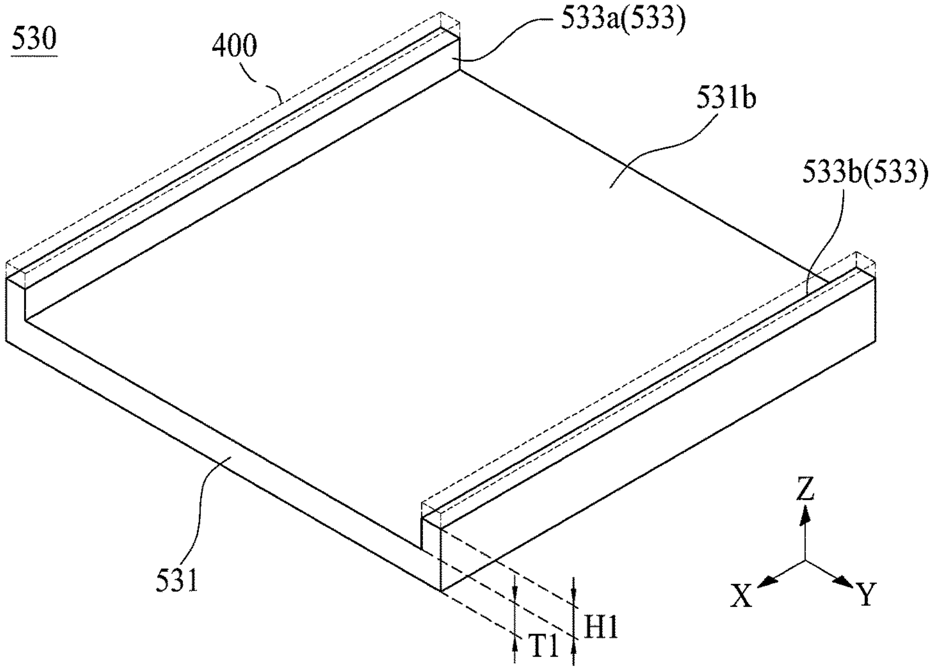
FIG. 3 is a perspective view illustrating a vibration transfer part according to an aspect of the present disclosure illustrated in FIG. 2.

FIG. 3 is a perspective view illustrating a vibration transfer part according to an aspect of the present disclosure illustrated in FIG. 2.

With reference to FIGS. 2 and 3, a vibration transfer part 530 according to an aspect (or a first aspect) of the present disclosure may include a base member 531 and a vibration transfer member 533.

The base member 531 may be configured to vibrate based on vibrations (or displacement or driving) of a one or more vibration generating parts 510. The base member 531 may be configured to support one or more vibration generating parts 510. The base member 531 may have a size which is equal to the vibration generating part 510 or is greater than the one or more vibration generating parts 510. The base member 531 may have a same shape as the vibration generating part 510, but aspects of the present disclosure are not limited thereto. Alternatively, the base member 531 may have a different shape from the vibration generating part 510.

The base member 531 may be adhered or connected to a first surface (e.g., front surface) of the one or more vibration generating parts 510. For example, a first surface (e.g., rear surface) 531*a* of the base member 531 may be adhered or connected to the first surface (e.g., front surface) of the one or more vibration generating parts 510 by an adhesive member 560. Therefore, the base member 531 may vibrate based on vibrations of the one or more vibration generating parts 510. For example, the first surface (e.g., rear surface) 531*a* of the base member 531 may be a first surface (e.g., rear surface) of the vibration transfer part 530. For example, the base member 531 may be a plate, a base plate, a vibration plate, a vibration transfer plate, a base frame, a body, or a base structure, but aspects of the present disclosure are not limited thereto.

The base member 531 according to an aspect of the present disclosure may have a first thickness T1. For example, the first thickness T1 may be 0.1 mm or more. For example, the first thickness T1 may be 0.1 mm or more and 5 mm or less, but aspects of the present disclosure are not limited thereto. For example, the first thickness T1 of the base member 531 may be 0.1 mm or more, based on a resonance frequency of the display member 100 and/or a frequency of an ultrasonic USW generated based on a vibration of the display member 100. For example, the resonance frequency of the display member 100 and/or the frequency of an ultrasonic USW generated based on a vibration of the display member 100 may be changed or tuned based on a size (or area) of the one or more vibration generating parts 510 and a size (or area) and a thickness T1 of the base member 531. For example, the size (or area) and/or the thickness T1 of the base member 1531 may be changed or optimized so that a frequency of the ultrasonic USW generated based on a vibration of the display member 100 corresponds to (or matches) the resonance frequency of the display member 100.

The vibration transfer member 533 may be configured to transfer a vibration of the base member 531 to the display member 100. The vibration transfer member 533 may be configured between the base member 531 and the display member 100. The vibration transfer member 533 may be disposed at or connected to a second surface (e.g., front surface) 531*b* of the base member 531 facing the display member 100. For example, the vibration transfer member 533 may be disposed at or connected to both periphery portions or both end portions of the base member 531. For example, the vibration transfer member 533 may be connected or coupled to a rear surface 100*a* of the display member 100. For example, the vibration transfer member 533 may be connected or coupled to the rear surface 100*a* of the display member 100 by a connection member 450. For example, the vibration transfer member 533 may be a bridge, a leg, a rib, a protrusion portion, a bending portion, a bridge line, a rib line, a protrusion line, a vibration transfer structure, or a vibration transfer line, but aspects of the present disclosure are not limited thereto.

The vibration transfer member 533 may have a height (or thickness) H1 for reducing or preventing a physical contact between the display member 100 and the base member 531. For example, the vibration transfer member 533 may be configured to have a first height (or thickness) H1 from the second surface 531*b* of the base member 531. For example, the first height H1 may be a length (or distance) between the second surface 531*b* of the base member 531 and an uppermost surface of the vibration transfer member 533, in a third direction Z. For example, the first height H1 of the vibration transfer member 533 may be a same as or different from the first thickness T1 of the base member 531. For example, the first height H1 of the vibration transfer member 533 may be set to 0.5 mm or more, but aspects of the present disclosure are not limited thereto. For example, the first height H1 of the vibration transfer member 533 may be adjusted to 0.1 mm or more, based on a total thickness of an apparatus and the stiffness and size of the base member 531. For example, the third direction may be a thickness direction of the base member 531 or the display member 100 or a Z-axis direction in an XYZ coordinate system.

The vibration transfer member 533 according to an aspect of the present disclosure may include a first vibration transfer member 533*a* and a second vibration transfer member 533*b*. For example, the vibration transfer member 533 may include the first vibration transfer member 533*a* and the second vibration transfer member 533*b*, which are disposed at or connected to both periphery portions or both end portions of the base member 531. For example, the vibration transfer member 533 may include the first vibration transfer member 533*a* and the second vibration transfer member 533*b*, which protrude from the both periphery portions or the both end portions of the base member 531. For example, the vibration transfer member 533 according to an aspect of the present disclosure may include a cross-sectional structure having a U-shape, based on the base member 531 and the first and second vibration transfer members 533*a* and 533*b*. The base member 531 and the first and second vibration transfer members 533*a* and 533*b* may include a plastic material or a metal material described above, but aspects of the present disclosure are not limited thereto.

The first vibration transfer member 533*a* may be disposed at or connected to a first periphery portion or a first lateral end portion of the base member 531. For example, the first vibration transfer member 533*a* may be configured or connected to the first periphery portion or the first lateral end portion adjacent to a first side of the base member 531. For example, the first vibration transfer member 533*a* may be bent toward the rear surface 100*a* of the display member 100 from the first periphery portion or the first lateral end portion of the base member 531. For example, the first vibration transfer member 533*a* may be configured to have the first height (or thickness) H1.

The second vibration transfer member 533*b* may be disposed at or connected to a second periphery portion or a second lateral end portion of the base member 531 in parallel to the first vibration transfer member 533*a*. For example, the second vibration transfer member 533*b* may be disposed or connected to the second periphery portion or the second lateral end portion adjacent to a second side in parallel with the first side of the base member 531. For example, the second vibration transfer member 533*b* may be bent toward the rear surface 100*a* of the display member 100 from the second periphery portion or the second lateral end portion of the base member 531. For example, the second vibration transfer member 533*b* may be configured to have the first height (or thickness) H1.

Each of the first vibration transfer member 533*a* and the second vibration transfer member 533*b* may include a line shape having a certain width. For example, each of the first vibration transfer member 533*a* and the second vibration transfer member 533*b* may extend along a first direction X and may include the line shape having a predetermined width in parallel to a second direction Y intersecting with the first direction X. For example, the first direction X may be a horizontal length direction or a lateral length direction of the base member 531 or the display member 100 or an X-axis direction of an XYZ coordinate system. For example, the second direction Y may be a vertical length direction or a longitudinal length direction of the base member 531 or the display member 100 or a Y-axis direction of the XYZ coordinate system.

According to an aspect of the present disclosure, each of the first vibration transfer member 533*a* and the second vibration transfer member 533*b* may be vertically disposed at or connected to the second surface 531*b* of the base member 531. For example, an angle between the second surface 531*b* of the base member 531 and each of the first vibration transfer member 533*a* and the second vibration transfer member 533*b* may be 90 degrees, without limited thereto, and can be a degree smaller than 90 degrees.

According to another aspect of the present disclosure, a bending portion between the base member 531 and each of the first vibration transfer member 533*a* and the second vibration transfer member 533*b* may have a curved structure having a certain curvature radius. For example, a connection portion between the base member 531 and each of the first vibration transfer member 533*a* and the second vibration transfer member 533*b* may have a curved structure having a certain curvature radius.

Each of the first vibration transfer member 533*a* and the second vibration transfer member 533*b* may be connected or coupled to the rear surface 100*a* of the display member 100 by a connection member 400. The first vibration transfer member 533*a* and the second vibration transfer member 533*b* may dispose an air gap AG between the rear surface 100*a* of the display member 100 and the base member 531. For example, the air gap AG may be disposed (or provided) between the rear surface 100*a* of the display member 100 and the base member 531 by the first vibration transfer member 533*a* and the second vibration transfer member 533*b*. Therefore, the first vibration transfer member 533*a* and the second vibration transfer member 533*b* may be disposed at or connected to the second surface 531*b* of the base member 531 with the air gap AG therebetween in parallel. For example, each of the first vibration transfer member 533*a* and the second vibration transfer member 533*b* may overlap or not overlap the one or more vibration generating parts 510, based on a size of the base member 531 and/or the one or more vibration generating parts 510.

According to an aspect of the present disclosure, the vibration transfer member 533 of the vibration apparatus 500 may be connected or coupled to the display member 100 by a partial connection scheme based on the connection member 400, and thus, compared to an entire connection scheme between the vibration transfer part 530 and the display member 100 by the connection member 400, a connection process (or attachment process) and connection quality (or attachment performance) between the display member 100 and the vibration apparatus 500 may be improved.

Figure 4:
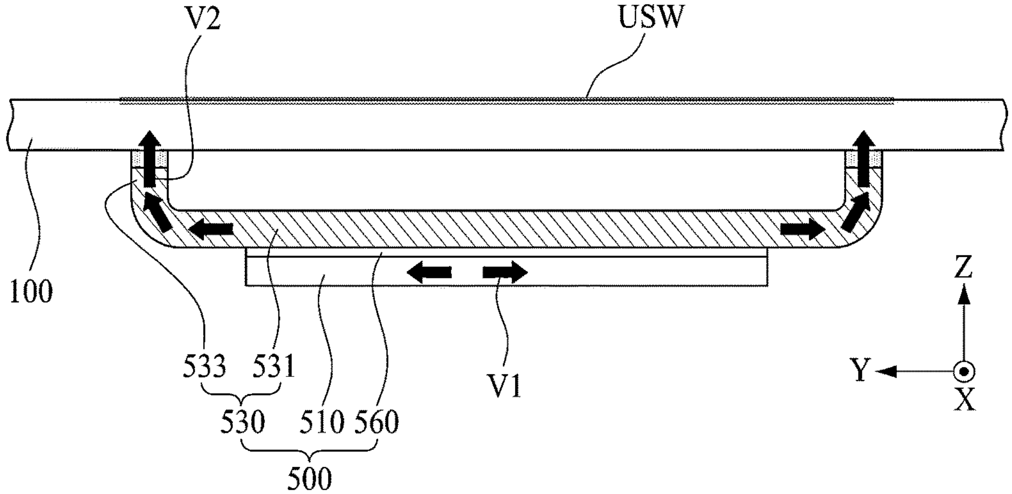
FIG. 4 illustrates vibration transmission by a vibration transfer part according to an aspect of the present disclosure.

The vibration transfer member 533 or the first and second vibration transfer members 533*a* and 533*b* according to an aspect of the present disclosure, as illustrated in FIG. 4, may convert a vibration (or lateral-direction vibration or horizontal-direction vibration or in-plane vibration) V1 of the one or more vibration generating parts 510 into a normal-direction vibration with respect to a surface of the vibration generating part 510 or a thickness-direction vibration (or longitudinal-direction vibration or out-plane vibration) V2 of the display member 100 and may transfer the normal-direction vibration or the thickness-direction vibration V2 of the display member 100 to the display member 100, and thus, may increase the efficiency of a squeeze film effect generated based on a vibration of the display member 100. Accordingly, a thickness-direction vibration displacement (or vibration efficiency) of the display member 100 may be enhanced based on a longitudinal-direction vibration transferred through the vibration transfer part 530, and an intensity of the ultrasonic USW generated based on a vibration of the display member 100 may increase, thereby increasing (or maximizing) a squeeze film effect obtained based on a vibration of the display member 100. Therefore, the recognition of a user on an ultrasonic vibration or an ultrasonic haptic and/or a virtual texture may be enhanced.

Figure 5:
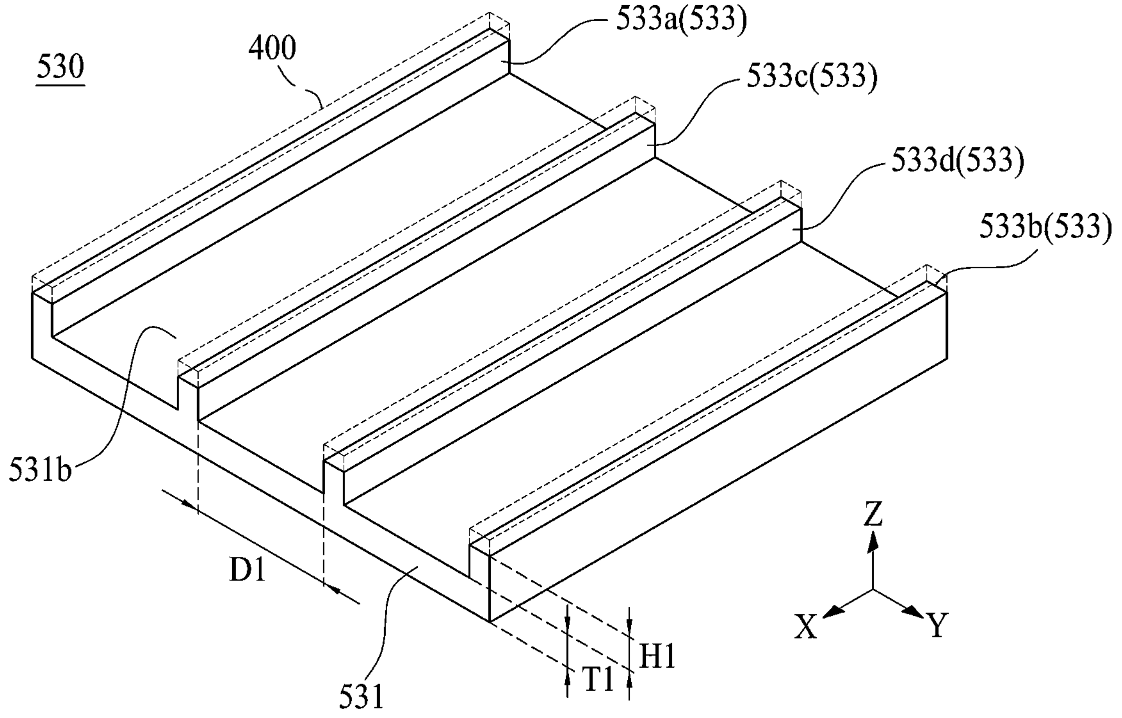
FIG. 5 is a perspective view illustrating a vibration transfer part according to another aspect of the present disclosure.

FIG. 5 is a perspective view illustrating a vibration transfer part according to another aspect of the present disclosure. FIG. 5 illustrates an aspect implemented by modifying the vibration transfer member illustrated in FIGS. 2 and 3 according to another aspect of the present disclosure.

With reference to FIGS. 2 and 5, a vibration transfer part 530 according to another aspect (or a second aspect) of the present disclosure may include a base member 531 and a vibration transfer member 533.

The base member 531 may be configured to support one or more vibration generating parts 510. For example, the base member 531 may be a same or substantially a same as the base member 531 described above with reference to FIG. 3, and thus, repeated descriptions thereof are omitted. The descriptions of the base member 531 described above with reference to FIG. 3 may be included in descriptions of the base member 531 illustrated in FIG. 5.

The vibration transfer member 533 may be configured to transfer a vibration of the base member 531 based on a vibration of the one or more vibration generating parts 510 to a display member 100.

The vibration transfer member 533 according to another aspect of the present disclosure may include a plurality of vibration transfer members 533*a* to 533*d*. For example, the vibration transfer part 530 may be configured to include four vibration transfer members 533*a* to 533*d*, but aspects of the present disclosure are not limited thereto. For example, the vibration transfer part 530 may include first to fourth vibration transfer members 533*a* to 533*d*. Each of the plurality of vibration transfer members 533*a* to 533*d* or the first to fourth vibration transfer members 533*a* to 533*d* may be connected or coupled to a rear surface 100*a* of the display member 100 by a connection member 400.

Each of the first to fourth vibration transfer members 533*a* to 533*d* may include a line shape having a certain width. For example, each of the first to fourth vibration transfer members 533*a* to 533*d* may extends along a first direction X and may include the line shape having a predetermined width in parallel to a second direction Y intersecting with the first direction X. The first to fourth vibration transfer members 533*a* to 533*d* may be spaced apart from one another along the second direction Y. Alternatively, each of the first to fourth vibration transfer members 533*a* to 533*d* may extends along a second direction Y and may include the line shape having a predetermined width in parallel to a first direction X intersecting with the second direction Y. The first to fourth vibration transfer members 533*a* to 533*d* may be spaced apart from one another along the first direction X. The first to fourth vibration transfer members 533*a* to 533*d* may be disposed at or connected to a predetermined position of a second surface 531*b* of the base member 531.

The first and second vibration transfer members 533*a* and 533*b* may be disposed at or connected to both periphery portions or both end portions of the base member 531. For example, the first and second vibration transfer members 533a and 533b may be a same or substantially a same as the first and second vibration transfer members 533a and 533b described above with reference to FIG. 3, and thus, repeated descriptions thereof are omitted. The descriptions of the first and second vibration transfer members 533a and 533b described above with reference to FIG. 3 may be included in descriptions of the first and second vibration transfer members 533a and 533b illustrated in FIG. 5.

The third and fourth vibration transfer members 533c and 533d may be disposed between the first and second vibration transfer members 533a and 533b. For example, the third and fourth vibration transfer members 533c and 533d may be disposed at or connected to a second surface 531b of the base member 531 corresponding to a center portion of the base member 531. The third and fourth vibration transfer members 533c and 533d may protrude from the second surface 531b of the base member 531 corresponding to the center portion of the base member 531.

The third vibration transfer member 533c may be disposed between the first and fourth vibration transfer members 533a and 533d. For example, the third vibration transfer member 533c may protrude from the second surface 531b of the base member 531 corresponding to a region between the first and fourth vibration transfer members 533a and 533d.

The fourth vibration transfer member 533d may be disposed between the second and third vibration transfer members 533b and 533c. For example, the fourth vibration transfer member 533d may protrude from the second surface 531b of the base member 531 corresponding to a region between the second and third vibration transfer members 533b and 533c.

Distances (or intervals) D1 between the first to fourth vibration transfer members 533a to 533d may be a same or differ. Each of the first to fourth vibration transfer members 533a to 533d may be configured to have a same first height (or thickness) H1.

A position of each of the first to fourth vibration transfer members 533a to 533d connected to the base member 531 may be adjusted by tuning of an ultrasonic frequency based on the number of first to fourth vibration transfer members 533a to 533d, a resonance frequency of the display member 100, and a thickness T1 of the base member 531. For example, the position of each of the first to fourth vibration transfer members 533a to 533d may be adjusted so that an offset vibration by the first to fourth vibration transfer members 533a to 533d does not occur in vibration of the display member 100 or the base member 531.

Figure 6:
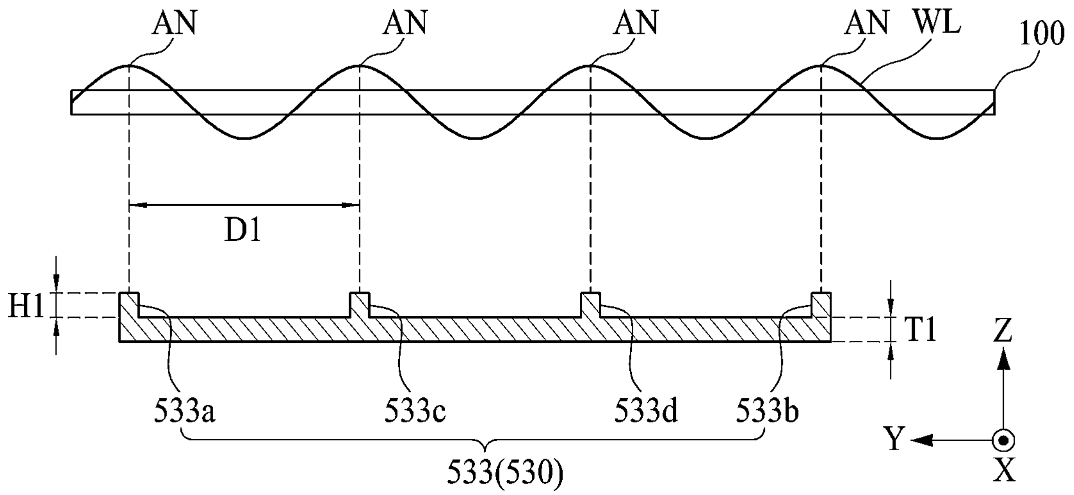
FIG. 6 illustrates the positioning of each of the plurality of vibration transfer members illustrated in FIG. 5 according to another aspect of the present disclosure.

The position of each of the first to fourth vibration transfer members 533a to 533d according to an aspect of the present disclosure, as illustrated in FIG. 6, may be adjusted to correspond to an antinode AN where a vibration displacement of the base member 531 or the one or more vibration generating parts 510 is the maximum. For example, the distance (or interval) D1 between the first to fourth vibration transfer members 533a to 533d may be adjusted to correspond to an even multiple "$2n\times\lambda/2$" (where n may be a natural number) (e.g., $\lambda$, $2\lambda$,$3\lambda$ . . . ) of a half wavelength (or ½ of a wavelength) "$2/\lambda$" of the display member 100, based on a wavelength length WL of the display member 100. For example, the wavelength length WL of the display member 100 may be calculated based on a wavelength speed of the display member 100.

The vibration transfer member 533 according to another aspect of the present disclosure may include the first to fourth vibration transfer members 533a to 533d, and thus, may increase (or maximize) a squeeze film effect generated based on a vibration of the display member 100 like the vibration transfer member 533 according to an aspect of the present disclosure described with reference to FIG. 3, thereby enhancing the recognition of a user on an ultrasonic vibration or an ultrasonic haptic and/or a virtual texture. Moreover, the vibration transfer member 533 according to another aspect of the present disclosure may include the first to fourth vibration transfer members 533a to 533d, and thus, may increase a vibration force (or displacement force) transferred to the display member 100, based on a vibration of the one or more vibration generating parts 510 and may change a vibration mode shape of the display member 100. Accordingly, an average vibration displacement amount per unit area of the display member 100 may be maintained, and a frequency of an ultrasonic USW generated based on a vibration of the display member 100 may increase.

Figure 7:
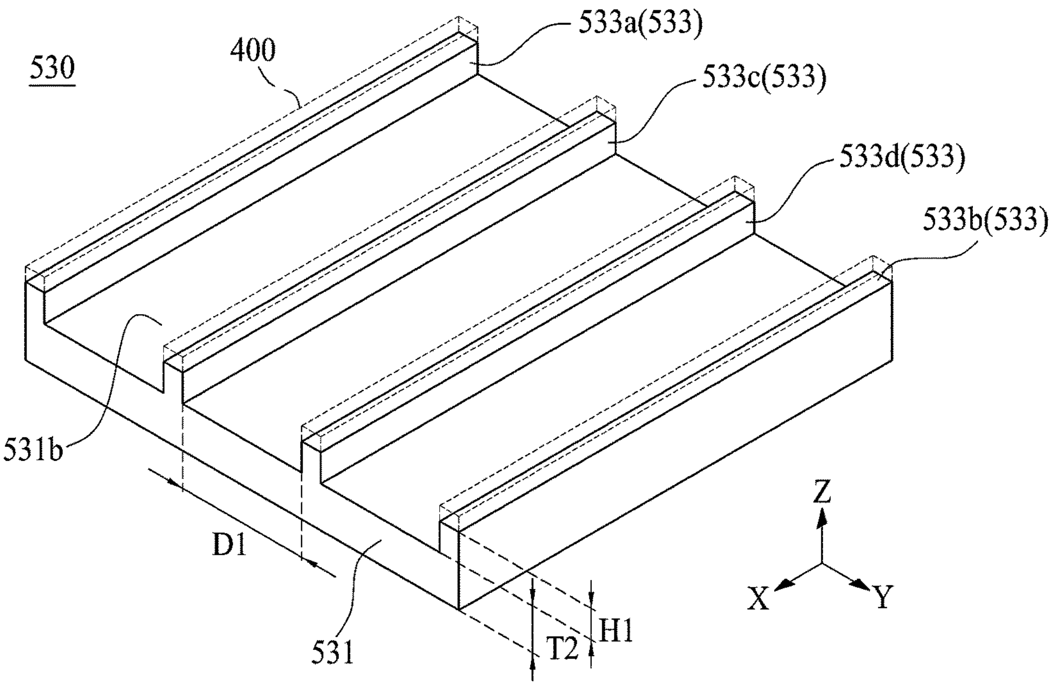
FIG. 7 is a perspective view illustrating a vibration transfer part according to another aspect of the present disclosure.

FIG. 7 is a perspective view illustrating a vibration transfer part according to another aspect of the present disclosure. FIG. 7 illustrates an aspect implemented by modifying the base member illustrated in FIG. 5 according to another aspect of the present disclosure.

With reference to FIGS. 2 and 7, a vibration transfer part 530 according to another aspect (or a third aspect) of the present disclosure may include a base member 531 and a vibration transfer member 533.

The base member 531 may be configured to support one or more vibration generating parts 510. For example, except for that the base member 531 have a second thickness T2, the base member 531 may be a same or substantially a same as the base member 531 described above with reference to FIG. 3, and thus, repeated descriptions thereof are omitted. The descriptions of the base member 531 described above with reference to FIG. 3 may be included in descriptions of the base member 531 illustrated in FIG. 7.

The second thickness T2 of the base member 531 may be adjusted by tuning of an ultrasonic frequency. For example, the second thickness T2 of the base member 531 may be different from the first thickness T1 of the base member 531 described above with reference to FIG. 3 or 5. For example, the second thickness T2 of the base member 531 may be thicker than the first thickness T1 of the base member 531 described above with reference to FIG. 3 or 5. For example, the first thickness T1 of the base member 531 may be 0.5 mm and the second thickness T2 of the base member 531 may be 1.0 mm, but aspects of the present disclosure are not limited thereto. For example, the second thickness T2 of the base member 531 may be any one different from the first thickness T1 of 0.1 mm to 5.0 mm.

A wavelength length of the display member 100 may decrease based on an increase in wavelength speed of the display member 100 caused by an increase in thickness of the base member 531. Accordingly, a frequency of an ultrasonic USW generated based on a vibration of the display member 100 may increase.

The vibration transfer member 533 may include first to fourth vibration transfer members 533a to 533d. The first to fourth vibration transfer members 533a to 533d may be a same or substantially a same as the first to fourth vibration transfer members 533a to 533d described above with reference to FIG. 5, and thus, repeated descriptions thereof are omitted. The descriptions of the first to fourth vibration transfer members 533a to 533d described above with reference to FIG. 5 may be included in descriptions of the first to fourth vibration transfer members 533a to 533d illustrated in FIG. 7.

The vibration transfer part 530 according to another aspect of the present disclosure may include the base member 531 having the second thickness T2 and first to fourth vibration transfer members 533*a* to 533*d*, and thus, may have substantially a same effect as the vibration transfer member 533 according to an aspect of the present disclosure described above with reference to FIG. 3 or 5.

Figure 8:
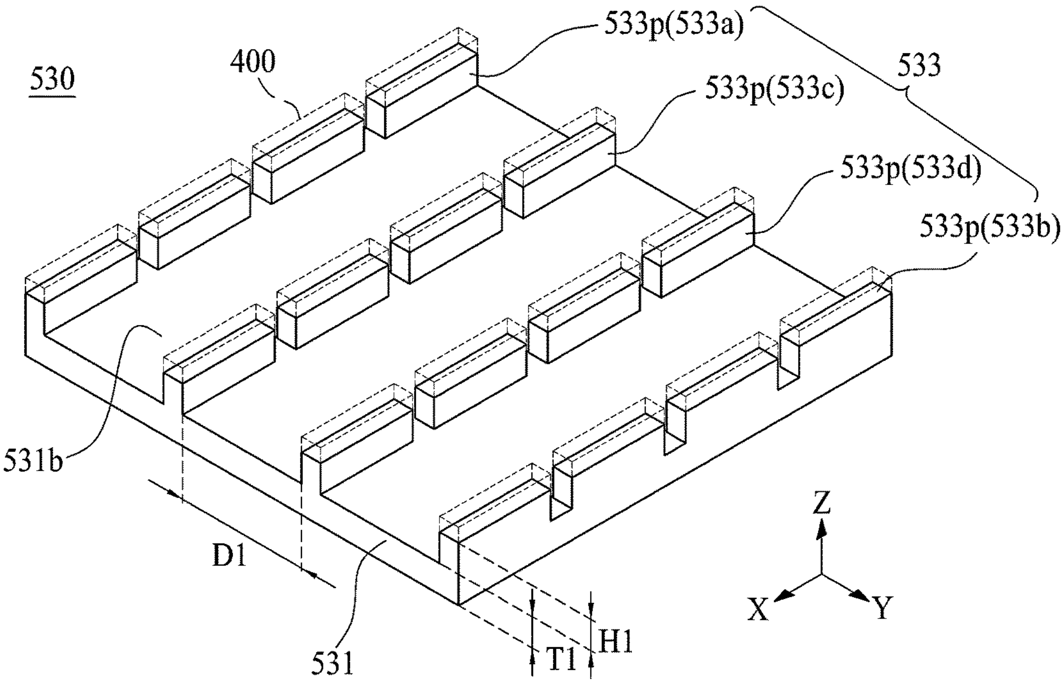
FIG. 8 is a perspective view illustrating a vibration transfer part according to another aspect of the present disclosure.

FIG. 8 is a perspective view illustrating a vibration transfer part according to another aspect of the present disclosure. FIG. 8 illustrates an aspect implemented by modifying the vibration transfer member illustrated in FIG. 5 according to another aspect of the present disclosure.

With reference to FIGS. 2 and 8, a vibration transfer part 530 according to another aspect (or a fourth aspect) of the present disclosure may include a base member 531 and a vibration transfer member 533.

The base member 531 may be configured to support one or more vibration generating parts 510. For example, except for that the base member 531 have a second thickness T2, the base member 531 may be a same or substantially a same as the base member 531 described above with reference to FIG. 3, and thus, repeated descriptions thereof are omitted. The descriptions of the base member 531 described above with reference to FIG. 3 may be included in descriptions of the base member 531 illustrated in FIG. 8.

The vibration transfer member 533 may include a plurality of vibration transfer members 533*a* to 533*d* or first to fourth vibration transfer members 533*a* to 533*d*. Each of the plurality of vibration transfer members 533*a* to 533*d* or the first to fourth vibration transfer members 533*a* to 533*d* may be connected or coupled to a rear surface 100*a* of a display member 100 by a connection member 400.

A position of each of the first to fourth vibration transfer members 533*a* to 533*d* connected to the base member 531 and a distance (or interval) D1 between the first to fourth vibration transfer members 533*a* to 533*d* may be a same as or substantially a same as the first to fourth vibration transfer members 533*a* to 533*d* described above with reference to FIG. 5, and thus, repeated descriptions thereof are omitted. The descriptions of the first to fourth vibration transfer members 533*a* to 533*d* described above with reference to FIG. 5 may be included in descriptions of the first to fourth vibration transfer members 533*a* to 533*d* illustrated in FIG. 8.

Each of the first to fourth vibration transfer members 533*a* to 533*d* according to another aspect of the present disclosure may include at least one or more transfer portions (or transfer parts) 533*p*.

The at least one or more transfer portions 533*p* may correspond to each of the first to fourth vibration transfer members 533*a* to 533*d*. The at least one or more transfer portions 533*p* may be configured to have a certain interval. For example, the at least one or more transfer portions 533*p* may be configured to have a predetermined interval and a certain length along a second direction Y or the first direction X. The at least one or more transfer portions 533*p* may have a same or different height H1. Each of the at least one or more transfer portions 533*p* may be connected or coupled to the rear surface 100*a* of the display member 100 by a connection member 400. For example, the at least one or more transfer portions 533*p* may have at least one or more transfer patterns, but aspects of the present disclosure are not limited thereto.

The first to fourth vibration transfer members 533*a* to 533*d* having the at least one or more transfer portions 533*p* may be arranged in a lattice shape at a second surface 531*b* of the base member 531, without limited thereto, and may also be arranged in for example, a circle, oval, irregular polygonal, etc. shape at a second surface 531*b* of the base member 531.

The vibration transfer member 533 according to another aspect of the present disclosure may include the first to fourth vibration transfer members 533*a* to 533*d* having the at least one or more transfer portions 533*p*, and thus, may increase (or maximize) a squeeze film effect generated based on a vibration of the display member 100 like the vibration transfer member 533 according to an aspect of the present disclosure described with reference to FIG. 3, thereby enhancing the recognition of a user on an ultrasonic vibration or an ultrasonic haptic and/or a virtual texture. Moreover, the vibration transfer member 533 according to another aspect of the present disclosure may include the first to fourth vibration transfer members 533*a* to 533*d* having the at least one or more transfer portions 533*p*, and thus, may increase a vibration force (or displacement force) transferred to the display member 100, based on a vibration of each of the one or more vibration generating parts 510 and may change a vibration mode shape of the display member 100. Accordingly, an average vibration displacement amount per unit area of the display member 100 may be maintained, and a frequency of an ultrasonic USW generated based on a vibration of the display member 100 may increase.

Figure 9:
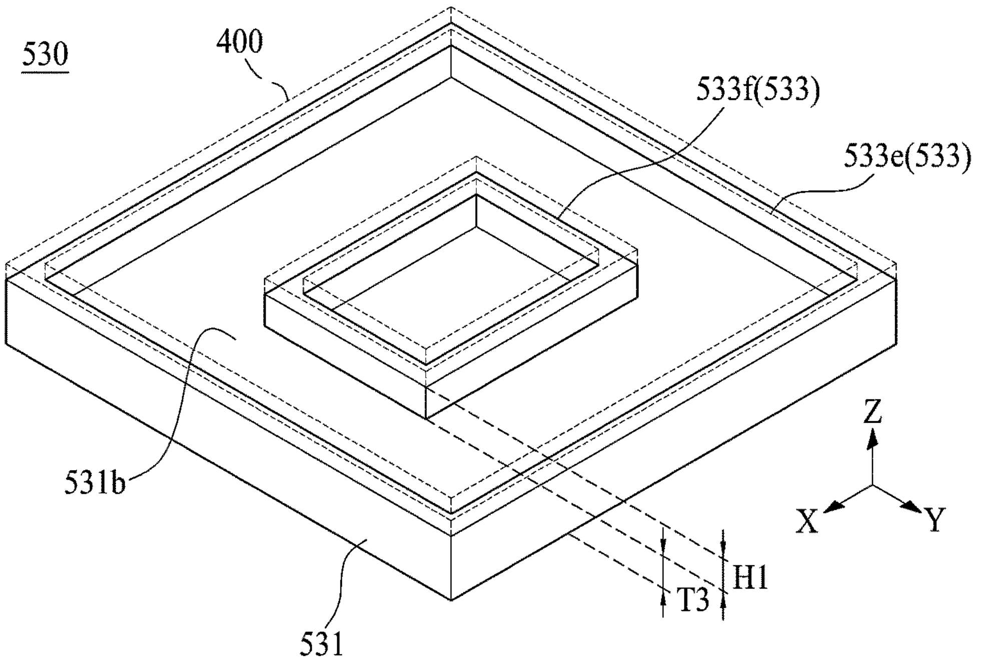
FIG. 9 is a perspective view illustrating a vibration transfer part according to another aspect of the present disclosure.

FIG. 9 is a perspective view illustrating a vibration transfer part according to another aspect of the present disclosure. FIG. 9 illustrates an aspect implemented by modifying the vibration transfer member illustrated in FIG. 3 according to another aspect of the present disclosure.

With reference to FIGS. 2 and 9, a vibration transfer part 530 according to another aspect (or a fifth aspect) of the present disclosure may include a base member 531 and a vibration transfer member 533.

The base member 531 may be configured to support one or more vibration generating parts 510. For example, the base member 531 may be a same or substantially a same as the base member 531 described above with reference to FIG. 3, and thus, repeated descriptions thereof are omitted. The descriptions of the base member 531 described above with reference to FIG. 3 may be included in descriptions of the base member 531 illustrated in FIG. 9.

The base member 531 may be configured to have a third thickness T3. The third thickness T3 of the base member 531 may be a same as or different from the first thickness T1 of the base member 531 illustrated in FIG. 3. For example, the third thickness T3 of the base member 531 may be smaller or greater than the first thickness T1 of the base member 531 illustrated in FIG. 3.

The vibration transfer member 533 according to another aspect of the present disclosure may include a plurality of vibration transfer members 533*e* and 533*f* having a band shape (or a closed loop shape). For example, the vibration transfer member 533 may include a first vibration transfer member 533*e* and a second vibration transfer member 533*f*. Each of the first vibration transfer member 533*e* and the second vibration transfer member 533*f* may be connected or coupled to the rear surface 100*a* of the display member 100 by a connection member 400.

The first vibration transfer member 533*e* may be configured along a periphery portion of the base member 531. For example, the first vibration transfer member 533*e* may be configured at or connected to a periphery portion of a second surface 531*b* of the base member 531. For example, the first vibration transfer member 533*e* may have a shape corresponding to the periphery portion of the base member 531. For example, the first vibration transfer member 533*e* may have a band shape (or a closed loop shape) corresponding to the periphery portion of the base member 531. For example, the first vibration transfer member 533*e* may have a tetragonal band shape, a tetragonal ring shape, or a tetragonal closed loop shape, but aspects of the present disclosure are not limited thereto, the first vibration transfer member 533*e* may also have a pentagonal band shape, a pentagonal ring shape, a pentagonal closed loop shape, a hexagonal band shape, a hexagonal ring shape, a hexagonal closed loop shape, etc.

The second vibration transfer member 533*f* may be configured at or connected to a middle portion between a center portion and a periphery portion of the base member 531. For example, the second vibration transfer member 533*f* may be configured at or connected to a middle portion of the base member 531. For example, the second vibration transfer member 533*f* may be surrounded by the first vibration transfer member 533*e*. For example, the second vibration transfer member 533*f* may be configured at the middle portion of the second surface 531*b* of the base member 531 to surround the center portion of the base member 531 and to be surrounded by the first vibration transfer member 533*e*. For example, the second vibration transfer member 533*f* may have a tetragonal band shape, a tetragonal ring shape, or a tetragonal closed loop shape, but aspects of the present disclosure are not limited thereto, the second vibration transfer member 533*f* may also have a pentagonal band shape, a pentagonal ring shape, a pentagonal closed loop shape, a hexagonal band shape, a hexagonal ring shape, a hexagonal closed loop shape, etc.

According to another aspect of the present disclosure, the first vibration transfer member 533*e* and the second vibration transfer member 533*f* may be configured to have a concentric circular shape. For example, the first vibration transfer member 533*e* and the second vibration transfer member 533*f* may include a circular shape or an oval shape, which has a same center point and different diameters. Accordingly, a vibration transferred to the display member 100 by the first vibration transfer member 533*e* and the second vibration transfer member 533*f* having a circular shape may have a circular mode shape, and thus, a vibration characteristic of the display member 100 may be enhanced.

The vibration transfer member 533 according to another aspect of the present disclosure may include the plurality of vibration transfer members 533*e* and 533*f* having a same shape (for example, a band shape), and thus, may increase (or maximize) a squeeze film effect generated based on a vibration of the display member 100 like the vibration transfer member 533 according to an aspect of the present disclosure described with reference to FIG. 3, thereby enhancing the recognition of a user on an ultrasonic vibration or an ultrasonic haptic and/or a virtual texture. The vibration transfer member 533 according to another aspect of the present disclosure may include the plurality of vibration transfer members 533*e* and 533*f* having the band shape, and thus, may increase (or maximize) a squeeze film effect generated based on a vibration of the display member 100 like the vibration transfer member 533 according to an aspect of the present disclosure described with reference to FIG. 3, thereby enhancing the recognition of a user on an ultrasonic vibration or an ultrasonic haptic and/or a virtual texture. Moreover, the vibration transfer member 533 according to another aspect of the present disclosure may include the plurality of vibration transfer members 533*e* and 533*f* having a same shape (for example, a band shape), and thus, may increase a vibration force (or displacement force) transferred to the display member 100, based on a vibration of each of the one or more vibration generating parts 510 and may change a vibration mode shape of the display member 100. Accordingly, an average vibration displacement amount per unit area of the display member 100 may be maintained, and a frequency of an ultrasonic USW generated based on a vibration of the display member 100 may increase. Furthermore, the vibration transfer member 533 according to another aspect of the present disclosure may include the plurality of vibration transfer members 533*e* and 533*f* having the band shape, and thus, may increase a vibration force (or displacement force) transferred to the display member 100, based on a vibration of each of the one or more vibration generating parts 510 and may change a vibration mode shape of the display member 100. Accordingly, an average vibration displacement amount per unit area of the display member 100 may be maintained, and a frequency of an ultrasonic USW generated based on a vibration of the display member 100 may increase.

Figure 10:
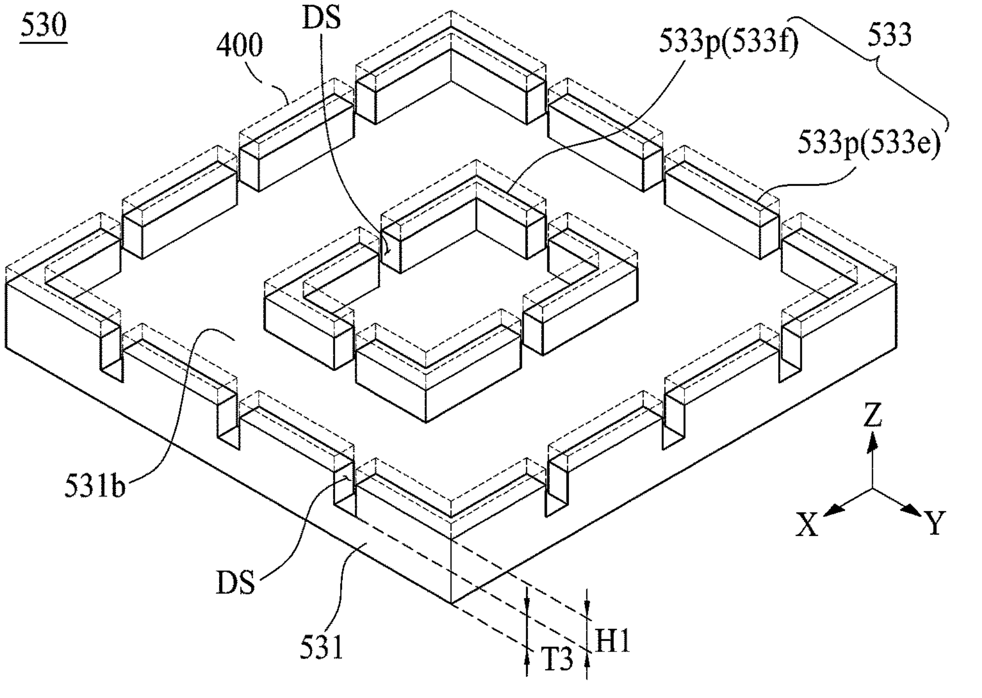
FIG. 10 is a perspective view illustrating a vibration transfer part according to another aspect of the present disclosure.

According to another aspect of the present disclosure, each of the plurality of vibration transfer members 533*e* and 533*f* or the first and second vibration transfer members 533*e* and 533*f*, as illustrated in FIG. 10, may include at least one or more transfer portions 533*p*.

The at least one or more transfer portions 533*p* may correspond to each of the first vibration transfer member 533*e* and the second vibration transfer member 533*f*. For example, the at least one or more transfer portions 533*p* may be configured to have a certain interval (or a predetermined interval). For example, the at least one or more transfer portions 533*p* may be disposed or configured to be spaced apart from each other along a length direction (for example, a first direction X or a second direction Y). Each of the at least one or more transfer portions 533*p* may be configured to have a line shape having a certain length (or a predetermined length), but aspects of the present disclosure are not limited thereto. The at least one or more transfer portions 533*p* may have a same or different height H1.

A separation space DS between the at least one or more transfer portions 533*p* may configure an air duct or a vent area corresponding to a space surrounded by each of the first vibration transfer member 533*e* and the second vibration transfer member 533*f*. Therefore, heat concentrating on a region of the display member 100 corresponding to (or overlapping with) a space surrounded by each of the first vibration transfer member 533*e* and the second vibration transfer member 533*f* may be dispersed, and thus, an image quality defect such as smears or the like caused by an increase in temperature in a local region of the display member 100 may be prevented or reduced.

Figure 11:
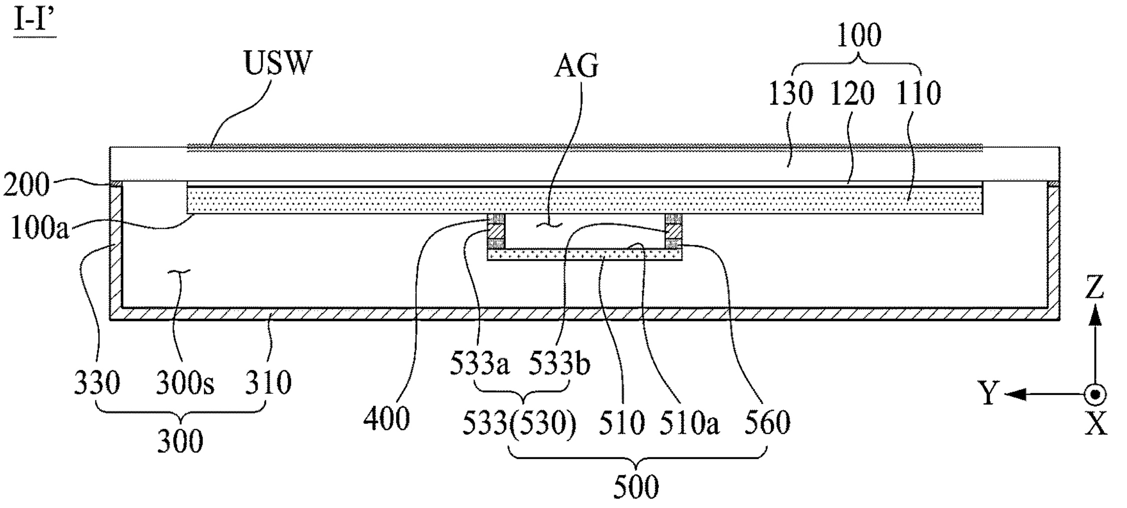
FIG. 11 illustrates a display apparatus according to another aspect of the present disclosure.
Figure 12:
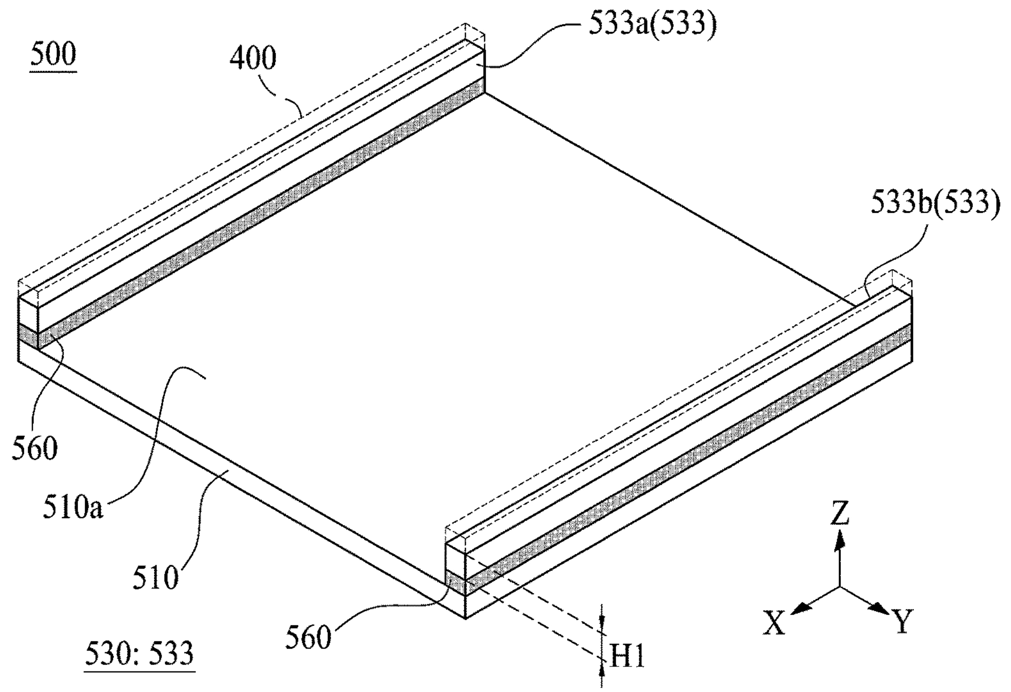
FIG. 12 is a perspective view illustrating a vibration apparatus illustrated in FIG. 11 according to another aspect of the present disclosure.

FIG. 11 illustrates a display apparatus according to another aspect of the present disclosure. FIG. 11 is another cross-sectional view of taken along line I-I' illustrated in FIG. 1 according to another aspect of the present disclosure. FIG. 12 is a perspective view illustrating a vibration apparatus illustrated in FIG. 11 according to another aspect of the present disclosure. FIGS. 11 and 12 illustrate an aspect implemented by modifying the vibration apparatus of the display apparatus according to an aspect of the present disclosure described above with reference to FIGS. 1 to 10. In the following descriptions, therefore, the other elements except the vibration apparatus and relevant elements are referred to by like reference numerals, and thus, repeated descriptions thereof are omitted.

With reference to FIGS. 1, 11, and 12, in a display apparatus according to another aspect (or a second aspect) of the present disclosure, a vibration apparatus 500 may include a vibration generating part 510 and a vibration transfer part 530.

The vibration generating part 510 may include a piezoelectric material which have a piezoelectric characteristic. The vibration generating part 510 may vibrate based on a driving signal to generate (or output) the ultrasonic USW having a frequency of 20 kHz or more. The vibration generating part 510 may be a same as or substantially a same as the vibration generating part 510 described above with reference to FIGS. 2 and 3, and thus, repeated descriptions thereof are omitted.

The vibration transfer part 530 may be configured to transfer a vibration of the vibration generating part 510 to the display member 100. The vibration transfer part 530 may be configured to convert the in-plane vibration mode, transferred to the display member 100, into the out-plane vibration mode based on the vibration of the vibration generating part 510.

The vibration transfer part 530 according to another aspect (or a sixth aspect) of the present disclosure may include a vibration transfer member 533. For example, the vibration transfer part 530 according to another aspect of the present disclosure may include a structure where a base member is omitted or removed in the vibration transfer part 530 described above with reference to FIGS. 1 to 10.

The vibration transfer member 533 may be configured to transfer a vibration of the vibration generating part 510 to the display member 100. The vibration transfer member 533 may be disposed between the display member 100 and the vibration generating part 510. The vibration transfer member 553 may be disposed at or connected to a first surface (e.g., front surface) 510*a* of the vibration generating part 510 facing the display member 100. The vibration transfer member 533 may include a metal material or a plastic material which is a same as or substantially a same as the vibration transfer member 533 described above with reference to FIGS. 2 and 3, and thus, repeated descriptions thereof are omitted The vibration transfer member 533 may be attached at or connected to the first surface 510*a* of the vibration generating part 510. For example, the vibration transfer member 533 may be attached at the first surface 510*a* of the vibration generating part 510 by an adhesive member 560. The adhesive member 560 may be a same as or substantially a same as the adhesive member 560 described above with reference to FIG. 2, and thus, repeated descriptions thereof are omitted.

The vibration transfer member 533 may be connected or coupled to a rear surface 100*a* of the display member 100. For example, the vibration transfer member 533 may be connected or coupled to the rear surface 100*a* of the display member 100 (or a display panel 110) by a connection member 400. The connection member 400 may be a same as or substantially a same as the connection member 400 described above with reference to FIG. 2, and thus, repeated descriptions thereof are omitted.

The vibration transfer member 533 according to another aspect of the present disclosure may include a first vibration transfer member 533*a* and a second vibration transfer member 533*b*. For example, the vibration transfer member 533 may include the first vibration transfer member 533*a* and the second vibration transfer member 533*b*, which are disposed at or connected to both periphery portions or both end portions of the vibration generating part 510. The first vibration transfer member 533*a* and the second vibration transfer member 533*b* may include a metal material or a plastic material which is a same or substantially a same as the first vibration transfer member 533*a* and the second vibration transfer member 533*b* described above with reference to FIGS. 2 and 3.

The first vibration transfer member 533*a* may be disposed at or connected to a first periphery portion or a first lateral end portion of the first surface 510*a* of the vibration generating part 510. For example, the first vibration transfer member 533*a* may be disposed at or connected to the first periphery portion or the first lateral end portion of the first surface 510*a* of the vibration generating part 510. For example, the first vibration transfer member 533*a* may be configured to have the first height (or thickness) H1.

The second vibration transfer member 533*b* may be disposed at or connected to a second periphery portion or a second lateral end portion of the vibration generating part 510 in parallel to the first vibration transfer member 533*a*. For example, the second vibration transfer member 533*b* may be configured at or connected to the second periphery portion or the second lateral end portion of the first surface 510*a* of the vibration generating part 510 in parallel to the first vibration transfer member 533*a*. For example, the second vibration transfer member 533*b* may be configured to have the first height (or thickness) H1.

Each of the first vibration transfer member 533*a* and the second vibration transfer member 533*b* may include a line shape. For example, each of the first vibration transfer member 533*a* and the second vibration transfer member 533*b* may include the line shape which extends along a first direction X and has a predetermined width in parallel to a second direction Y. Each of the first vibration transfer member 533*a* and the second vibration transfer member 533*b* may be connected to or coupled to the rear surface 100*a* of the display member 100 by the connection member 400.

The vibration transfer part 530 according to another aspect of the present disclosure may include the vibration transfer member 533 including the plurality of vibration transfer members 533*a* and 533*b* which is connected to the vibration generating part 510, and thus, may increase (or maximize) a squeeze film effect generated based on a vibration of the display member 100 like the vibration transfer part 530 according to an aspect of the present disclosure described with reference to FIG. 3, thereby enhancing the recognition of a user on an ultrasonic vibration or an ultrasonic haptic and/or a virtual texture.

The vibration transfer part 530 including the vibration transfer member 533 having the plurality of vibration transfer members 533*a* and 533*b* described above with reference to FIGS. 11 and 12 may be identically applied to the vibration transfer part 530 described above with reference to FIGS. 5 to 10. For example, the base member 531 may be omitted or removed, and the vibration transfer part 530 described above with reference to FIGS. 5 to 8 may include a plurality of vibration transfer members 533*a* to 533*d* or first to fourth vibration transfer members 533*a* to 533*d*, which are configured at or connected to predetermined positions of the first surface 510*a* of the vibration generating part 510.

Each of the first to fourth vibration transfer members 533*a* to 533*d* may include at least one or more transfer portions. For example, each of the first to fourth vibration transfer members 533*a* to 533*d* may include at least one or more transfer portions having a certain interval (or predetermined interval). For example, the base member 531 may be omitted or removed, and the vibration transfer part 530 described above with reference to FIGS. 9 and 10 may include a plurality of vibration transfer members 533_a_ to 533_d_ having a band shape or first and second vibration transfer members 533_e_ and 533_f_ having a band shape, which are configured at or connected to the first surface 510_a_ of the vibration generating part 510. Each of the first and second vibration transfer members 533_e_ and 533_f_ having the band shape may include at least one or more transfer portions. For example, each of the first and second vibration transfer members 533_e_ and 533_f_ having the band shape may include at least one or more transfer portions having the certain interval (or pre-determined interval).

Figure 13:
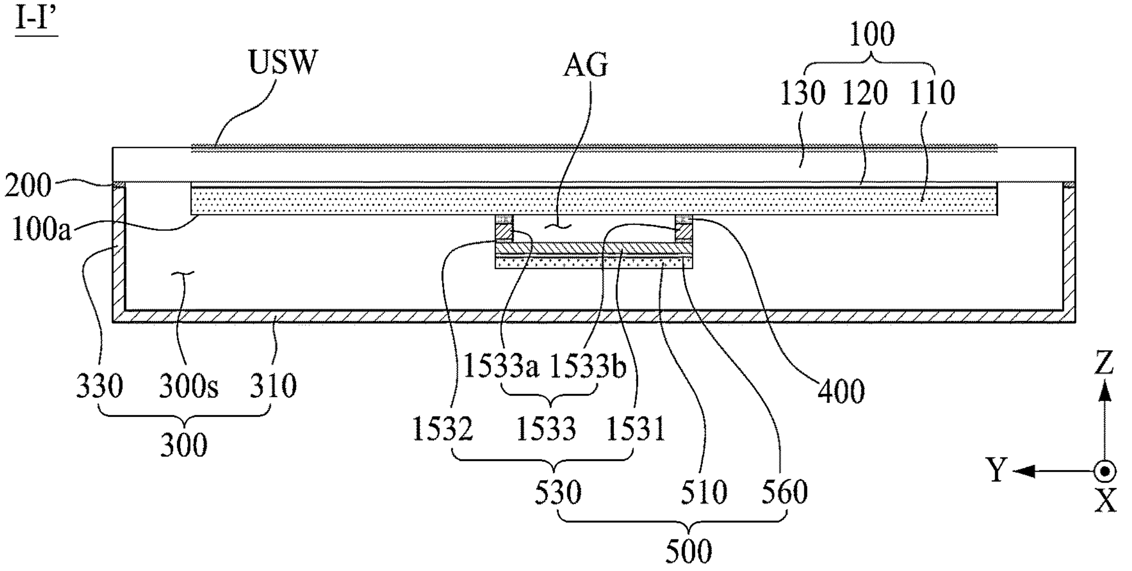
FIG. 13 is another cross-sectional view of a display apparatus taken along line I-I' illustrated in FIG. 1 according to another aspect of the present disclosure.
Figure 14:
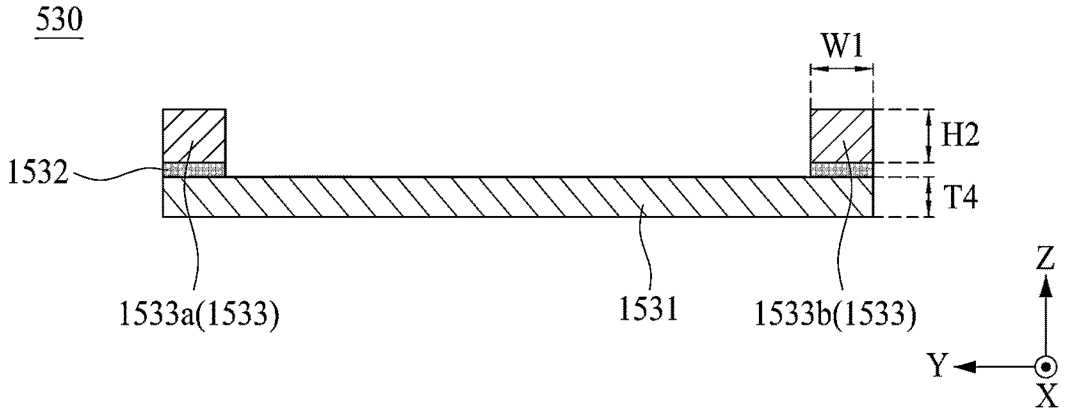
FIG. 14 is a cross-sectional view illustrating a vibration transfer part illustrated in FIG. 13 according to another aspect of the present disclosure.
Figure 15:
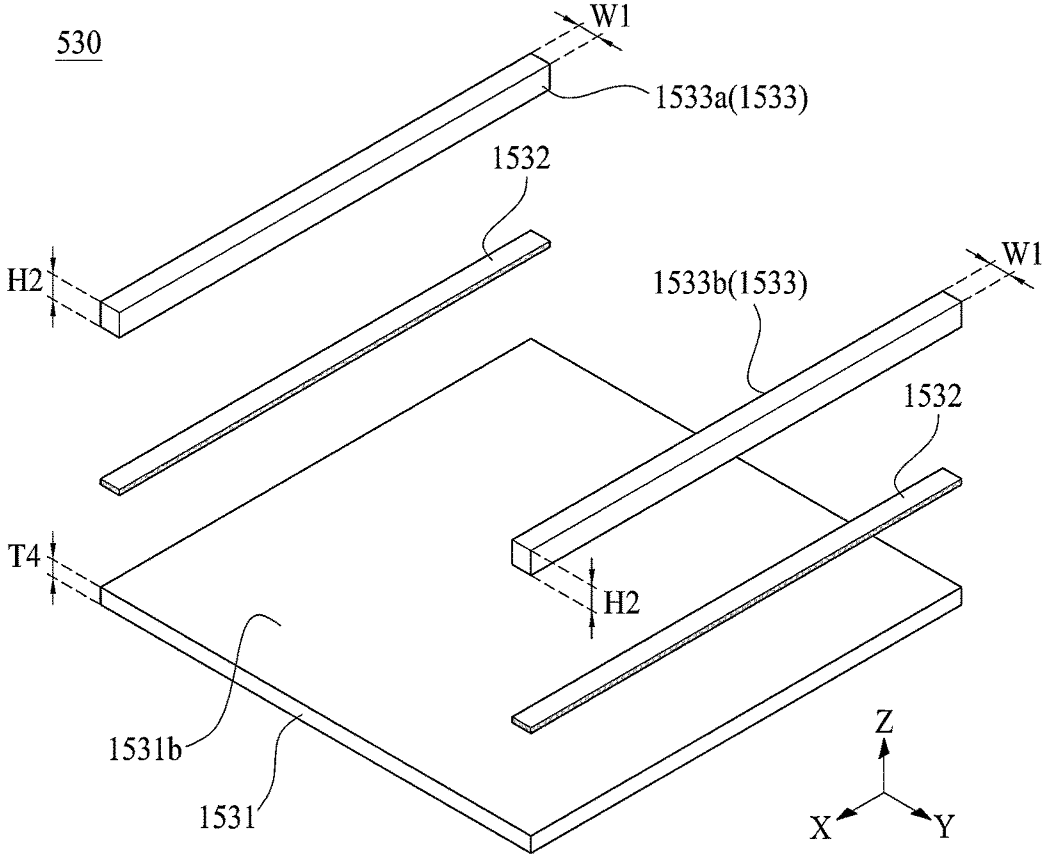
FIG. 15 is an exploded perspective view illustrating a vibration transfer part illustrated in FIG. 14 according to another aspect of the present disclosure.

FIG. 13 illustrates a display apparatus according to another aspect of the present disclosure. FIG. 13 is another cross-sectional view of taken along line I-I' illustrated in FIG. 1 according to another aspect of the present disclosure. FIG. 14 is a cross-sectional view illustrating a vibration transfer part illustrated in FIG. 13 according to another aspect of the present disclosure. FIG. 15 is an exploded perspective view illustrating a vibration transfer part illustrated in FIG. 14 according to another aspect of the present disclosure. FIGS. 13 to 15 illustrate an aspect implemented by modifying the vibration transfer part of the vibration apparatus described above with reference to FIGS. 1 to 12. In the following descriptions, therefore, the other elements except the vibration transfer part and relevant elements are referred to by like reference numerals, and thus, repeated descriptions thereof are omitted.

With reference to FIGS. 1 and 13 to 15, in a display apparatus according to another aspect (or a third aspect) of the present disclosure, a vibration transfer part 530 according to another aspect (or a seventh aspect) of the present disclosure may include a base member 1531 and a vibration transfer member 1533.

The base member 1531 may be configured to vibrate based on vibrations (or displacement or driving) of the one or more vibration generating parts 510. The base member 1531 may be configured to support the one or more vibration generating parts 510. The base member 1531 may be disposed between the display member 100 and the vibration generating part 510. For example, the base member 1531 may be a same or substantially a same as the base member 531 described above with reference to FIG. 3, and thus, repeated descriptions thereof are omitted. The descriptions of the base member 531 described above with reference to FIG. 3 may be included in descriptions of the base member 1531 illustrated in FIGS. 13 to 15.

The base member 1531 may be configured to have a fourth thickness T4. The fourth thickness T4 of the base member 1531 may be a same as or different from the first thickness T1 of the base member 531 illustrated in FIG. 3. For example, the fourth thickness T4 of the base member 1531 may be smaller or greater than or equal to the first thickness T1 of the base member 531 illustrated in FIG. 3. For example, the fourth thickness T4 of the base member 1531 may be 0.1 mm or more, based on a resonance frequency of the display member 100 and/or a frequency of an ultrasonic USW generated based on a vibration of the display member 100. For example, the fourth thickness T4 may be 0.1 mm or more and 5 mm or less, but aspects of the present disclosure are not limited thereto.

According to another aspect of the present disclosure, the resonance frequency of the display member 100 and/or a resonance frequency of the vibration generating part 510 may increase as the fourth thickness T4 of the base member 1531 decreases, and thus, the fourth thickness T4 of the base member 1531 may be adjusted to 0.1 mm or more and 5 mm or less, based on the resonance frequency of the display member 100 and/or the frequency of the ultrasonic USW generated based on the vibration of the display member 100. For example, the fourth thickness T4 of the base member 1531 may be adjusted to 0.3 mm or more and 2.5 mm or less, for slimming of a vibration apparatus, but aspects of the present disclosure are not limited thereto.

The base member 1531 may include a material having relatively low stiffness (or modulus or Young's modulus). For example, the base member 1531 may be configured in a material having a modulus or Young's modulus of 1 GPa (gigapascal) or more. For example, the base member 1531 may be configured in a soft material having a ductile (or an elastic) characteristic. Accordingly, the base member 1531 may more smoothly or freely vibrate (or displace or drive) based on the vibrations (or displacement or driving) of the one or more vibration generating parts 510.

The base member 1531 according to another aspect of the present disclosure may include a metal material or a plastic material.

According to another aspect of the present disclosure, the base member 1531 may include any one or more materials of stainless steel, aluminum (Al), an Al alloy, a magnesium (Mg), a Mg alloy, copper (Cu) alloy, and a magnesium-lithium (Mg—Li) alloy, but aspects of the present disclosure are not limited thereto.

According to another aspect of the present disclosure, the base member 1531 may be configured as a plastic material such as plastic or styrene material, but aspects of the present disclosure are not limited thereto. For example, the plastic material of the base member 1531 may be configured as polycarbonate (PC), polyethylene terephthalate (PET), polyarylate (PAR), polyethylene naphthalate (PEN), polysulfone (PSF), polyethersulfone (PES), or cyclo-olefin copolymer (COC), or the like, but aspects of the present disclosure are not limited thereto. For example, the styrene material may be an ABS material. The ABS material may be acrylonitrile, butadiene, and styrene.

The vibration transfer member 1533 may be configured to transfer a vibration of the base member 1531 to the display member 100. The vibration transfer member 1533 may be configured between the base member 1531 and the display member 100. The vibration transfer member 1533 may be configured at or connected to a second surface (or front surface) 1531_b_ of the base member 1531 facing the display member 100. For example, the vibration transfer member 1533 may be configured at or connected to both periphery portions or both end portions of the base member 1531. For example, the vibration transfer member 1533 may be connected or coupled to a rear surface 100_a_ of the display member 100.

The vibration transfer member 1533 according to another aspect of the present disclosure may be configured in a material different from the base member 1531. For example, the vibration transfer member 1533 may be configured in a material having stiffness (or modulus or Young's modulus) which is higher than the base member 1531. For example, the vibration transfer member 1533 may be configured in a material having a modulus or Young's modulus of 1 GPa (gigapascal) or more. For example, the vibration transfer member 1533 may be configured in a hard material which have a stiffer characteristic than the base member 1531. Therefore, the vibration transfer member 1533 may include a material which differs from the base member 1531, or may include a material having stiffness which is higher than that of the base member 1531, and thus, a vibration (or vibration force or displacement force) of the base member 1531 based on the vibrations (or displacement or driving) of the one or more vibration generating parts 510 may be transferred to the display member 100 without being lost. Accordingly, a vibration force (or displacement force) transferred to the display member 100 may more increase based on the vibrations of the one or more vibration generating parts 510, and thus, an ultrasonic USW having a higher frequency (or resonance frequency) may be generated (or output) based on a vibration of the display member 100, thereby more enhancing the recognition of a user on a virtual texture and/or an ultrasonic vibration or an ultrasonic haptic.

The vibration transfer member 1533 according to another aspect of the present disclosure may include a metal material or a plastic material different from the base member 1531. According to another aspect of the present disclosure, the base member 1531 may be configured in the plastic material, and the vibration transfer member 1533 may be configured in the metal material, but aspects of the present disclosure are not limited thereto. Alternatively, the base member 1531 may be configured in the metal material, and the vibration transfer member 1533 may be configured in the plastic material.

The vibration transfer member 1533 according to another aspect of the present disclosure may include a first vibration transfer member 1533*a* and a second vibration transfer member 1533*b*. For example, the vibration transfer member 1533 may include the first vibration transfer member 1533*a* and the second vibration transfer member 1533*b*, which are configured at or connected to both periphery portions or both end portions of the base member 1531. Except for that a first vibration transfer member 1533*a* and a second vibration transfer member 1533*b* include materials which differ from the base member 1531, the first vibration transfer member 1533*a* and the second vibration transfer member 1533*b* may be a same as or substantially a same as the first vibration transfer member 533*a* and the second vibration transfer member 533*b* described above with reference to FIGS. 2 and 3, and thus, repeated descriptions thereof are omitted. Thus, descriptions of the first vibration transfer member 533*a* and the second vibration transfer member 533*b* described above with reference to FIGS. 2 and 3 may be included in descriptions of the first vibration transfer member 1533*a* and the second vibration transfer member 1533*b* illustrated in FIGS. 13 to 15.

According to another aspect of the present disclosure, the vibration transfer member 1533 or each of the first vibration transfer member 1533*a* and the second vibration transfer member 1533*b* may include one or more materials having stiffness which is higher than the base member 1531 of stainless steel, aluminum (Al), an Al alloy, a magnesium (Mg), a Mg alloy, copper (Cu) alloy, and a magnesium-lithium (Mg—Li) alloy, but aspects of the present disclosure are not limited thereto.

According to another aspect of the present disclosure, the vibration transfer member 1533 or each of the first vibration transfer member 1533*a* and the second vibration transfer member 1533*b* may include one or more materials having stiffness which is higher than the base member 1531 of polycarbonate (PC), polyethylene terephthalate (PET), polyarylate (PAR), polyethylene naphthalate (PEN), polysulfone (PSF), polyethersulfone (PES), or cyclo-olefin copolymer (COC), or the like, but aspects of the present disclosure are not limited thereto.

The vibration transfer member 1533 or each of the first vibration transfer member 1533*a* and the second vibration transfer member 1533*b* may be configured to have a second height (or thickness) H2. For example, the vibration transfer member 1533 or each of the first vibration transfer member 1533*a* and the second vibration transfer member 1533*b* may be configured to have the second height (or thickness) H2 from a second surface 1531*b* of the base member 1531. For example, the second height H2 of each of the vibration transfer member 1533 or the first vibration transfer member 1533*a* and the second vibration transfer member 1533*b* may be a length (or distance) between the second surface 1531*b* of the base member 1531 and an uppermost surface of the vibration transfer member 1533, in a third direction Z. For example, the second height H2 of each of the vibration transfer member 1533 or the first vibration transfer member 1533*a* and the second vibration transfer member 1533*b* may be a same as or different from the fourth thickness T4 of the base member 1531. For example, the second height H2 of each of the vibration transfer member 1533 or the first vibration transfer member 1533*a* and the second vibration transfer member 1533*b* may be 0.1 mm or more, based on a resonance frequency of the display member 100 and/or a frequency of an ultrasonic USW generated based on a vibration of the display member 100. For example, the second height H2 may be 0.1 mm or more and 5 mm or less, but aspects of the present disclosure are not limited thereto.

According to another aspect of the present disclosure, the resonance frequency of the display member 100 and/or a resonance frequency of the vibration generating part 510 may increase as the second height H2 of each of the vibration transfer member 1533 or the first vibration transfer member 1533*a* and the second vibration transfer member 1533*b* decreases, and thus, the second height H2 of each of the vibration transfer member 1533 or the first vibration transfer member 1533*a* and the second vibration transfer member 1533*b* may be adjusted to 0.1 mm or more and 5 mm or less, based on the resonance frequency of the display member 100 and/or the frequency of the ultrasonic USW generated based on the vibration of the display member 100. For example, the second height H2 may be adjusted to 0.5 mm or more and 3.5 mm or less, for slimming of a vibration apparatus, but aspects of the present disclosure are not limited thereto.

The vibration transfer member 1533 or each of the first vibration transfer member 1533*a* and the second vibration transfer member 1533*b* may have a first width W1. For example, the first width W1 may be a width of a cross-sectional surface parallel to the second direction Y among cross-sectional surfaces of the vibration transfer member 1533 or each of the first vibration transfer member 1533*a* and the second vibration transfer member 1533*b*. For example, the first width W1 may be a same as or different from one or more of the second height H2 and the fourth thickness T4 of the base member 1531. For example, the first width W1 may be 0.1 mm or more, based on a resonance frequency of the display member 100 and/or a frequency of an ultrasonic USW generated based on a vibration of the display member 100. For example, the first width W1 may be 0.1 mm or more and 7 mm or less, but aspects of the present disclosure are not limited thereto.

According to another aspect of the present disclosure, the resonance frequency of the display member 100 and/or a resonance frequency of the one or more vibration generating parts 510 may increase as the first width W of the vibration transfer member 1533 or each of the first vibration transfer member 1533*a* and the second vibration transfer member 1533*b* increases, and thus, the first width W1 of the vibration transfer member 1533 or each of the first vibration transfer member 1533*a* and the second vibration transfer member 1533*b* may be adjusted to 0.1 mm or more and 7 mm or less, based on the resonance frequency of the display member 100 and/or a frequency of an ultrasonic USW generated based on a vibration of the display member 100. For example, the first width W1 may be adjusted to 1.5 mm or more and 5 mm or less, for realizing the lightness of a vibration apparatus, but aspects of the present disclosure are not limited thereto.

The vibration transfer member 1533 may be attached on or connected to a second surface (or front surface) 531*b* of the base member 1531. For example, the vibration transfer member 1533 may be attached on or connected to a second surface (or front surface) 1531*b* of the base member 1531 by an adhesive member 1532.

The adhesive member 1532 may be between the vibration transfer member 1533 and the base member 1531. For example, the adhesive member 1532 may be disposed (or interposed) at a region between the vibration transfer member 1533 and the base member 1531. For example, the adhesive member 1532 may be disposed (or interposed) at a region between the base member 1531 and each of the first vibration transfer member 1533*a* and the second vibration transfer member 1533*b*. For example, the adhesive member 1532 may be disposed (or interposed) at a region between the second surface (or front surface) 1531*b* of the base member 1531 and an entire rear surface of each of the first vibration transfer member 1533*a* and the second vibration transfer member 1533*b*, to minimize (or prevent or reduce) the loss of a vibration caused by the adhesive member 1532. For example, the adhesive member 1532 may be a third connection member, a third adhesive member, or a fixing member, but aspects of the present disclosure are not limited thereto. For example, the adhesive member 1532 may be a double-sided tape, an adhesive, bond, a thermo-curable adhesive, a photo-curable adhesive, a thermal bonding (or a thermosetting) adhesive, an adhesive resin, or a thermo-curable resin, or the like, but aspects of the present disclosure are not limited thereto. For example, the adhesive member 1532 may further include a vibration transfer particle included in an adhesive material (or adhesive layer). For example, the vibration transfer particle may include piezoelectric materials (or metal materials, metal nanowires, or metal nanoparticles) added in an adhesive material (or adhesive layer), but aspects of the present disclosure are not limited thereto.

The display apparatus according to another aspect (or third aspect) of the present disclosure may provide substantially a same effect as the display apparatus according to the first and second aspects of the present disclosure. Moreover, according to the third aspect of the present disclosure, by using the base member 1531 and the vibration transfer member 1533 of the vibration transfer part 530, an in-plane vibration mode based on a vibration of the vibration generating part 510 may be converted into an out-plane vibration mode to vibrate the display member 100, and thus, an ultrasonic vibration or an ultrasonic haptic may be provided to a user. Furthermore, according to another aspect of the present disclosure, the base member 1531 and the vibration transfer member 1533 of the vibration transfer part 530 may include different materials, and thus, a vibration force (or displacement force) transferred to the display member 100 may more increase based on a vibration of the vibration generating part 510, thereby increasing a frequency of an ultrasonic USW generated based on a vibration of the display member 100. Accordingly, a squeeze film effect of the ultrasonic USW generated based on a vibration of the display member 100 may be more enhanced, thereby enhancing the recognition of a user on a virtual texture and/or an ultrasonic vibration or an ultrasonic haptic.

In addition, according to another aspect of the present disclosure, a frequency of an ultrasonic haptic or an ultrasonic vibration may be optimized or maximized to correspond to a resonance frequency of a vibration object, based on the material and the thickness T4 of the base member 1531 configuring the vibration transfer part 530 and/or the material, the height H2, and the width W1 of the vibration transfer member 1533.

Figure 16:
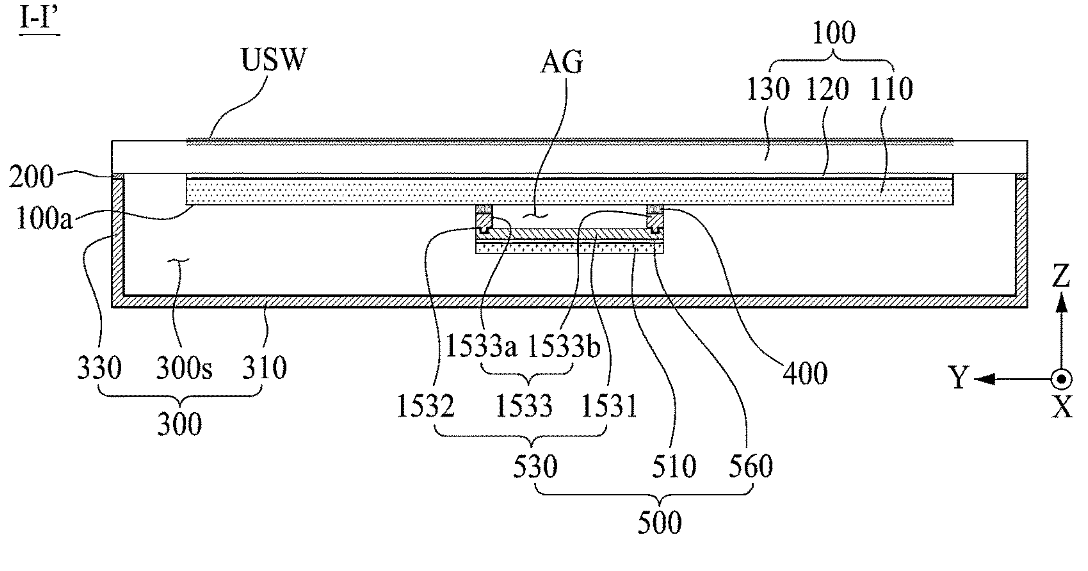
FIG. 16 is another cross-sectional view of a display apparatus taken along line I-I' illustrated in FIG. 1 according to another aspect of the present disclosure.
Figure 17:
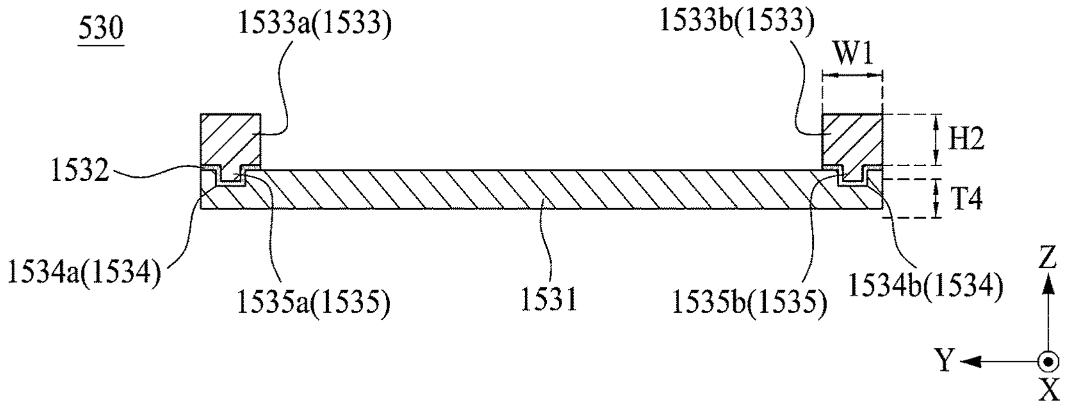
FIG. 17 is a cross-sectional view illustrating a vibration transfer part illustrated in FIG. 16 according to another aspect of the present disclosure.
Figure 18:
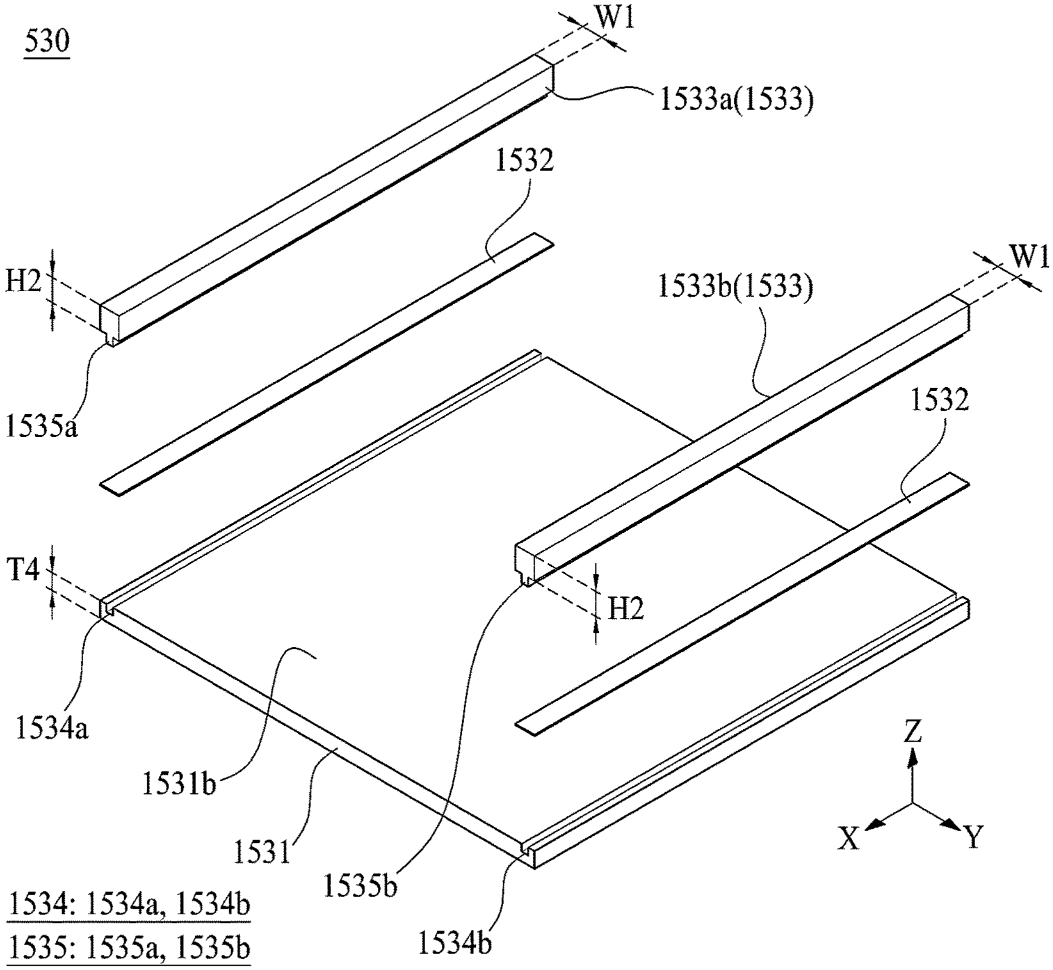
FIG. 18 is an exploded perspective view illustrating a vibration transfer part illustrated in FIG. 17 according to another aspect of the present disclosure.

FIG. 16 illustrates a display apparatus according to another aspect of the present disclosure. FIG. 16 is another cross-sectional view of taken along line I-I' illustrated in FIG. 1 according to another aspect of the present disclosure. FIG. 17 is a cross-sectional view illustrating a vibration transfer part illustrated in FIG. 16 according to another aspect of the present disclosure. FIG. 18 is an exploded perspective view illustrating a vibration transfer part illustrated in FIG. 17 according to another aspect of the present disclosure. FIGS. 16 to 18 illustrate an aspect implemented by modifying a method of attaching a base member on a vibration transfer member in the vibration transfer part described above with reference to FIGS. 13 to 15. In the following description, therefore, the other elements except a method of attaching a base member on a vibration transfer member and relevant elements may be referred to by like reference numerals, and thus, repeated descriptions thereof are omitted.

With reference to FIGS. 1 and 16 to 18, in a display apparatus according to another aspect (or a fourth aspect) of the present disclosure, a vibration transfer part 530 according to another aspect of the present disclosure may include a base member 1531, a vibration transfer member 1533, a first connection part 1534, and a second connection part 1535.

The base member 1531 may be configured to vibrate based on vibrations (or displacement or driving) of the one or more vibration generating parts 510. The base member 1531 may be configured to support the one or more vibration generating parts 510. For example, the base member 1531 may be a same or substantially a same as the base member 1531 described above with reference to FIGS. 13 to 15, and thus, repeated descriptions thereof are omitted. The descriptions of the base member 1531 described above with reference to FIGS. 13 to 15 may be included in descriptions of the base member 1531 illustrated in FIGS. 16 to 18.

The vibration transfer member 1533 may be configured to transfer a vibration of the base member 1531 to the display member 100. The vibration transfer member 1533 may be configured between the base member 1531 and the display member 100. The vibration transfer member 1533 may be configured at or connected to a second surface (or front surface) 1531*b* of the base member 1531 facing the display member 100. The vibration transfer member 1533 may include a first vibration transfer member 1533*a* and a second vibration transfer member 1533*b*.

The vibration transfer member 1533, or the first vibration transfer member 1533*a* and the second vibration transfer member 1533*b* may be a same as or substantially a same as the vibration transfer member 1533, or the first vibration transfer member 1533*a* and the second vibration transfer member 1533*b* described above with reference to FIGS. 13 to 15 and 3, and thus, repeated descriptions thereof are omitted. Thus, descriptions of the vibration transfer member 1533, or the first vibration transfer member 1533*a* and the second vibration transfer member 1533*b* described above with reference to FIGS. 13 to 15 may be included in descriptions of the vibration transfer member 1533, or the first vibration transfer member 1533*a* and the second vibration transfer member 1533*b* illustrated in FIGS. 16 to 18.

The first connection part 1534 may be formed (or configured) at one of the base member 1531 and the vibration transfer member 1533, and the second connection portion 1535 may be formed (or configured) at the other of the base member 1531 and the vibration transfer member 1533. For example, the first connection part 1534 may be formed at the base member 1531, and the second connection part 1535 may be formed at the vibration transfer member 1533, but aspects of the present disclosure are not limited thereto. For example, the first connection part 1534 may be formed at the vibration transfer member 1533 or the first vibration transfer member 1533*a* and the second vibration transfer member 1533*b*, and the second connection part 1535 may be formed at the base member 1531.

The first connection part 1534 may include grooves 1534*a* and 1534*b* which are formed at the base member 1531. The first connection part 1534 may include the grooves 1534*a* and 1534*b* which are concavely formed from a second surface 1531*b* of the base member 1531. For example, the first connection part 1534 may include grooves 1534*a* and 1534*b* which are concavely formed to have a predetermined depth from the second surface 1531*b* of the base member 1531 corresponding to (or overlapping) each of the first vibration transfer member 1533*a* and the second vibration transfer member 1533*b*. For example, the first connection part 1534 may include the grooves 1534*a* and 1534*b* which are concavely formed to have a line shape extending along a first direction X.

The first connection part 1534 according to another aspect of the present disclosure may include a first groove 1534*a* and a second groove 1534*b*. Each of the first groove 1534*a* and the second groove 1534*b* may be formed concavely from the second surface 1531*b* of the base member 1531 to have a predetermined depth. For example, each of the first groove 1534*a* and the second groove 1534*b* may be concavely formed to have a line shape extending along the first direction X.

The first groove 1534*a* may be concavely formed (or configured) to have a predetermined depth from a first periphery portion of the second surface 1531*b* of the base member 1531 corresponding to (or overlapping) of the first vibration transfer member 1533*a*. The second groove 1534*b* may be concavely formed (or configured) to have a predetermined depth from a second periphery portion of the second surface 1531*b* of the base member 1531 corresponding to (or overlapping) of the second vibration transfer member 1533*b*. For example, each of the first groove 1534*a* and the second groove 1534*b* may be aligned a position of each of the first vibration transfer member 1533*a* and the second vibration transfer member 1533*b* attached on (or connected to) the base member 1531.

According to an aspect of the present disclosure, the first connection part 1534 or the first and second grooves 1534*a* and 1534*b* may have a cross-sectional shape having a tetragonal shape, a triangular shape, or a circular shape, but aspects of the present disclosure are not limited thereto, the first connection part 1534 or the first and second grooves 1534*a* and 1534*b* may also have another polygon shape or an oval shape such as an elliptic shape. For example, the first connection part 1534 or the first and second grooves 1534*a* and 1534*b* may be a groove line, an accommodating groove, an accommodating line, a first connection line, a first align groove, or a first align groove line, but aspects of the present disclosure are not limited thereto.

The second connection part 1535 may include protrusions 1535*a* and 1535*b* which are convexly formed (or configured) at the vibration transfer member 1533 or the first vibration transfer member 1533*a* and the second vibration transfer member 1533*b* to correspond to (or overlap) the first connection part 1534. For example, the second connection part 1535 may include protrusions 1535*a* and 1535*b* which are convexly formed to have a predetermined height from the vibration transfer member 1533 or the first vibration transfer member 1533*a* and the second vibration transfer member 1533*b* to correspond to (or overlap) the first connection part 1534. For example, the second connection part 1535 may include protrusions 1535*a* and 1535*b* which are convexly formed to have a line shape extending along the first direction X.

The second connection part 1535 according to another aspect of the present disclosure may include a first protrusion 1535*a* and a second protrusion 1535*b*. Each of the first protrusion 1535*a* and the second protrusion 1535*b* may be formed convexly toward the base member 1531 from the vibration transfer member 1533 or the first vibration transfer member 1533*a* and the second vibration transfer member 1533*b* to have a predetermined height. For example, each of the first protrusion 1535*a* and the second protrusion 1535*b* may be configured to have a width and a height, which enable the first protrusion 1535*a* and the second protrusion 1535*b* to be respectively accommodated (or inserted) into the first groove 1534*a* and the second groove 1534*b* of the first connection part 1534. For example, each of the first protrusion 1535*a* and the second protrusion 1535*b* may be convexly formed to have the line shape extending along the first direction X.

The first protrusion 1535*a* may be convexly formed (or configured) to have a predetermined height from a rear surface of the first vibration transfer member 1533*a* corresponding to (or overlapping) the first groove 1534*a*. For example, the first protrusion 1535*a* may protrude from the rear surface of the first vibration transfer member 1533*a* to have a width and a height, which enable the first protrusion 1535*a* to be accommodated (or inserted) into the first groove 1534*a*. The second protrusion 1535*b* may be convexly formed (or configured) to have a predetermined height from a rear surface of the second vibration transfer member 1533*b* corresponding to (or overlapping) the second groove 1534*b*. For example, the second protrusion 1535*b* may protrude from the rear surface of the second vibration transfer member 1533*b* to have a width and a height, which enable the second protrusion 1535*b* to be accommodated (or inserted) into the second groove 1534*b*.

According to another aspect of the present disclosure, the second connection part 1535 or the first protrusion 1535*a* and the second protrusion 1535*b* may have a cross-sectional shape corresponding to a cross-sectional shape of the first connection part 1534 or the first groove 1534*a* and the second groove 1534*b*. For example, the second connection part 1535 or the first protrusion 1535*a* and the second protrusion 1535*b* may be a projection line, a protrusion line, an inserting line, a second connection line, an align protrusion, or an align protrusion line, but aspects of the present disclosure are not limited thereto.

According to an aspect of the present disclosure, the second connection part 1535 may be accommodated (or inserted) into the first connection part 1534. According to an aspect of the present disclosure, the second connection part 1535 may be accommodated (or inserted) into the first connection part 1534 by a tight-fitting scheme, and thus, the vibration transfer member 1533 may be connected to the base member 1531. According to another aspect of the present disclosure, the second connection part 1535 may be accommodated (or inserted) into the first connection part 1534 by an adhesive member 1532 and may be attached at or connected to the base member 1531 by the adhesive member 1532.

According to an aspect of the present disclosure, the first protrusion 1535*a* of the second connection part 1535 may be accommodated (or inserted) into the first groove 1534*a* of the first connection part 1534. According to an aspect of the present disclosure, the first protrusion 1535*a* of the second connection portion 1535 may be accommodated (or inserted) into the first groove 1534*a* of the first connection part 1534 by a tight-fitting scheme, and thus, the vibration transfer member 1533 may be connected to the base member 1531. According to another aspect of the present disclosure, the first protrusion 1535*a* of the second connection part 1535 may be accommodated (or inserted) into the first groove 1534*a* of the first connection part 1534 by the adhesive member 1532 and may be attached at or connected to the base member 1531 by the adhesive member 1532.

For example, the adhesive member 1532 may be an adhesive, bond, a thermo-curable adhesive, a photo-curable adhesive, a thermal bonding (or a thermosetting) adhesive, an adhesive resin, or a thermo-curable resin, or the like, but aspects of the present disclosure are not limited thereto. For example, the adhesive member 1532 may further include a vibration transfer particle included in an adhesive material (or adhesive layer). For example, the vibration transfer particle may include piezoelectric materials (or metal materials, metal nanowires, or metal nanoparticles) added in an adhesive material (or adhesive layer), but aspects of the present disclosure are not limited thereto.

The display apparatus according to the fourth aspect of the present disclosure may provide substantially a same effect as the display apparatus according to the third aspect of the present disclosure. Moreover, according to the fourth aspect of the present disclosure, the base member 1531 and the vibration transfer member 1533 of the vibration transfer part 530 may be attached at or connected to each other by a structure of each of the grooves 1534*a* and 1534*b* and the protrusions 1535*a* and 1535*b*, and thus, the assembly of the base member 1531 and the vibration transfer member 1533 may be enhanced, or the position alignment of the vibration transfer member 1533 attached on the base member 1531 may be easily performed.

According to another aspect of the present disclosure, the vibration transfer part 530 including the base member 1531, the vibration transfer member 1533, and the adhesive member 1532 described above with reference to FIGS. 13 to 18 may be identically applied to the vibration transfer part 530 described above with reference to FIGS. 5 to 10. For example, in the vibration transfer part 530 described above with reference to FIGS. 5 to 10, the plurality of vibration transfer members 553*a* to 553*d* and the base member 531 may include different materials, and the plurality of vibration transfer members 533*a* to 533*d* may be attached at the base member 531 by the adhesive member 532. For example, each of the plurality of vibration transfer members 533*a* to 533*d* may include at least one or more transfer portions having the certain interval (or predetermined interval).

According to another aspect of the present disclosure, in the vibration transfer part 530 described above with reference to FIGS. 9 and 10, the plurality of vibration transfer members 553*a* to 553*d* having the band shape and the base member 1531 may be different materials, and the plurality of vibration transfer members 553*a* to 553*d* having the band shape may be attached at the base member 1531 by the adhesive member 1532. Each of the plurality of vibration transfer members 553*a* to 553*d* may include at least one or more transfer portions having the certain interval (or predetermined interval).

Figure 19:
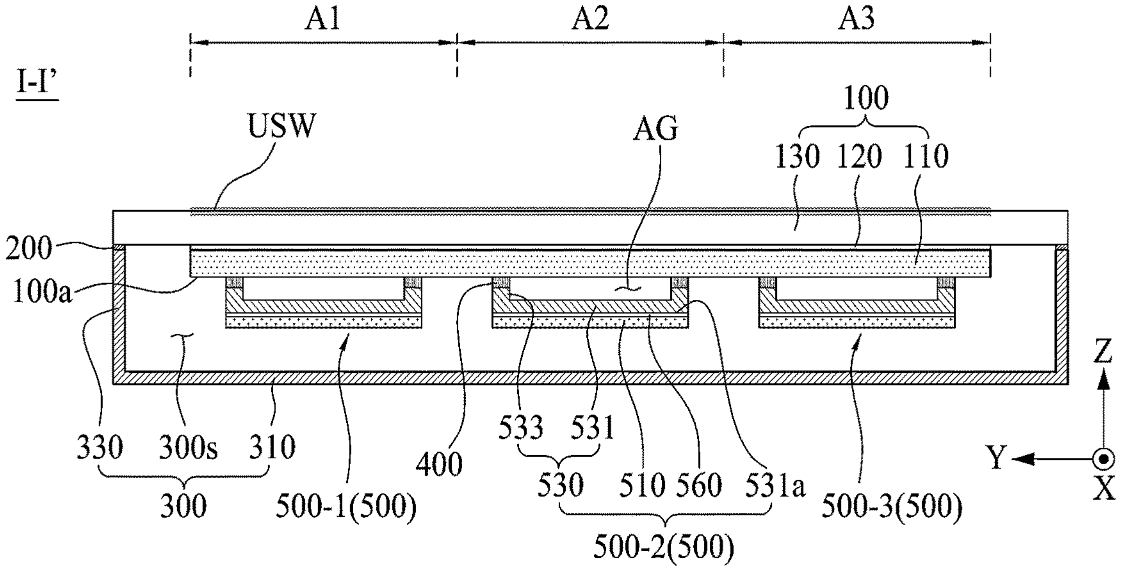
FIG. 19 illustrates a display apparatus according to another aspect of the present disclosure.
Figure 20:
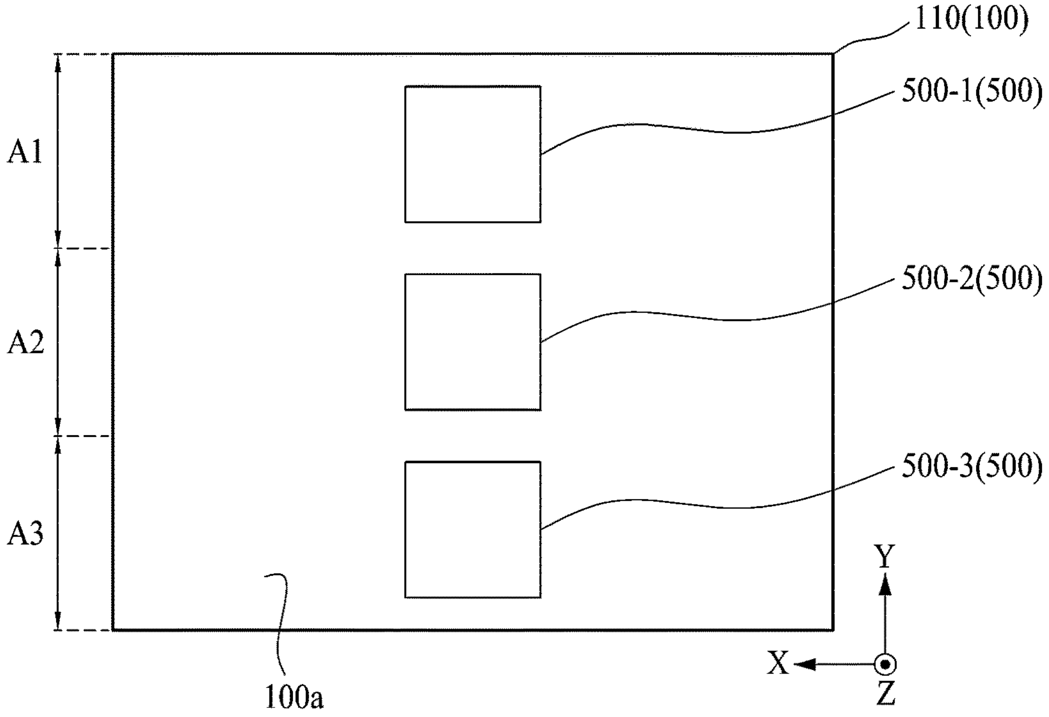
FIG. 20 is a rear view illustrating a display member and a plurality vibration apparatus illustrated in FIG. 19.

FIG. 19 illustrates a display apparatus according to another aspect of the present disclosure. FIG. 19 is another cross-sectional view of taken along line I-I' illustrated in FIG. 1 according to another aspect of the present disclosure. FIG. 20 is a rear view illustrating a display member and a plurality vibration apparatus illustrated in FIG. 19. FIGS. 19 and 20 illustrate an aspect implemented by modifying the vibration apparatus described with reference to FIGS. 1 to 18. In the following descriptions, therefore, the other elements except the vibration apparatus and relevant elements are referred to by like reference numerals, and thus, repeated descriptions thereof are omitted.

With reference to FIGS. 19 and 20, in a display apparatus according to another aspect (or a fifth aspect) of the present disclosure, a vibration apparatus 500 may include a plurality of vibration generating apparatuses 500-1, 500-2, and 500-3. For example, the vibration apparatus 500 may include first to third vibration generating apparatuses 500-1, 500-2, and 500-3. For example, the vibration apparatus 500 may include a plurality of ultrasonic generating apparatuses or first to third ultrasonic generating apparatuses 500-1, 500-2, and 500-3. For example, according to FIGS. 2 and 20, the display apparatus according to another aspect of the present disclosure may include one or more vibration apparatuses (or vibration generating apparatuses) 500 or one or more ultrasonic generating apparatuses 500-1, 500-2, and 500-3.

The first to third vibration generating apparatuses 500-1, 500-2, and 500-3 may be configured to be connected to first to third regions (or rear regions) A, A2, and A3 of a display member 100.

In the display member 100, in a second direction Y, the first region (or first rear region) A1 may be an upper region or a top region of the display member 100. The second region (or second rear region) A2 may be a center region or a middle region of the display member 100. The third region (or third rear region) A3 may be a lower region or a bottom region of the display member 100. For example, the second region A2 may be between the first region A1 and the third region A3. The display member 100 may include a plurality of haptic regions (or ultrasonic generating regions) respectively overlapping or corresponding to the first to third regions A1, A2, and A3, without limited thereto, and the display member 100 may include more or less than three regions and haptic regions (or ultrasonic generating regions) respectively overlapping or corresponding thereto.

The first vibration generating apparatus 500-1 may be configured to generate (or output) an ultrasonic vibration or an ultrasonic haptic in the first region A1 of the display member 100. The first vibration generating apparatus 500-1 may vibrate based on a driving signal supplied from a driving circuit part to vibrate the first region A1 of the display member 100, and thus, may generate (or output) an ultrasonic USW in the first region A1 of the display member 100.

The second vibration generating apparatus 500-2 may be configured to generate (or output) an ultrasonic vibration or an ultrasonic haptic in the second region A2 of the display member 100. The second vibration generating apparatus 500-2 may vibrate based on a driving signal supplied from a driving circuit part to vibrate the second region A2 of the display member 100, and thus, may generate (or output) an ultrasonic USW in the second region A2 of the display member 100.

The third vibration generating apparatus 500-3 may be configured to generate (or output) an ultrasonic vibration or an ultrasonic haptic in the third region A3 of the display member 100. The third vibration generating apparatus 500-3 may vibrate based on a driving signal supplied from a driving circuit part to vibrate the third region A3 of the display member 100, and thus, may generate (or output) an ultrasonic USW in the third region A3 of the display member 100.

Each of the plurality of vibration apparatuses or the first to third vibration generating apparatuses 500-1, 500-2, and 500-3 may be connected to or supported by a rear surface 100*a* of the display member 100 by a connection member 400. For example, each of the plurality of vibration apparatuses or the first to third vibration generating apparatuses 500-1, 500-2, and 500-3 may be connected to or supported by a rear surface 100*a* of the display member 100 by the connection member 400. For example, each of the plurality of vibration apparatuses or the first to third vibration generating apparatuses 500-1, 500-2, and 500-3 may be configured on a same line. For example, the plurality of vibration apparatuses or the first to third vibration generating apparatuses 500-1, 500-2, and 500-3 may be configured at a same line, in the second direction Y.

Each of the plurality of vibration apparatuses or the first to third vibration generating apparatuses 500-1, 500-2, and 500-3 may include a same as or substantially a same configuration as the vibration apparatus described above with reference to FIGS. 1 to 18, and thus, repeated descriptions thereof are omitted. The descriptions of configurations of the vibration apparatus described above with reference to FIGS. 1 to 18 may be included in descriptions of each of the plurality of vibration apparatuses or the first to third vibration generating apparatuses 500-1, 500-2, and 500-3 illustrated in FIGS. 19 and 20.

Each of the plurality of vibration apparatuses or the first to third vibration generating apparatuses 500-1, 500-2, and 500-3 may be simultaneously driven, or may be individually driven, but aspects of the present disclosure are not limited thereto. For example, one or more of the plurality of vibration apparatuses or the first to third vibration generating apparatuses 500-1, 500-2, and 500-3 may be simultaneously driven based on a user touch region. For example, two or more vibration generating apparatuses 500-1, 500-2, and 500-3 overlapping the user touch region or disposed at a periphery of the touch region among the plurality of vibration apparatuses or the first to third vibration generating apparatuses 500-1, 500-2, and 500-3 may be simultaneously driven. Accordingly, a uniform ultrasonic vibration or an ultrasonic haptic may be generated in a user touch region and at a periphery thereof, and thus, a haptic effect having a continuity without a pause or break and/or a virtual texture may be continuously provided to the user.

The display apparatus according to the fifth aspect of the present disclosure may provide substantially a same effect as the display apparatus according to the first to fourth aspects of the present disclosure. Moreover, the display apparatus according to the fifth aspect of the present disclosure may provide a haptic effect and/or a virtual texture to the user in an entire region through the plurality of vibration generating apparatuses 500-1, 500-2, and 500-3 without a dead zone, with respect to a surface of the display member 100

Figure 21:
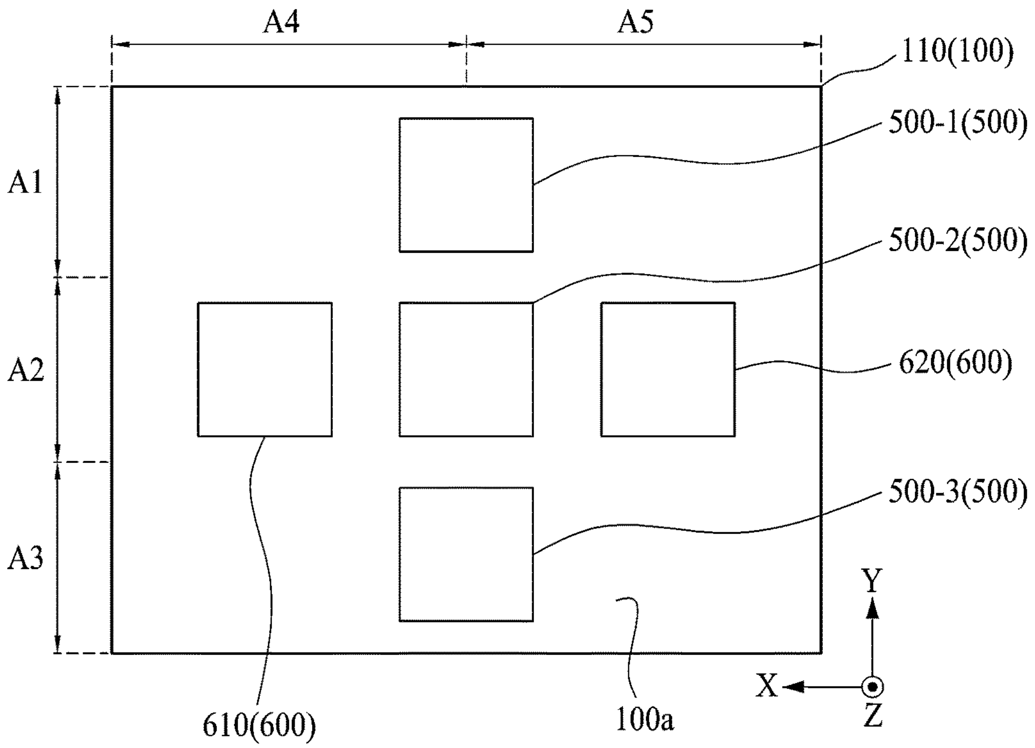
FIG. 21 illustrates a display apparatus according to another aspect of the present disclosure.

FIG. 21 illustrates a display apparatus according to another aspect of the present disclosure. FIG. 21 illustrates an aspect where an acoustic apparatus is additionally provided in the display apparatus described above with reference to FIGS. 19 and 20. Therefore, in the following description, the other elements except an acoustic apparatus are referred to like reference numerals, and thus, repeated descriptions thereof are omitted.

With reference to FIGS. 19 and 21, a display apparatus according to another aspect (or a sixth aspect) of the present disclosure may further include an acoustic apparatus (or a sound apparatus) 600.

The acoustic apparatus 600 may vibrate a display member 100 to generate (or output) a sound. The acoustic apparatus 600 may be connected or coupled to a rear surface 100*a* of the display member 100. For example, the acoustic apparatus 600 may be connected or coupled to a rear surface 100*a* of the display panel 110.

The acoustic apparatus 600 according to an aspect of the present disclosure may include one or more sound generating apparatuses 610 and 620. For example, the acoustic apparatus 600 may include first and second sound generating apparatuses 610 and 620.

The acoustic apparatus 600 or the first and second sound generating apparatuses 610 and 620 may be configured to be connected to fourth and fifth regions (or rear regions) A4 and A5 of the display member 100.

In the display member 100, in a first direction X, the fourth region (or fourth rear region) A4 may be a left region of the display member 100. The fifth region (or fifth rear region) A5 may be a right region of the display member 100. The display member 100 may include a plurality of sound regions (or sound generating region) which respectively overlap or correspond to the fourth and fifth regions A4 and A5.

The first sound generating apparatus 610 may be disposed adjacent to the second vibration generating apparatus 500-2. For example, the first sound generating apparatus 610 may be configured to generate (or output) a sound in the fourth region A4 of the display member 100. The first sound generating apparatus 610 may vibrate based on a sound driving signal (or a voice signal) supplied from a driving circuit part to vibrate the fourth region A4 of the display member 100, and thus, may generate (or output) a first sound (or a left sound) in the fourth region A4 of the display member 100.

The second sound generating apparatus 620 may be disposed adjacent to the second vibration generating apparatus 500-2. For example, the second sound generating apparatus 620 may be configured to generate (or output) a sound in the fifth region A5 of the display member 100. The second sound generating apparatus 620 may vibrate based on a sound driving signal (or a voice signal) supplied from a driving circuit part to vibrate the fifth region A5 of the display member 100, and thus, may generate (or output) a second sound (or a right sound) in the fifth region A5 of the display member 100.

The first and second sound generating apparatuses 610 and 620 may be disposed in a lateral (or a left-right) symmetrical structure or a lateral (or a left-right) asymmetrical structure with respect to a center portion of the display member 100. The first and second sound generating apparatuses 610 and 620 may be disposed in a lateral (or a left-right) symmetrical structure or a lateral (or a left-right) asymmetrical structure with respect to the second vibration generating apparatus 500-2. For example, the first sound generating apparatus 610, the second sound generating apparatus 620, and the second vibration generating apparatus 500-2 may be configured on a same line. For example, the first sound generating apparatus 610, the second sound generating apparatus 620, and the second vibration generating apparatus 500-2 may be configured at a same line, with respect to the first direction X. For example, the first to third vibration generating apparatuses 500-1, 500-2, and 500-3 may be configured on a same line. For example, the first to third vibration generating apparatuses 500-1, 500-2, and 500-3 may be configured at a same line, in the second direction Y.

The acoustic apparatus 600 or each of the first and second sound generating apparatuses 610 and 620 may be connected to or supported by a rear surface 100*a* of the display member 100 by a connection member 400. For example, the acoustic apparatus 600 or each of the first and second sound generating apparatuses 610 and 620 may be connected to or supported by the rear surface 100*a* of the display panel 110 by the connection member 400.

The acoustic apparatus 600 or each of the first and second sound generating apparatuses 610 and 620 may be include a same as or substantially a same configuration as the vibration apparatus described above with reference to FIGS. 1 to 18, and thus, repeated descriptions thereof are omitted. The descriptions of configurations of the vibration apparatus described above with reference to FIGS. 1 to 18 may be included in descriptions of the acoustic apparatus 600 or each of the first and second sound generating apparatuses 610 and 620 illustrated in FIG. 21. For example, the acoustic apparatus 600 or each of the first and second sound generating apparatuses 610 and 620 may be configured to include the vibration generating part 510 and the vibration transfer part 530 illustrated in FIG. 2.

According to another aspect of the present disclosure, the acoustic apparatus 600 or each of the first and second sound generating apparatuses 610 and 620 may be configured to include the vibration generating part 510 without the vibration transfer part 530 of the vibration apparatus described above with reference to FIGS. 1 to 18. For example, the acoustic apparatus 600 or each of the first and second sound generating apparatuses 610 and 620 may include the vibration generating part 510 described above with reference to FIG. 2. The vibration generating part 510 of the acoustic apparatus 600 or each of the first and second sound generating apparatuses 610 and 620 may be connected or coupled to the rear surface 100*a* of the display member 100 by a connection member 400 or an adhesive member 560.

The display apparatus according to the sixth aspect of the present disclosure may provide substantially a same effect as the display apparatus according to the first to fifth aspects of the present disclosure. Moreover, the display apparatus according to the sixth aspect of the present disclosure may output a sound, generated based on a vibration of the display member 100 by a vibration of the acoustic apparatus 600 or each of the first and second sound generating apparatuses 610 and 620, in a forward direction of the display member 100 and may output a sound including a stereo sound in the forward direction of the display member 100, based on first and second sounds based on vibrations of the first and second sound generating apparatuses 610 and 620.

Figure 22:
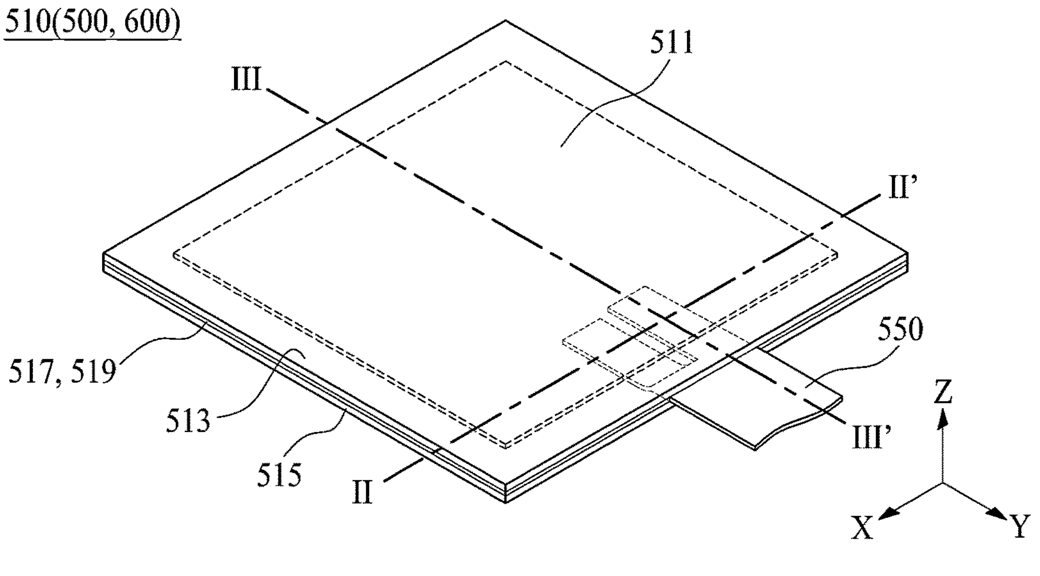
FIG. 22 illustrates a vibration generating part according to an aspect of the present disclosure.
Figure 23:
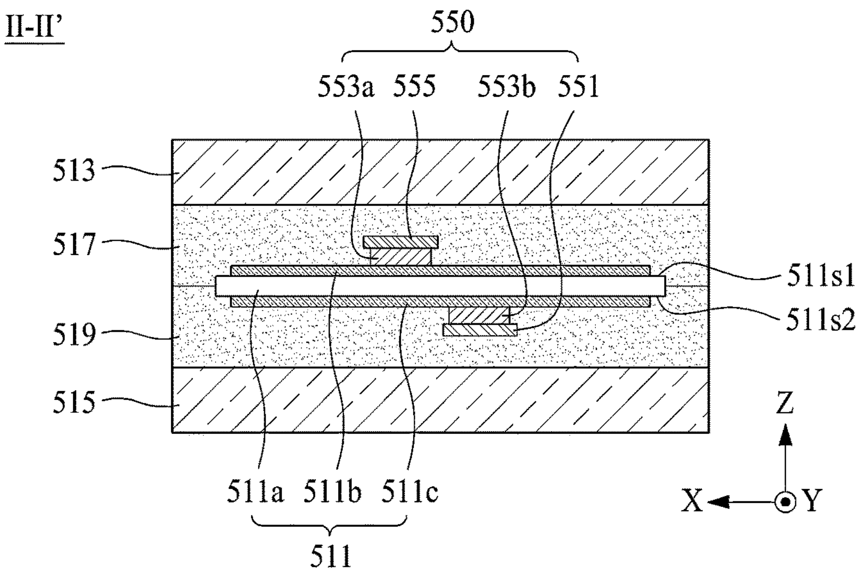
FIG. 23 is a cross-sectional view of a vibration generating part taken along line II-II' illustrated in FIG. 22 according to an aspect of the present disclosure.
Figure 24:
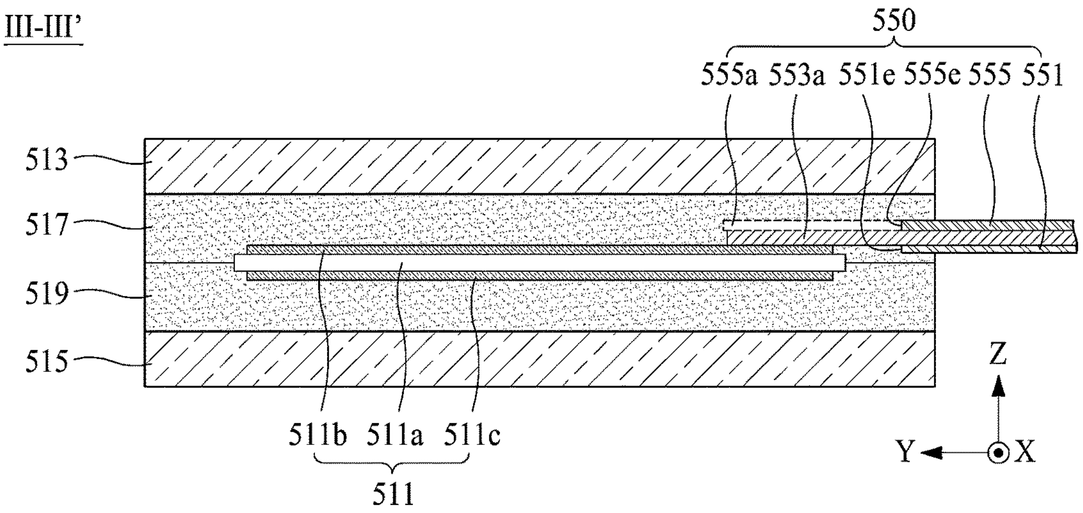
FIG. 24 is a cross-sectional view of a vibration generating part taken along line III-III' illustrated in FIG. 22 according to an aspect of the present disclosure.

FIG. 22 illustrates a vibration generating part according to an aspect of the present disclosure. FIG. 23 is a cross-sectional view of a vibration generating part taken along line II-II' illustrated in FIG. 22 according to an aspect of the present disclosure. FIG. 24 is a cross-sectional view of a vibration generating part taken along line III-III' illustrated in FIG. 22 according to an aspect of the present disclosure. FIGS. 22 to 24 illustrate the vibration generating part of each of the vibration apparatus and the acoustic apparatus described above with reference to FIGS. 1 to 21.

With reference to FIGS. 22 to 24, the vibration generating part 510 of each of the vibration apparatus 500 and the acoustic apparatus 600 according to an aspect of the present disclosure may include a vibration part 511.

The vibration part 511 may be configured to vibrate by a piezoelectric effect based on a driving signal. The vibration part 511 may include at least one or more of a piezoelectric inorganic material and a piezoelectric organic material. For example, the vibration part 511 may be a piezoelectric device, a piezoelectric device part, a piezoelectric device layer, a piezoelectric structure, a piezoelectric vibration part, or a piezoelectric vibration layer, or the like, but aspects of the present disclosure are not limited thereto.

The vibration part 511 according to an aspect of the present disclosure may include a vibration layer 511*a*, a first electrode layer 511*b*, and a second electrode layer 511*c*.

The vibration layer 511*a* may include a piezoelectric material or an electroactive material which includes a piezoelectric effect. For example, the piezoelectric material may have a characteristic in which, when pressure or twisting phenomenon is applied to a crystalline structure by an external force, a potential difference occurs due to dielectric polarization caused by a relative position change of a positive (+) ion and a negative (−) ion, and a vibration is generated by an electric field based on a reverse voltage applied thereto. For example, the vibration layer 511*a* may be a piezoelectric layer, a piezoelectric material layer, an electroactive layer, a piezoelectric composite layer, a piezoelectric composite, or a piezoelectric ceramic composite, or the like, but aspects of the present disclosure are not limited thereto.

The vibration layer 511*a* may be configured as a ceramic-based material for implementing a relatively strong vibration, or may be configured as a piezoelectric ceramic having a perovskite-based crystalline structure. The perovskite crystalline structure may have a piezoelectric effect and/or an inverse piezoelectric effect and may be a plate-shaped structure having an orientation.

The piezoelectric ceramic may be configured as a single crystalline ceramic having a crystalline structure, or may be configured as a ceramic material having a polycrystalline structure or polycrystalline ceramic. A piezoelectric material of the single crystalline ceramic may include $\alpha$-$AlPO_4$, $\alpha$-$SiO_2$, $LiNbO_3$, $Tb_2(MoO_4)_3$, $Li_2B_4O_7$, or ZnO, but aspects of the present disclosure are not limited thereto. A piezoelectric material of the polycrystalline ceramic may include a lead zirconate titanate (PZT)-based material, including lead (Pb), zirconium (Zr), and titanium (Ti), or may include a lead zirconate nickel niobate (PZNN)-based material, including lead (Pb), zirconium (Zr), nickel (Ni), and niobium (Nb), but aspects of the present disclosure are not limited thereto. For example, the vibration layer 511*a* may include at least one or more of calcium titanate ($CaTiO_3$), barium titanate ($BaTiO_3$), and strontium titanate ($SrTiO_3$) without lead (Pb), but aspects of the present disclosure are not limited thereto.

The vibration layer 511*a* of the vibration generating part 510 configured at the vibration apparatus 500 described above with reference to FIGS. 1 to 21 may be configured to have a first thickness. The vibration layer 511*a* of the vibration generating part configured at the acoustic apparatus 600 described above with reference to FIG. 21 may be configured to have a second thickness which is a same as or different from the first thickness. For example, the vibration layer 511*a* of the vibration generating part 510 configured at the vibration apparatus 500 may have the first thickness thicker than the second thickness of the vibration layer 511*a* of the vibration generating part configured at the acoustic apparatus 600 to generate an ultrasonic, but aspects of the present disclosure are not limited thereto.

The first electrode layer 511*b* may be disposed at a first surface (or an upper surface or a front surface) 511*s*1 of the vibration layer 511*a*. The first electrode layer 511*b* may have a same size as the vibration layer 511*a*, or may have a size which is smaller than the vibration layer 511*a*.

The second electrode layer 511*c* may be disposed at a second surface (or a lower surface or a rear surface) 511*s*2 which is opposite to or different from the first surface 511*s*1 of the vibration layer 511*a*. The second electrode layer 511*c* may have a same size as the vibration layer 511*a*, or may have a size which is smaller than the vibration layer 511*a*. For example, the second electrode layer 511*c* may have a same shape as the vibration layer 511*a*, but aspects of the present disclosure are not limited thereto.

According to an aspect of the present disclosure, to prevent electrical short circuit between the first electrode layer 511*b* and the second electrode layer 511*c*, each of the first electrode layer 511*b* and the second electrode layer 511*c* may be formed at the other portion, except a periphery portion, of the vibration layer 511*a*. For example, the first electrode layer 511*b* may be formed at an entire first surface 511*s*1, other than a periphery portion, of the vibration layer 511*a*. For example, the second electrode layer 511*c* may be formed at an entire second surface 511*s*2, other than a periphery portion, of the vibration layer 511*a*. For example, a distance between a lateral surface (or a sidewall or a side surface) of each of the first electrode layer 511*b* and the second electrode layer 511*c* and a lateral surface (or a sidewall or a side surface) of the vibration layer 511*a* may be at least 0.5 mm or more. For example, the distance between the lateral surface of each of the first electrode layer 511*b* and the second electrode layer 511*c* and the lateral surface of the vibration layer 511*a* may be at least 1 mm or more, but aspects of the present disclosure are not limited thereto.

One or more of the first electrode layer 511*b* and the second electrode layer 511*c* according to an aspect of the present disclosure may be formed of a transparent conductive material, a semitransparent conductive material, or an opaque conductive material. For example, the transparent conductive material or the semitransparent conductive material may include indium tin oxide (ITO) or indium zinc oxide (IZO), but aspects of the present disclosure are not limited thereto. The opaque conductive material may include gold (Au), silver (Ag), platinum (Pt), palladium (Pd), molybdenum (Mo), magnesium (Mg), carbon, or silver (Ag) including glass frit, or the like, or an alloy thereof, but aspects of the present disclosure are not limited thereto. For example, to enhance an electrical characteristic and/or a vibration characteristic of the vibration layer 511*a*, each of the first electrode layer 511*b* and the second electrode layer 511*c* may include silver (Ag) having a low resistivity. For example, carbon may be carbon black, ketjen black, carbon nanotube, and a carbon material including graphite, but aspects of the present disclosure are not limited thereto.

The vibration layer 511*a* may be polarized (or poling) by a certain voltage applied to the first electrode layer 511*b* and the second electrode layer 511*c* in a certain temperature atmosphere, or a temperature atmosphere that may be changed from a high temperature to a room temperature, but aspects of the present disclosure are not limited thereto. For example, a polarization direction (or a poling direction) formed in the vibration layer 511*a* may be formed or aligned (or arranged) from the first electrode layer 511*b* to the second electrode layer 511*c*, but is not limited thereto, and a polarization direction (or a poling direction) formed in the vibration layer 511*a* may be formed or aligned (or arranged) from the second electrode layer 511*c* to the first electrode layer 511*b*.

The vibration layer 511*a* may alternately and repeatedly contract and/or expand based on an inverse piezoelectric effect according to a driving signal applied to the first electrode layer 511*b* and the second electrode layer 511*c* from the outside to vibrate. For example, the vibration layer 511*a* may vibrate in a vertical direction (or thickness direction) and in a planar direction by the signal applied to the first electrode layer 511*b* and the second electrode layer 511*c*. The vibration layer 511*a* may be displaced (or vibrated or driven) by contraction and/or expansion of the planar direction, thereby improving a sound characteristic and/or a sound pressure level characteristic of each of the vibration apparatus 500 and the acoustic apparatus 600.

The vibration generating part 510 of each of the vibration apparatus 500 and the acoustic apparatus 600 according to an aspect of the present disclosure may further include a first cover member 513 and a second cover member 515.

The first cover member 513 may be disposed at a first surface of the vibration part 511. For example, the first cover member 513 may be configured to cover the first electrode layer 511*b* of the vibration part 511. For example, the first cover member 513 may be configured to have a larger size than the vibration part 511. The first cover member 513 may be configured to protect the first surface of the vibration part 511 and the first electrode layer 511*b*.

The second cover member 515 may be disposed at a second surface of the vibration part 511. For example, the second cover member 515 may be configured to cover the second electrode layer 511*c* of the vibration part 511. For example, the second cover member 515 may be configured to have a larger size than the vibration part 511 and may be configured to have a same size as the first cover member 513. The second cover member 515 may be configured to protect the second surface of the vibration part 511 and the second electrode layer 511*c*.

Each of the first cover member 513 and the second cover member 515 according to an aspect of the present disclosure may include a same material or different material. For example, each of the first cover member 513 and the second cover member 515 may be a polyimide film, a polyethylene naphthalate film, or a polyethylene terephthalate film, but aspects of the present disclosure are not limited thereto.

The first cover member 513 may be connected or coupled to the first surface of the vibration part 511 or the first electrode layer 511*b* by a first adhesive layer 517. For example, the first cover member 513 may be connected or coupled to the first surface of the vibration part 511 or the first electrode layer 511*b* by a film laminating process by the first adhesive layer 517.

The second cover member 515 may be connected or coupled to the second surface of the vibration part 511 or the second electrode layer 511*c* by a second adhesive layer 519. For example, the second cover member 515 may be connected or coupled to the second surface of the vibration part 511 or the second electrode layer 511*c* by a film laminating process by the second adhesive layer 519.

Each of the first adhesive layer 517 and second adhesive layer 519 according to an aspect of the present disclosure may include an electrically insulating material which has adhesiveness and is capable of compression and decompression. For example, each of the first adhesive layer 517 and the second adhesive layer 519 may include an epoxy resin, an acrylic resin, a silicone resin, or a urethane resin, but aspects of the present disclosure are not limited thereto. For example, the first adhesive layer 517 and the second adhesive layer 519 may include a pressure sensitive adhesive (PSA), a thermo-curable adhesive, a thermo-plastic adhesive, or a thermal bonding adhesive (or a hot-melt adhesive), but examples of the present disclosure are not limited thereto. The thermal bonding adhesive may be a heat-active type or a thermo-curable type. Applications benefitting from a thermo-curable adhesive may be a car because this helps to prevent or reduce moisture damage from high temperature and/or high humidity.

The first adhesive layer 517 and second adhesive layer 519 may be configured between the first cover member 513 and the second cover member 515 to surround the vibration part 511. For example, one or more of the first adhesive layer 517 and second adhesive layer 519 may be configured to surround the vibration part 511.

Any one of the first cover member 513 and the second cover member 515, as illustrated in FIG. 2, may be connected to the vibration transfer part 530 by an adhesive member 560.

The vibration generating part 510 of each of the vibration apparatus 500 and the acoustic apparatus 600 according to an aspect of the present disclosure may further include a signal supply member 550.

The signal supply member 550 may be configured to supply the driving signal supplied from a driving circuit part to the vibration generating part 510 or the vibration part 511. The signal supply member 550 may be configured to be electrically connected to the vibration part 511 at one side of the vibration apparatus 500 or the vibration generating part 510. The signal supply member 550 may be configured to be electrically connected to the first electrode layer 511*b* and the second electrode layer 511*c* of the vibration part 511.

A portion of the signal supply member 550 may be accommodated (or inserted) between the first cover member 513 and the second cover member 515. An end portion (or a distal end portion) of the signal supply member 550 may be disposed or inserted (or accommodated) between one periphery portion of the first cover member 513 and one periphery portion of the second cover member 515. The one periphery portion of the first cover member 513 and the one periphery portion of the second cover member 515 may accommodate or vertically cover the end portion (or the distal end portion or one side) of the signal supply member 550. Accordingly, the signal supply member 550 may be integrated into the vibration generating part 510. For example, the signal supply member 550 may be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but aspects of the present disclosure are not limited thereto.

The signal supply member 550 according to an aspect of the present disclosure may include a base member 551 and a plurality of signal lines 553*a* and 553*b*. For example, the signal supply member 550 may include a base member 551, a first signal line 553*a*, and a second signal line 553*b*. For example, the base member 551 may be a cable base member, but aspects of the present disclosure are not limited thereto.

The base member 551 may include a transparent or opaque plastic material, but aspects of the present disclosure are not limited thereto. The base member 551 may have a certain width along a first direction X and may be extended long along a second direction Y intersecting with the first direction X.

The first and second signal lines 553*a* and 553*b* may be disposed at the first surface of the base member 551 in parallel with the second direction Y, and may be spaced apart from each other or electrically separated from each other in the first direction X. The first and second signal lines 553*a* and 553*b* may be disposed in parallel to each other at the first surface of the base member 551. For example, the first and second signal lines 553*a* and 553*b* may be implemented in a line shape by patterning of a metal layer (or a conductive layer) formed or deposited at the first surface of the base member 551.

End portions (or distal end portions or one sides or one portions) of the first and second signal lines 553*a* and 553*b* may be separated from each other, and thus, may be individually curved or bent.

The end portion (or a distal end portion or one side or one portion) of the first signal line 553*a* may be electrically connected to the first electrode layer 511*b* of the vibration part 511. For example, the end portion of the first signal line 553*a* may be electrically connected to at least a portion of the first electrode layer 511*b* of the vibration part 511 at one periphery portion of the first cover member 513. For example, the end portion (or the distal end portion or one side) of the first signal line 553*a* may be electrically and directly connected to the first electrode layer 511*b* of the vibration part 511. For example, the end portion (or the distal end portion or the one side or the one portion) of the first signal line 553*a* may be directly connected to or directly contact the first electrode layer 511*b* of the vibration part 511. For example, the end portion of the first signal line 553*a* may be electrically connected to the first electrode layer 511*b* by a conductive double-sided tape. Accordingly, the first signal line 553*a* may transfer a first driving signal, supplied from the driving circuit part, to the first electrode layer 511*b* of the vibration part 511.

The end portion (or a distal end portion or one side or one portion) of the second signal line 553*b* may be electrically connected to the second electrode layer 511*c* of the vibration part 511. For example, the end portion of the second signal line 553*b* may be electrically connected to at least a portion of the second electrode layer 511*c* of the vibration part 511 at one periphery portion of the second cover member 515. For example, the end portion of the second signal line 553*b* may be electrically and directly connected to at least a portion of the second electrode layer 511*c* of the vibration part 511. For example, the end portion of the second signal line 553*b* may be directly connected to or directly contact the second electrode layer 511*c* of the vibration part 511. For example, the end portion of the second signal line 553*b* may be electrically connected to the second electrode layer 511*c* by a conductive double-sided tape. Accordingly, the second signal line 553*b* may transfer a second driving signal, suppled from the driving circuit part, to the second electrode layer 511*c* of the vibration part 511.

The signal supply member 550 according to an aspect of the present disclosure may further include an insulation layer 555.

The insulation layer 555 may be disposed at the first surface of the base member 551 to cover each of the first signal line 553*a* and the second signal line 553*b* other than the end portion (or one side or one portion) of the signal supply member 550.

An end portion (or one side or one portion) of the signal supply member 550 including an end portion (or one side or one portion) of the base member 551 and an end portion (or one side or one portion) 555*a* of the insulation layer 555 may be inserted (or accommodated) between the first cover member 513 and the second cover member 515 and may be fixed between the first cover member 513 and the second cover member 515 by the first adhesive layer 517 and the second adhesive layer 519. Accordingly, the end portion (or the one side or one portion) of the first signal line 553*a* may be maintained with being electrically connected to the first electrode layer 511*b* of the vibration part 511, and the end portion (or the one side or one portion) of the second signal line 553*b* may be maintained with being electrically connected to the second electrode layer 511*c* of the vibration part 511. Furthermore, the end portion (or the one side or one portion) of the signal supply member 550 may be inserted (or accommodated) and fixed between the vibration part 511 and the first cover member 513, and thus, a contact defect (or bad connection) between the vibration generating part 510 and the signal supply member 550 caused by the movement of the signal supply member 550 may be prevented.

In the signal supply member 550 according to an aspect of the present disclosure, each of the end portion (or the one side or one portion) of the base member 551 and an end portion (or one side or one portion) 555*a* of the insulation layer 555 may be removed. For example, each of the end portion of the first signal line 553*a* and the end portion of the second signal line 553*b* may be exposed at the outside without being supported or covered by each of the end portion (or the one side or one portion) of the base member 551 and the end portion (or the one side or one portion) 555*a* of the insulation layer 555. For example, the end portion of each of the first and second signal lines 553*a* and 553*b* may protrude (or extend) to have a certain length from an end 551*e* of the base member 551 or an end 555*e* of the insulation layer 555. Accordingly, each of the end portions (or the distal end portion or the one side or the one portion) of the first and second signal lines 553*a* and 553*b* may be individually or independently curved (or bent).

The end portion (or the one side or the one portion) of the first signal line 553*a*, which is not supported by the end portion (or the one side or one portion) of the base member 551 and the end portion 555*a* of the insulation layer 555, may be directly connected to or directly contact the first electrode layer 511*b* of the vibration part 511. The end of the second signal line 553*b*, which is not supported by the end portion (or the one side or the one portion) of the base member 551 and the end portion (or the one side or the one portion) 555*a* of the insulation layer 555, may be directly connected to or directly contact the second electrode layer 511*c* of the vibration part 511.

According to an aspect of the present disclosure, a portion of the signal supply member 550 or a portion of the base member 551 may be disposed or inserted (or accommodated) between the first cover member 513 and the second cover member 515, and thus, the signal supply member 550 may be integrated into (or configured as one body with) the vibration generating part 510. Accordingly, the vibration generating part 510 and the signal supply member 550 may be configured as one part (or one component), and thus, an effect of uni-materialization may be obtained.

According to an aspect of the present disclosure, the first signal line 553*a* and the second signal line 553*b* of the signal supply member 550 may be integrated into (or configured as one body with) the vibration generating part 510, and thus, a soldering process for an electrical connection between the vibration generating part 510 and the signal supply member 550 may not be needed. Accordingly, a manufacturing process and a structure of the vibration generating part 510 may be simplified, and thus, a hazardous process may be reduced or prevented.

Figure 25:
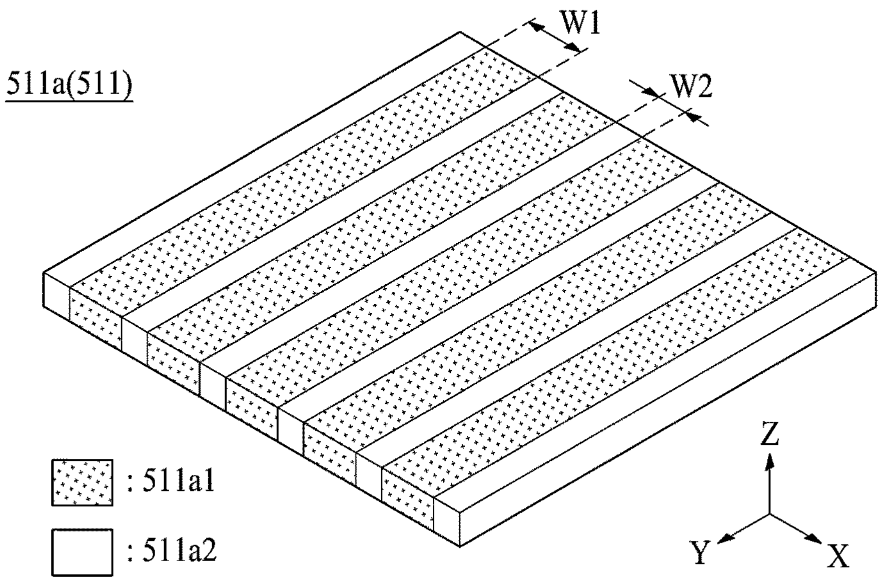
FIG. 25 illustrates a vibration layer according to an aspect of the present disclosure.

FIG. 25 illustrates a vibration layer according to another aspect of the present disclosure. FIG. 25 illustrates another aspect of the vibration layer according to another aspect of the present disclosure described above with reference to FIGS. 22 to 24.

With reference to FIGS. 23 and 25, the vibration layer 511*a* according to another aspect of the present disclosure may include a plurality of first portions 511*al* and a plurality of second portions 511*a*2. For example, the plurality of first portions 511*al* and the plurality of second portions 511*a*2 may be alternately and repeatedly disposed along a first direction X (or a second direction Y).

Each of the plurality of first portions 511*al* may include an inorganic material having a piezoelectric effect (or a piezoelectric characteristic). For example, each of the plurality of first portions 511*al* may include at least one or more of a piezoelectric inorganic material and a piezoelectric organic material. For example, each of the plurality of first portions 511*al* may be an inorganic portion, an inorganic material portion, a piezoelectric portion, a piezoelectric material portion, or an electroactive portion, but aspects of the present disclosure are not limited thereto.

According to an aspect of the present disclosure, each of the plurality of first portions 511*a*1 may have a first width W1 parallel to the first direction X (the second direction Y) and may be extended along the second direction Y (the first direction X) intersecting with the first direction X (the second direction Y). Each of the plurality of first portions 511*al* may include a material which is be substantially a same as the vibration layer 511*a* described above with reference to FIGS. 22 to 24, and thus, repeated descriptions thereof are omitted.

Each of the plurality of first portions 511*al* which is at vibration layer 511*a* of the vibration generating part 510 configured at the vibration apparatus 500 described above with reference to FIGS. 1 to 21 may be configured to have a first thickness. Each of the plurality of first portions 511*al* which is at the vibration layer 511*a* of the vibration generating part configured at the acoustic apparatus 600 described above with reference to FIG. 21 may be configured to have a second thickness which is a same as or different from the first thickness. For example, each of the plurality of first portions 511*al* which is at the vibration layer 511*a* of the vibration generating part 510 configured at the vibration apparatus 500 may have the first thickness thicker than the second thickness of each of the plurality of first portions 511*al* which is at the vibration layer 511*a* of the vibration generating part configured at the acoustic apparatus 600 to generate an ultrasonic, but aspects of the present disclosure are not limited thereto.

Each of the plurality of second portions 511*a*2 may be disposed between the plurality of first portions 511*a*1. For example, each of the plurality of first portions 511*al* may be disposed between two adjacent second portions 511*a*2 of the plurality of second portions 511*a*2. Each of the plurality of second portions 511*a*2 may have a second width W2 parallel to the first direction X (or the second direction Y) and may be extended along the second direction Y (or the first direction X). The first width W1 may be a same as or different from the second width W2. For example, the first width W1 may be greater than the second width W2. For example, the first portion 511*al* and the second portion 511*a*2 may include a line shape or a stripe shape which has a same size or different sizes, without being limited thereto.

Other shapes such as a zigzag shape, an irregular shape, a dot shape including an oval shape, a polygonal shape, or a donut shape, a circular shape or a triangular plate shape etc. could be also possible.

According to exemplary aspects of the present disclosure, each of the first width W1 of the plurality of first portions 511*al* and the second width W2 of the plurality of second portions 511*a*2 may be variously changed. For example, in the vibration layer 511*a*, the width W2 of each of the plurality of second portions 511*a*2 may decrease progressively in a direction from a center portion of the vibration layer 511*a* to both edge portions (or both ends or both periphery portions) thereof. For example, the second portion 511*a*2 having the largest width W2 among the plurality of second portions 511*a*2 may be disposed at a center portion of the vibration layer 511*a*, and the second portion 511*a*2 having the smallest width W2 among the plurality of second portions 511*a*2 may be disposed at both edge portions of the vibration layer 511*a*. Accordingly, when the vibration layer 511*a* vibrates in the vertical direction Z, an overlap of a resonance frequency or interference of a sound wave occurring at a portion at which a largest stress concentrates (e.g. where interference between signals is highest due to an overlap of, for example, different resonant frequencies) may be reduced or minimized, and thus, a dip phenomenon of a sound pressure level occurring in a low pitched sound band (e.g. 3 kHz or less) may be reduced and the flatness of a sound characteristic may be improved in the low pitched sound bands. For example, the dip may be a phenomenon in which a sound pressure level is lowered to a specific frequency. The flatness of a sound characteristic may be a level of a deviation between a highest sound pressure level and a lowest sound pressure level (e.g. a flatness in the peak-to-peak is increased, or the peak-to-peak deviation is decreased) which is over all frequencies.

Each of the plurality of second portions 511*a*2 may be configured to fill a gap between two adjacent first portions 511*al* of the plurality of first portions 511*al*. Each of the plurality of second portions 511*a*2 may be configured to fill a gap between two adjacent first portions 511*a*1 of the plurality of first portions 511*a*1, and thus, may be connected to or attached on lateral surfaces of the first portion 511*al* adjacent thereto. According to an aspect of the present disclosure, each of the plurality of first portions 511*al* and the plurality of second portions 511*a*2 may be disposed (or arranged) at a same plane (or a same layer) in parallel with each other. Therefore, the vibration layer 511*a* may be expanded to a desired size or length by a lateral coupling (or connection) of the first portion 511*al* and the second portion 511*a*2.

According to an aspect of the present disclosure, each of the plurality of second portions 511*a*2 may absorb an impact applied to the first portions 511*al*, and thus, may enhance the durability of the first portions 511*al* and provide flexibility to the vibration layer 511*a*. Each of the plurality of second portions 511*a*2 may include an organic material having a ductile characteristic. For example, each of the plurality of second portions 511*a*2 may include one or more of an epoxy-based polymer, an acrylic-based polymer, and a silicone-based polymer, but aspects of the present disclosure are not limited thereto. For example, each of the plurality of second portions 511*a*2 may be an organic portion, an organic material portion, an adhesive portion, a stretch portion, a bending portion, a damping portion, an elastic portion, or a ductile portion, but aspects of the present disclosure are not limited thereto.

A first surface of each of the plurality of first portions 511*al* and the plurality of second portions 511*a*2 may be connected to the first electrode layer 511*b* in common. A second surface of each of the plurality of first portions 511*al* and the plurality of second portions 511*a*2 may be connected to the second electrode layer 511*c* in common.

The plurality of first portions 511*al* and the plurality of second portion 511*a*2 may be disposed at (or connected to) a same plane, and thus, the vibration layer 511*a* according to another aspect of the present disclosure may implement a single thin film. Accordingly, the vibration part 511 or the vibration generating part 510 including the vibration layer 511*a* according to another aspect of the present disclosure may vibrate in vertically (or up and down) direction by the first portion 511*al* having a vibration characteristic and may be bent in a curved shape by the second portion 511*a*2 having flexibility.

Figure 26:
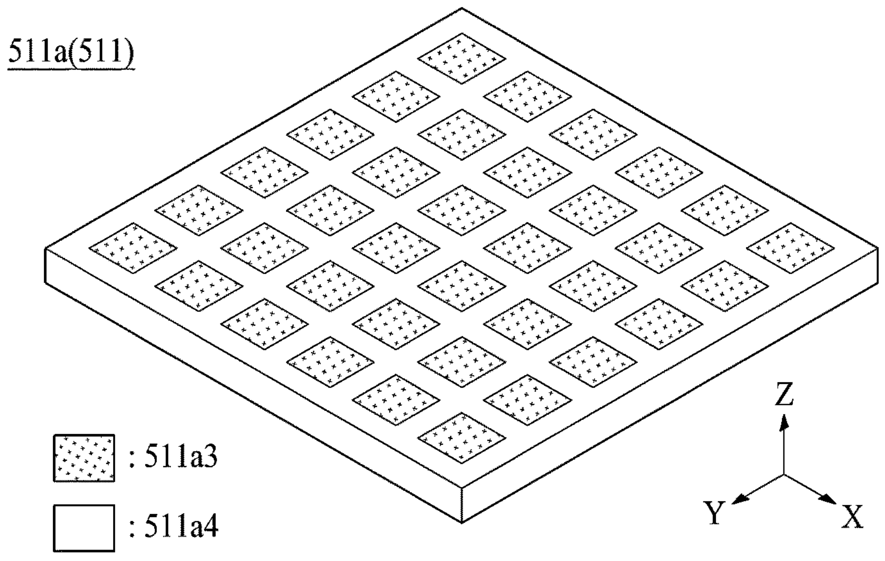
FIG. 26 illustrates a vibration layer according to another aspect of the present disclosure.

FIG. 26 illustrates a vibration layer according to another aspect of the present disclosure. FIG. 26 illustrates another aspect of the vibration layer according to another aspect of the present disclosure described above with reference to FIGS. 22 to 24.

With reference to FIGS. 23 and 26, the vibration layer 511*a* according to another aspect of the present disclosure may include a plurality of first portions 511*a*3 and a second portion 511*a*4 disposed between the plurality of first portions 511*a*3.

Each of the plurality of first portions 511*a*3 may be disposed to be spaced apart from one another along each of the first direction X and the second direction Y. For example, each of the plurality of first portions 511*a*3 may have a hexahedral shape having a same size and may be disposed in a lattice shape, but aspects of the present disclosure are not limited thereto. For example, each of the plurality of first portions 511*a*3 may include a circular shape plate, an oval shape plate, or a polygonal shape plate, which have a same size as each other, but aspects of the present disclosure are not limited thereto. For example, each of the plurality of first portions 511*a*3 may include a circular shape plate, an oval shape plate, or a polygonal shape plate, which have a different size from each other.

Each of the plurality of first portions 511*a*3 may include a material which is be substantially a same as the first portion 511*al* described above with reference to FIG. 25, and thus, repeated descriptions thereof are omitted.

The second portion 511*a*4 may be disposed between the plurality of first portions 511*a*3 along each of the first direction X and the second direction Y. The second portion 511*a*4 may be configured to fill a gap between two adjacent first portions 511*a*3 or to partially or fully surround each of the plurality of first portions 511*a*3, and thus, the second portion 511*a*4 may be connected to or attached on the first portion 511*a*3 adjacent thereto. The second portion 511*a*4 may be substantially a same as the second portion 511*a*2 described above with reference to FIG. 25, and thus, repeated descriptions thereof are omitted.

A first surface of each of the plurality of first portions 511*a*3 and the second portions 511*a*4 may be connected to the first electrode layer 511*b* in common. A second surface of each of the plurality of first portions 511*a*3 and the second portions 511*a*4 may be connected to the second electrode layer 511*c* in common.

The plurality of first portions 511*a*3 and the second portion 511*a*4 may be disposed at (or connected to) a same plane, and thus, the vibration layer 511*a* according to another aspect of the present disclosure may have a single thin film-type. Accordingly, the vibration part 511 or the vibration generating part 510 including the vibration layer 511*a* according to another aspect of the present disclosure may vibrate in vertically (or up and down) direction by the first portion 511*a*3 having a vibration characteristic and may be bent in a curved shape by the second portion 511*a*4 having flexibility.

Figure 27:
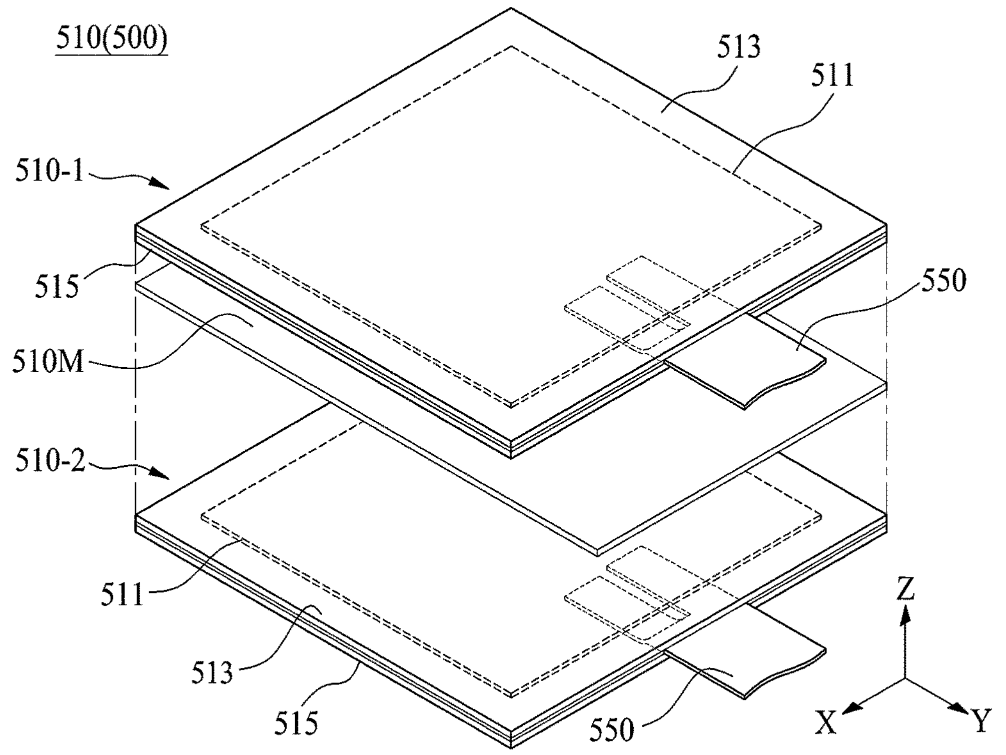
FIG. 27 illustrates a vibration generating part according to another aspect of the present disclosure.

FIG. 27 illustrates a vibration generating part according to another aspect of the present disclosure. FIG. 27 illustrates a vibration generating part of the vibration apparatus and the acoustic apparatus described above with reference to FIGS. 1 to 21.

With reference to FIGS. 2 and 27, a vibration generating part 510 of the vibration apparatus 500 and the acoustic apparatus 600 according to another aspect of the present disclosure may include two or more vibration generating parts 510-1 and 510-2. For example, the vibration generating part 510 may include a first vibration generating part 510-1 and a second vibration generating part 510-2.

The first vibration generating part 510-1 and the second vibration generating part 510-2 may overlap or be stacked with each other to be displaced (or driven or vibrated) in a same direction to maximize or increase an amplitude displacement of the vibration apparatus 500 and the acoustic apparatus 600, and/or an amplitude displacement of the display member 100. For example, the first vibration generating part 510-1 and the second vibration generating part 510-2 may have substantially a same size, but aspects of the present disclosure are not limited thereto. For example, the first vibration generating part 510-1 and the second vibration generating part 510-2 may have substantially a same size within an error range of a manufacturing process. Therefore, the first vibration generating part 510-1 and the second vibration generating part 510-2 may maximize or increase an amplitude displacement of the vibration apparatus 500 and the acoustic apparatus 600, and/or an amplitude displacement of the display member 100.

According to an aspect of the present disclosure, any one of the first vibration generating part 510-1 and the second vibration generating part 510-2 may be connected or coupled to the vibration transfer part 530 by a connection member 560. For example, the first vibration generating part 510-1 may be connected or coupled to the vibration transfer part 530 by the connection member 560.

Each of the first vibration generating part 510-1 and the second vibration generating part 510-2 may be a same or substantially a same as the vibration generating part 510 described above with reference to FIGS. 22 to 26, and thus, repeated descriptions thereof are omitted.

The vibration generating part 510 of each of the vibration apparatus 500 and the acoustic apparatus 600 according to another aspect of the present disclosure may further include an intermediate adhesive member 510M.

The intermediate adhesive member 510M may be disposed or connected between the first vibration generating part 510-1 and the second vibration generating part 510-2. For example, the intermediate adhesive member 510M may be disposed or connected between the second cover member 515 of the first vibration generating part 510-1 and the first cover member 513 of the second vibration generating part 510-2.

The intermediate adhesive member 510M according to another aspect of the present disclosure may be configured as a material including an adhesive layer which is good in attaching force or adhesive force, with respect to each of the first vibration generating part 510-1 and the second vibration generating part 510-2. For example, the intermediate adhesive member 510M may include a double-sided adhesive, a foam pad, a double-sided tape, a double-sided foam tape, a double-sided foam pad, or an adhesive, or the like, but aspects of the present disclosure are not limited thereto. For example, an adhesive layer of the intermediate adhesive member 510M may include epoxy, acrylic, silicone, or urethane, but aspects of the present disclosure are not limited thereto. For example, the adhesive layer of the intermediate adhesive member 510M may include a urethane-based material (or substance) having relatively ductile characteristic. Accordingly, the vibration loss caused by displacement interference between the first vibration generating part 510-1 and the second vibration generating part 510-2 may be minimized or reduced, or each of the first vibration generating part 510-1 and the second vibration generating part 510-2 may be freely displaced (or vibrated or driven).

The vibration generating part 510 of each of the vibration apparatus 500 and the acoustic apparatus 600 according to another aspect of the present disclosure may include the first vibration generating part 510-1 and the second vibration generating part 510-2 which are stacked to vibrate (or displace or drive) in a same direction, and thus, the amount of displacement and/or an amplitude displacement may be maximized or increased. Accordingly, the amount of displacement (or a bending force) and/or an amplitude displacement of the display member 100 may be maximized or increased.

Figure 28:
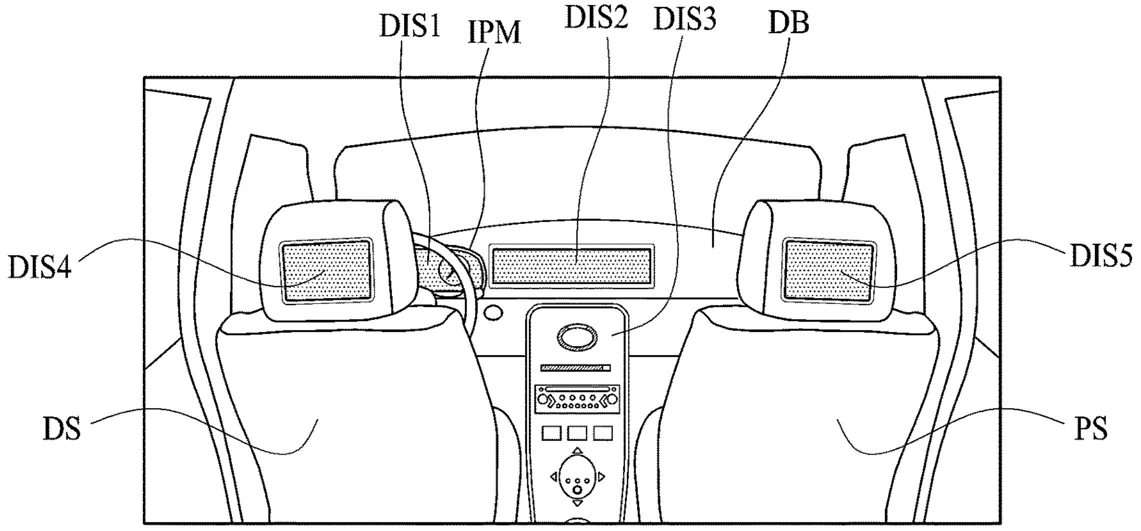
FIG. 28 illustrates a vehicular apparatus according to an aspect of the present disclosure.

FIG. 28 illustrates a vehicular apparatus according to an aspect of the present disclosure. FIG. 28 illustrates an aspect where the display apparatus described above with reference to FIGS. 1 to 27 according to an aspect of the present disclosure is applied to a vehicular apparatus (or a vehicle).

With reference to FIG. 28, a vehicular apparatus according to an aspect of the present disclosure may include a dashboard DB, an instrument panel module IPM, and an infotainment module ITM.

The dashboard DB may include a first region facing a driver seat DS, a second region facing a passenger seat PS, and a third region between the first region and the second region. The dashboard DB may include a center fascia region between the driver seat DS and the passenger seat PS.

The instrument panel module IPM may include a first display DIS1 disposed at the first region of the dashboard DB. The first display DIS1 may be an instrument panel display. For example, the first display DIS1 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto.

The first display DIS1 may provide a driver with various information such as driving-related information or the like such as velocity (or speed), fuel amount, and revolutions per minute (RPM) of the vehicle.

The first display DIS1 may include the display apparatus described above with reference to FIGS. 1 to 27, and thus, repeated descriptions thereof are omitted. Accordingly, the first display DIS1 may be configured to display an image corresponding to information provided from a host system, on the display panel. For example, one or more vibration apparatuses 500 and/or one or more acoustic apparatus 600 may be configured at a rear surface of the first display DIS1. Moreover, the first display DIS1 may provide a user with an ultrasonic vibration or an ultrasonic haptic based on driving (or vibration) of the vibration apparatus when a driver (or user) touch is applied thereto. Furthermore, when the first display DIS1 includes the display apparatus described above with reference to FIG. 21, the first display DIS1 may directly output a sound, generated by a display member which vibrates based on driving (or vibration) of an acoustic apparatus based on a sound signal supplied from an audio system and/or a multimedia system, to a driver.

The infotainment ITM (or an infotainment system) may include one or more infotainment displays which is at one or more of the dashboard DB, the driver seat DS, and the passenger seat PS. For example, the infotainment ITM may include one or more second displays which is configured at one or more of the dashboard DB, the driver seat DS, and the passenger seat PS. For example, the infotainment ITM may include second to fifth displays DIS2 to DIS5.

The second display DIS2 may be disposed or configured at the third region of the dashboard DB. For example, the second display DIS2 may have a length that is enlarged toward the second region PA of the dashboard DB. For example, the second display DIS2 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto.

The second display DIS2 may be respectively connected to a navigation system and a convenience system including an audio system, an air conditioning system, and a multimedia system or the like, and may display various information provided from the convenience system and the navigation system.

The second display DIS2 may include the display apparatus described above with reference to FIGS. 1 to 27, and thus, repeated descriptions thereof are omitted. Accordingly, the second display DIS2 may be configured to display the various information provided from the convenience system and the navigation system, on the display panel. Moreover, the second display DIS2 may transmit or receive image information or sound information through wireless communication with a wireless communication device of a passenger sitting on a passenger seat and may be configured to display the received image information on a display panel.

According to an aspect of the present disclosure, one or more vibration apparatuses 500 and/or one or more acoustic apparatus 600 may be configured at a rear surface of the second display DIS2. The second display DIS2 may provide a user with an ultrasonic vibration or an ultrasonic haptic based on driving (or vibration) of the vibration apparatus when a driver (or user) touch is applied thereto. Furthermore, when the second display DIS2 includes the display apparatus described above with reference to FIG. 21, the second display DIS2 may directly output the sound, generated by the display member which vibrates based on driving (or vibration) of the acoustic apparatus based on the sound signal supplied from the audio system and/or the multimedia system, to a driver.

According to another aspect of the present disclosure, the second display DIS2 and the first display DIS1 may be configured as one display and may be disposed at the first region and the third region of the dashboard DB or may be disposed across the first to third regions of the dashboard DB.

The third display DIS3 may be disposed at the center fascia region under the third region of the dashboard DB. For example, the third display DIS3 may be disposed under the second display DIS2. The third display DIS3 may be disposed at the center fascia region which is at a region between the driver seat DS and the passenger seat PS. For example, the third display DIS3 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto.

The third display (or center fascia display) DIS3 may be configured to display various information provided from the convenient system. The third display DIS3 and the second display DIS2 may share the various information displayed on a display panel.

The third display DIS3 may include the display apparatus described above with reference to FIGS. 1 to 27, and thus, repeated descriptions thereof are omitted. Accordingly, the third display DIS3 may be configured to display the various information provided from the convenience system, on the display panel. For example, one or more vibration apparatuses 500 and/or one or more acoustic apparatus 600 may be configured at a rear surface of the third display DIS3. Moreover, the third display DIS3 may provide a user with an ultrasonic vibration or an ultrasonic haptic based on driving (or vibration) of the vibration apparatus when a driver (or user) touch is applied thereto. Furthermore, when the third display DIS3 includes the display apparatus described above with reference to FIG. 21, the third display DIS3 may directly output the sound, generated by the display member which vibrates based on driving (or vibration) of the acoustic apparatus based on the sound signal supplied from the audio system and/or the multimedia system, to a driver.

The fourth display DIS4 may be disposed or buried in a headrest of the driver seat DS. The fifth display DIS5 may be disposed or buried in a headrest of the passenger seat PS. For example, the fourth display DIS4 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto. For example, the fifth display DIS5 may be a liquid crystal display panel, an organic light emitting display panel, an inorganic light emitting display panel, a quantum dot light emitting display panel, a micro light emitting diode display panel, or a mini light emitting diode display panel, but aspects of the present disclosure are not limited thereto.

The fourth and fifth display DIS4 and DIS5 may include the display apparatus described above with reference to FIGS. 1 to 27, and thus, repeated descriptions thereof are omitted.

Each of the fourth and fifth displays DIS4 and DIS5 may share a function of the second display DIS2. Moreover, each of the fourth and fifth displays DIS4 and DIS5 may transmit or receive image information or sound information through wireless communication with a wireless communication device of a passenger, and may display the received image information on a display panel.

According to an aspect of the present disclosure, one or more vibration apparatuses 500 and/or one or more acoustic apparatus 600 may be configured at a rear surface of each of the fourth and fifth displays DIS4 and DIS5. Moreover, each of the fourth and fifth displays DIS4 and DIS5 may provide a user with an ultrasonic vibration or an ultrasonic haptic based on driving (or vibration) of the vibration apparatus when a driver (or user) touch is applied thereto. Furthermore, when the fourth and fifth displays DIS4 and DIS5 includes the display apparatus described above with reference to FIG. 21, each of the fourth and fifth displays DIS4 and DIS5 may directly output the sound, generated by the display member which vibrates based on driving (or vibration) of the acoustic apparatus based on the sound signal supplied from the audio system and/or the multimedia system, to a driver.

The vehicular apparatus according to an aspect of the present disclosure may provide a user with an ultrasonic vibration or an ultrasonic haptic when a user touch is applied to each of the first to fifth displays DIS1 to DIS5, may use each of the first to fifth displays DIS1 to DIS5 as a speaker for a sound output, and may provide a driver and/or a passenger with a 2 or more-channel stereophonic sound by using a sound generated (or output) from each of the first to fifth displays DIS1 to DIS5.

Figure 29:
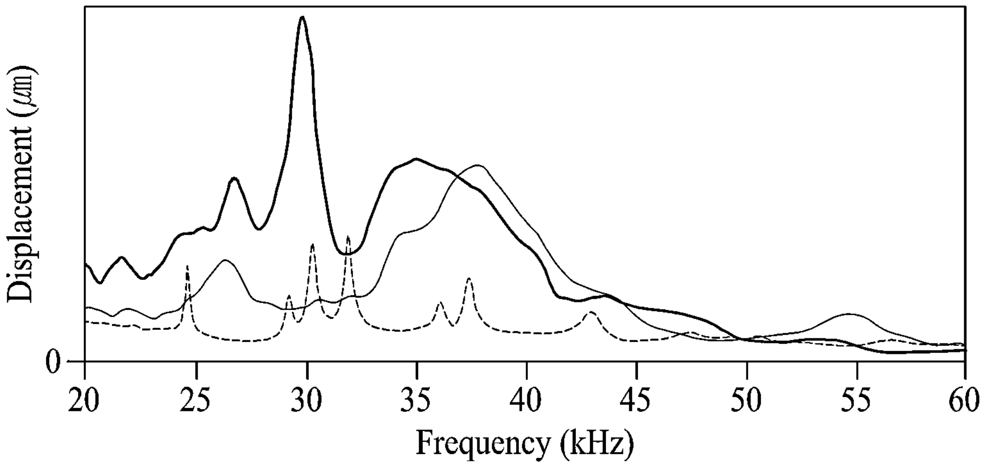
FIG. 29 illustrates a frequency-based displacement of a display apparatus according to an experimental example and a frequency-based displacement of a display apparatus according to aspects of the present disclosure.

FIG. 29 illustrates a frequency-based displacement of a display apparatus according to an experimental example and a frequency-based displacement of a display apparatus according to aspects of the present disclosure. In FIG. 29, a dotted line represents the frequency-based displacement of the display apparatus according to the experimental example, a thin solid line represents a frequency-based displacement of a display apparatus according to an aspect of the present disclosure including the vibration transfer part described above with reference to FIG. 2, and a thick solid line represents a frequency-based displacement of a display apparatus according to an aspect of the present disclosure including the vibration transfer part described above with reference to FIG. 11. The display apparatus according to the experimental example may include a vibration apparatus directly connected to a display member without the vibration transfer part according to aspects of the present disclosure. In FIG. 29, the abscissa axis represents a frequency (kHz (kilohertz)), and the ordinate axis represents a displacement (μm (micrometer)).

As seen in FIG. 29, comparing with the dotted line, it may be seen that each of the thin solid line and the thick solid line has a relatively high displacement.

Therefore, the display apparatus according to an aspect of the present disclosure may transfer a vibration of a vibration generating part to a display member through a vibration transfer part, and thus, comparing with the display apparatus according to the experimental example including no vibration transfer part, the display apparatus according to an aspect of the present disclosure may increase a vibration displacement to increase the strength of an ultrasonic generated based on a vibration of the display member. Accordingly, the display apparatus according to an aspect of the present disclosure may increase (or maximize) a squeeze film effect generated based on a vibration of the display member, thereby enhancing the recognition of a user on a virtual texture and/or an ultrasonic vibration or an ultrasonic haptic.

FIGS. 30A to 30F illustrate a vibration field corresponding to a vibration displacement of a display member in a display apparatus according to an experimental example and a display apparatus according to aspects of the present disclosure.

In FIGS. 30A to 30F, a right side of the drawing represents a vibration displacement. For example, a case (Min) where a vibration displacement is low may be illustrated in blue (or black), and a case (Max) where a vibration displacement is high may be illustrated in yellow (or gray).

Figure 30A:
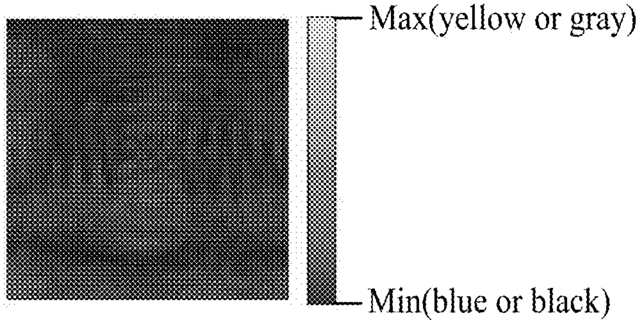
FIGS. 30A to 30F illustrate a vibration field corresponding to a vibration displacement of a display member, in a display apparatus according to an experimental example and a display apparatus according to aspects of the present disclosure.
Figure 30B:
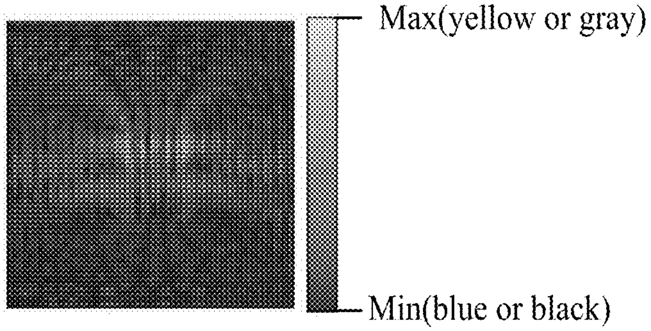
Figure 30C:
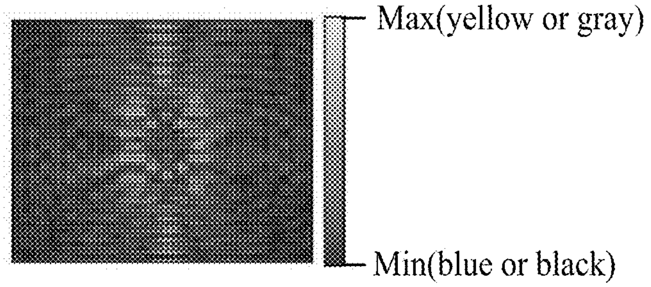
Figure 30D:
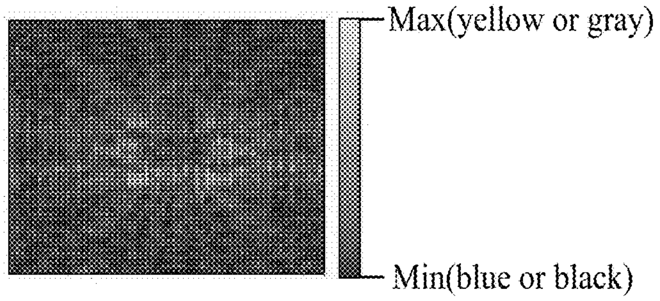
Figure 30E:
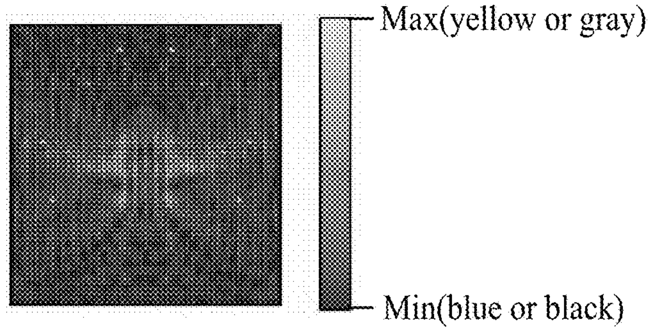
Figure 30F:
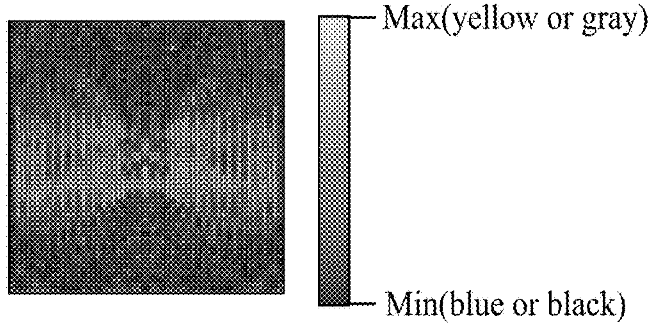

FIG. 30A illustrates a vibration field corresponding to a vibration displacement of a display member in a case where a vibration apparatus according to an experimental example including no vibration transfer part according to an aspect of the present disclosure is driven (or vibrated) at a frequency of 30.6 kHz. FIG. 30B illustrates a vibration field corresponding to a vibration displacement of a display member in a case where a vibration apparatus including a vibration transfer part according to a first aspect of the present disclosure is driven (or vibrated) at a frequency of 22.1 kHz. FIG. 30C illustrates a vibration field corresponding to a vibration displacement of a display member in a case where the vibration apparatus including a vibration transfer part according to the first aspect of the present disclosure is driven (or vibrated) at a frequency of 24.4 kHz. FIG. 30D illustrates a vibration field corresponding to a vibration displacement of a display member in a case where the vibration apparatus including a vibration transfer part according to the first aspect of the present disclosure is driven (or vibrated) at a frequency of 42.8 kHz. FIG. 30E illustrates a vibration field corresponding to a vibration displacement of a display member in a case where the vibration apparatus including a vibration transfer part according to the first aspect of the present disclosure is driven (or vibrated) at a frequency of 30.7 kHz. FIG. 30F illustrates a vibration field corresponding to a vibration displacement of a display member in a case where the vibration apparatus including a vibration transfer part according to the first aspect of the present disclosure is driven (or vibrated) at a frequency of 37.5 kHz. A driving frequency of a vibration apparatus does not limit the description of the present disclosure.

As seen in FIG. 30A, in the display apparatus according to the experimental example, it may be seen that a vibration displacement of a display member is relatively low in an entire region as a vibration of a vibration generating part is transferred to the entire region of the display member. For example, a vibration field of a vibration member based on a vibration displacement may be illustrated in blue (or black).

As seen in FIGS. 30B to 30F, in a display apparatus according to an aspect of the present disclosure, it may be seen that a ratio (or area) of a region having a relatively high vibration displacement increases in an entire region of a display member. For example, in the display apparatus according to an aspect of the present disclosure, it may be seen that a vibration of a vibration generating part is locally (or partially) transferred to a display member through a plurality of vibration transfer members apart from one another, and a vibration displacement of the display member increases compared to the experimental example, based on a vibration mode shape of the display member based on a position of each of the plurality of vibration transfer members. For example, referring to FIGS. 30B to 30F, a vibration field of a vibration member based on a vibration displacement may be illustrated in yellow (or gray) at blue (or black).

In a display apparatus including a vibration transfer part according to the first aspect of the present disclosure, an in-plane vibration mode of a vibration generating part may be converted into an out-plane vibration mode through the vibration transfer part and may be transferred to the display member 100, and thus, a vibration displacement of a display member may increase and the strength of an ultrasonic generated based on a vibration of the display member may increase (or maximized). Accordingly, the display apparatus including the vibration transfer part according to the first aspect of the present disclosure may enhance the recognition of a user on a virtual texture and/or an ultrasonic vibration or an ultrasonic haptic.

Figure 31A:
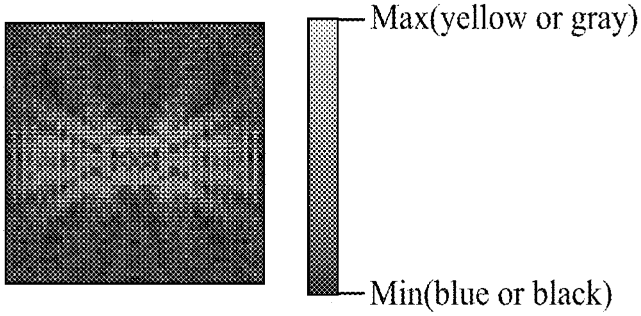
FIGS. 31A to 31C illustrate a vibration field corresponding to a vibration displacement of a display member, in a display apparatus including a vibration generating part illustrated in FIGS. 8 and 9 according to aspects of the present disclosure.
Figure 31B:
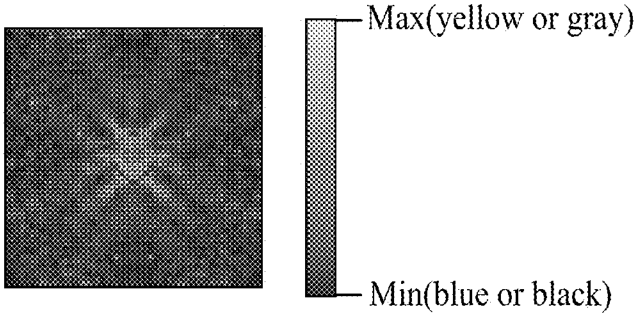
Figure 31C:
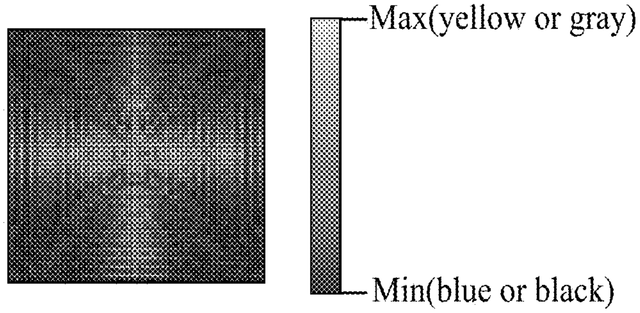

FIGS. 31A to 31C illustrate a vibration field corresponding to a vibration displacement of a display member in a display apparatus including a vibration transfer part according to a fourth aspect and a fifth aspect of the present disclosure.

In FIGS. 31A to 31C, a right side of the drawing represents a vibration displacement. For example, a case (Min) where a vibration displacement is low may be illustrated in blue (or black), and a case (Max) where a vibration displacement is high may be illustrated in yellow (or gray).

FIG. 31A illustrates a vibration field corresponding to a vibration displacement of a display member in a case where a vibration apparatus including a vibration transfer part according to a fourth aspect of the present disclosure is driven (or vibrated) at a frequency of 39.1 kHz. FIG. 31B illustrates a vibration field corresponding to a vibration displacement of a display member in a case where the vibration apparatus including a vibration transfer part according to a fifth aspect of the present disclosure is driven (or vibrated) at a frequency of 32.1 kHz. FIG. 31C illustrates a vibration field corresponding to a vibration displacement of a display member in a case where the vibration apparatus including a vibration transfer part according to the fifth aspect of the present disclosure is driven (or vibrated) at a frequency of 40.7 kHz. A driving frequency of a vibration apparatus does not limit the description of the present disclosure.

As seen in FIGS. 31A to 31C, in the display apparatus according to an aspect of the present disclosure, it may be seen that a ratio (or area) of a region having a relatively high vibration displacement in an entire region of a display member increases largely compared to the experimental example illustrated in FIG. 30A. For example, referring to FIGS. 31A to 31C, it may be seen that a vibration field of a vibration member based on a vibration displacement represents a high vibration displacement as a ratio of yellow (or gray) increases.

In a display apparatus including a vibration transfer part according to the fourth aspect and the fifth aspect of the present disclosure, an in-plane vibration mode of a vibration generating part may be converted into an out-plane vibration mode through the vibration transfer part and may be transferred to the display member 100, and thus, a vibration displacement of a display member may increase and the strength of an ultrasonic generated based on a vibration of the display member may increase (or maximized). Accordingly, the display apparatus including the vibration transfer part according to the fourth aspect and the fifth aspect of the present disclosure may enhance the recognition of a user on a virtual texture and/or an ultrasonic vibration or an ultrasonic haptic.

Figure 32:
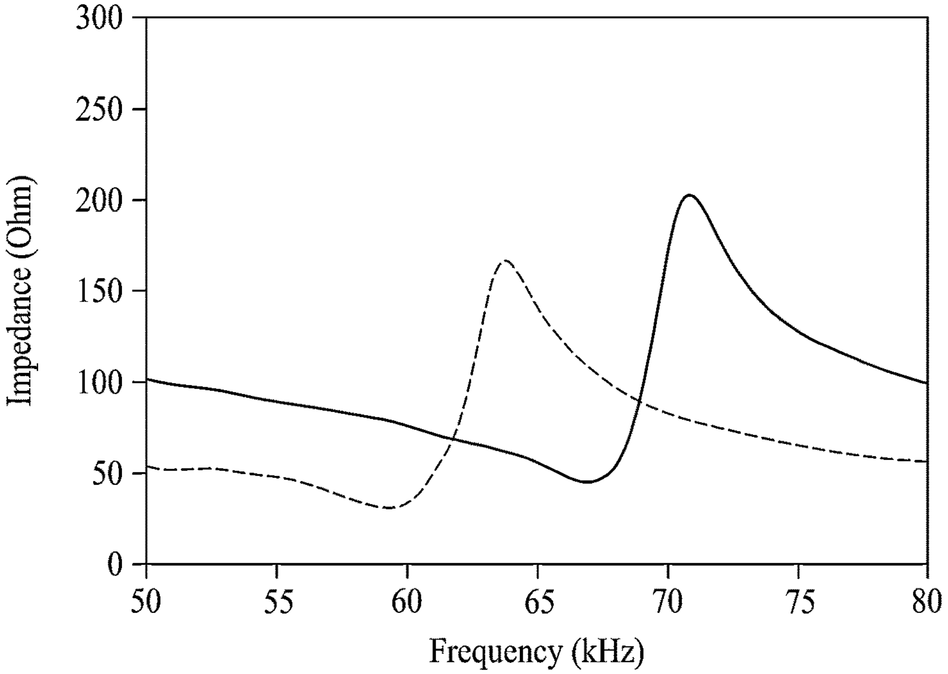
FIG. 32 illustrates an impedance with respect to a frequency of a vibration apparatus based on a size of a vibration layer, in a vibration apparatus of a display apparatus according to aspects of the present disclosure.

FIG. 32 illustrates an impedance with respect to a frequency of a vibration apparatus based on a size of a vibration layer, in a vibration apparatus of a display apparatus according to aspects of the present disclosure. In FIG. 32, a thick solid line illustrates an impedance with respect to a frequency of a vibration apparatus including a vibration layer having a size of 25 mm×25 mm, and a dotted line illustrates an impedance with respect to a frequency of a vibration apparatus including a vibration layer having a size of 30 mm×30 mm. In FIG. 32, the abscissa axis represents a frequency (kHz (kilohertz)), and the ordinate axis represents an impedance (Ohm) of a vibration generating part. A size of a vibration layer does not limit the description of the present disclosure.

As seen in FIG. 32, it may be seen that a lowest impedance in the thick solid line is higher than a lowest impedance in the dotted line. For example, the lowest impedance in the thick solid line may be about 66 kHz, and the lowest impedance in the dotted line may be about 59 kHz. Accordingly, it may be seen that a lowest impedance of a vibration apparatus increases as a size of a vibration layer decreases. Therefore, a resonance frequency of the vibration apparatus may increase as a size of the vibration layer decreases based on a lowest impedance. Accordingly, a size of the vibration layer of the vibration apparatus according to an aspect of the present disclosure may be set to correspond to a resonance frequency of a display member (or vibration object), and a frequency of an ultrasonic haptic or an ultrasonic vibration may be optimized or maximized.

Figure 33:
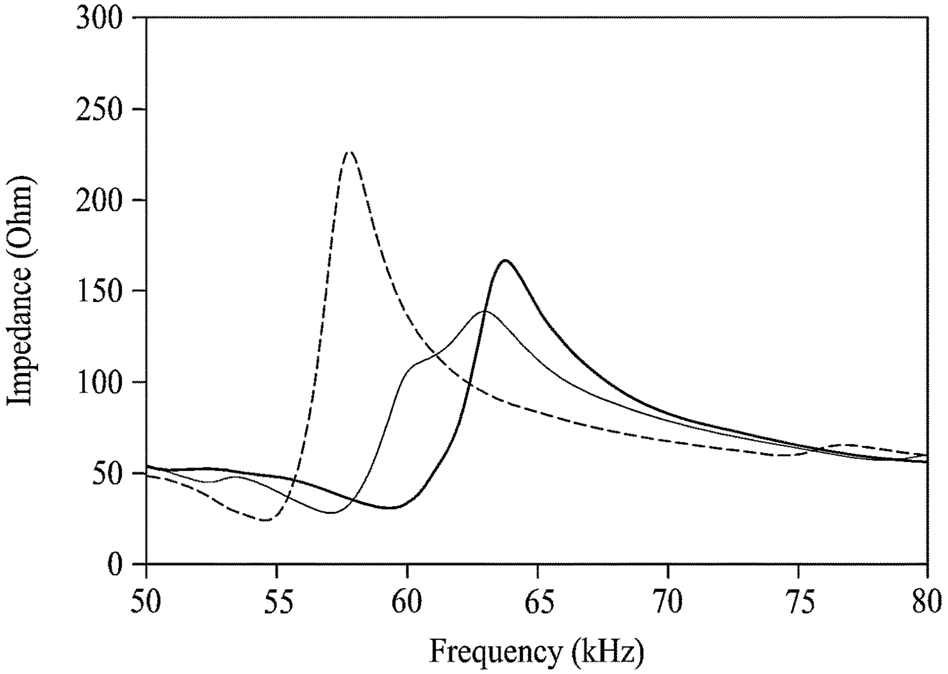
FIG. 33 illustrates an impedance with respect to a frequency of a vibration apparatus based on a thickness of a base member illustrated in FIGS. 13 to 18, in a vibration apparatus of a display apparatus according to aspects of the present disclosure.

FIG. 33 illustrates an impedance with respect to a frequency of a vibration apparatus based on the thickness T4 of the base member 1531 illustrated in FIGS. 13 to 18, in a vibration apparatus of a display apparatus according to aspects of the present disclosure. In FIG. 33, a thick solid line illustrates an impedance with respect to a frequency of a vibration apparatus including a base member having a thickness of 0.5 mm, a thin solid line illustrates an impedance with respect to a frequency of a vibration apparatus including a base member having a thickness of 1 mm, and a dotted line illustrates an impedance with respect to a frequency of a vibration apparatus including a base member having a thickness of 1.5 mm. In FIG. 33, the abscissa axis represents a frequency (kHz (kilohertz)), and the ordinate axis represents an impedance (Ohm) of a vibration generating part.

As seen in FIG. 33, it may be seen that a lowest impedance in the thin solid line is higher than a lowest impedance in the dotted line, and a lowest impedance in the thick solid line is higher than the lowest impedance in the thin solid line. For example, the lowest impedance in the thick solid line may be about 59.5 kHz, the lowest impedance in the thin solid line may be about 57 kHz, and the lowest impedance in the dotted line may be about 54.5 kHz. Accordingly, it may be seen that a lowest impedance of a vibration apparatus increases as a thickness of a base member of a vibration transfer part decreases. Therefore, a resonance frequency of the vibration apparatus may increase as a thickness of the base member of the vibration transfer part decreases based on a lowest impedance. Accordingly, in the vibration apparatus according to an aspect of the present disclosure, a thickness of the base member of the vibration transfer part may be set to correspond to a resonance frequency of a display member (or vibration object), and a frequency of an ultrasonic haptic or an ultrasonic vibration may be optimized or maximized.

Figure 34:
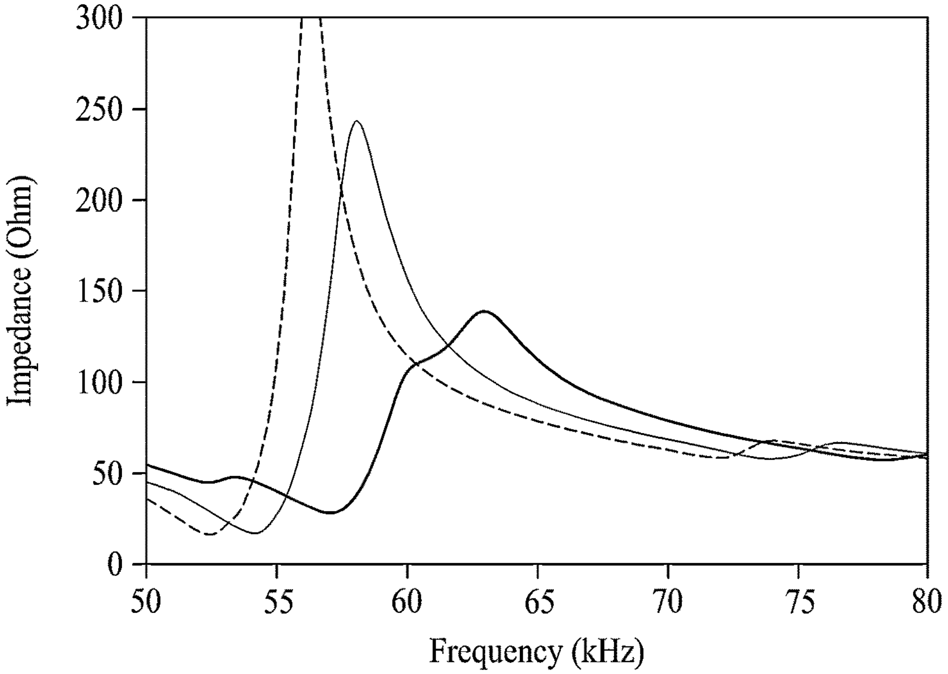
FIG. 34 illustrates an impedance with respect to a frequency of a vibration apparatus based on a height of a vibration transfer member illustrated in FIGS. 13 to 18, in a vibration apparatus of a display apparatus according to aspects of the present disclosure.

FIG. 34 illustrates an impedance with respect to a frequency of a vibration apparatus based on a height (H2) of a vibration transfer member 1433 illustrated in FIGS. 13 to 18, in a vibration apparatus of a display apparatus according to aspects of the present disclosure. In FIG. 34, a thick solid line illustrates an impedance with respect to a frequency of a vibration apparatus including a vibration transfer member having a height of 1 mm, a thin solid line illustrates an impedance with respect to a frequency of a vibration apparatus including a vibration transfer member having a height of 2 mm, and a dotted line illustrates an impedance with respect to a frequency of a vibration apparatus including a vibration transfer member having a height of 3 mm. In FIG. 34, the abscissa axis represents a frequency (kHz (kilohertz)), and the ordinate axis represents an impedance (Ohm) of a vibration generating part.

As seen in FIG. 34, it may be seen that a lowest impedance in the thin solid line is higher than a lowest impedance in the dotted line, and a lowest impedance in the thick solid line is higher than the lowest impedance in the thin solid line. For example, the lowest impedance in the thick solid line may be about 57 kHz, the lowest impedance in the thin solid line may be about 54 kHz, and the lowest impedance in the dotted line may be about 52.5 kHz. Accordingly, it may be seen that a lowest impedance of a vibration apparatus increases as a height of a vibration transfer member of a vibration transfer part decreases. Therefore, a resonance frequency of the vibration apparatus may increase as a height of the vibration transfer member of the vibration transfer part decreases based on a lowest impedance. Accordingly, in the vibration apparatus according to an aspect of the present disclosure, a height of the vibration transfer member of the vibration transfer part may be set to correspond to a resonance frequency of a display member (or vibration object), and a frequency of an ultrasonic haptic or an ultrasonic vibration may be optimized or maximized.

Figure 35:
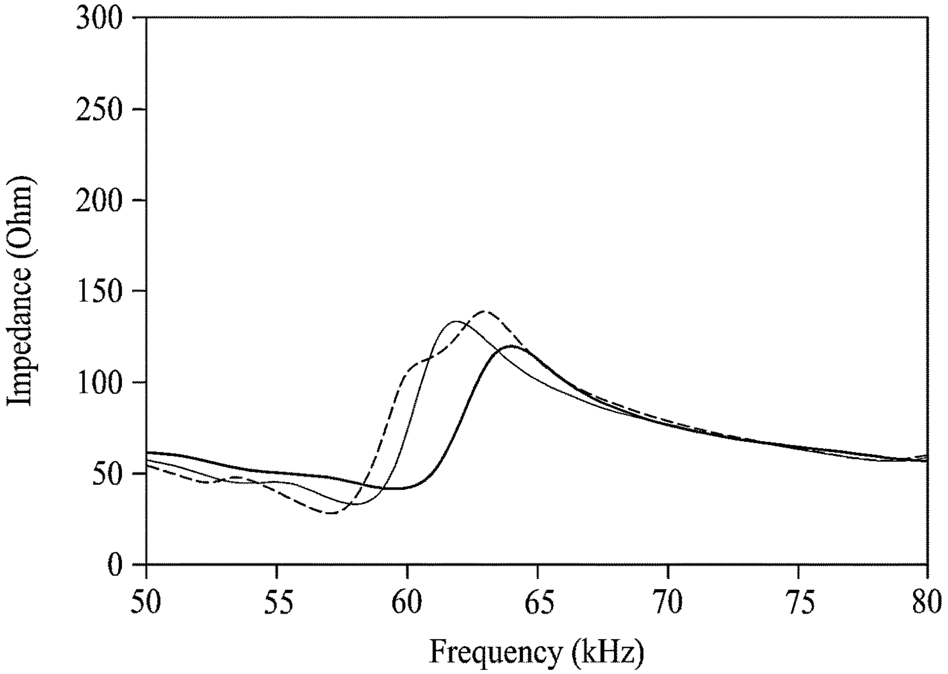
FIG. 35 illustrates an impedance with respect to a frequency of a vibration apparatus based on a width of a vibration transfer member illustrated in FIGS. 13 to 18, in a vibration apparatus of a display apparatus according to aspects of the present disclosure.

FIG. 35 illustrates an impedance with respect to a frequency of a vibration apparatus based on a width W1 of a vibration transfer member 1533 illustrated in FIGS. 13 to 18, in a vibration apparatus of a display apparatus according to aspects of the present disclosure. In FIG. 35, a dotted line illustrates an impedance with respect to a frequency of a vibration apparatus including a vibration transfer member having a width of 2 mm, a thin solid line illustrates an impedance with respect to a frequency of a vibration apparatus including a vibration transfer member having a width of 3 mm, and a thick solid line illustrates an impedance with respect to a frequency of a vibration apparatus including a vibration transfer member having a width of 4 mm. In FIG. 35, the abscissa axis represents a frequency (kHz (kilohertz)), and the ordinate axis represents an impedance (Ohm) of a vibration generating part.

As seen in FIG. 35, it may be seen that a lowest impedance in the thin solid line is higher than a lowest impedance in the dotted line, and a lowest impedance in the thick solid line is higher than the lowest impedance in the thin solid line. For example, the lowest impedance in the thick solid line may be about 59.6 kHz, the lowest impedance in the thin solid line may be about 58.1 kHz, and the lowest impedance in the dotted line may be about 57 kHz. Accordingly, it may be seen that a lowest impedance of a vibration apparatus increases as a width of a vibration transfer member of a vibration transfer part increases. Therefore, a resonance frequency of the vibration apparatus may increase as a width of the vibration transfer member of the vibration transfer part increases based on a lowest impedance. Accordingly, in the vibration apparatus according to an aspect of the present disclosure, a width of the vibration transfer member of the vibration transfer part may be set to correspond to a resonance frequency of a display member (or vibration object), and a frequency of an ultrasonic haptic or an ultrasonic vibration may be optimized or maximized.

Accordingly, according to an aspect of the present disclosure, one or more of a size of a vibration layer, a material and a thickness of a base member configuring a vibration transfer part, and a material, a height, and a width of a vibration transfer member may be adjusted (or vary) to correspond to a resonance frequency of a display member (or vibration object), and thus, a frequency of an ultrasonic haptic or an ultrasonic vibration may be optimized or maximized.

A vibration apparatus, a display apparatus including the same, and a vehicular apparatus including the vibration apparatus according to an aspect of the present disclosure are described below.

A vibration apparatus according to one or more aspects of the present disclosure may comprise a vibration generating part, and a vibration transfer part coupled to the vibration generating part, the vibration transfer part including a plurality of vibration transfer members spaced apart from one another. Each of the plurality of vibration transfer members may be configured to convert an in-plane vibration mode of the vibration generating part into an out-plane vibration mode.

According to one or more aspects of the present disclosure, each of the plurality of vibration transfer members may comprise a metal material or a plastic material.

According to one or more aspects of the present disclosure, the vibration apparatus may further comprise an adhesive member between the vibration generating part and each of the plurality of vibration transfer members.

According to one or more aspects of the present disclosure, each of the plurality of vibration transfer members may be configured to have a line shape.

According to one or more aspects of the present disclosure, each of the plurality of vibration transfer members may include at least one or more transfer portions.

According to one or more aspects of the present disclosure, the vibration transfer part may comprise a first vibration transfer member connected to a periphery portion of the vibration generating part, and a second vibration transfer member connected to a center portion of the vibration generating part and surrounded by the first vibration transfer member.

According to one or more aspects of the present disclosure, the second vibration transfer member may be connected to a middle portion between a center portion and a periphery portion of the base member.

According to one or more aspects of the present disclosure, the first vibration transfer member and the second vibration transfer member may have a same center point.

According to one or more aspects of the present disclosure, each of the first vibration transfer member and the second vibration transfer member may include at least one or more transfer portions.

According to one or more aspects of the present disclosure, the vibration transfer part further may comprise a base member between the vibration generating part and the plurality of vibration transfer members.

According to one or more aspects of the present disclosure, the base member and the plurality of vibration transfer members may comprise a metal material or a plastic material.

According to one or more aspects of the present disclosure, each of the plurality of vibration transfer members may protrude from the base member.

According to one or more aspects of the present disclosure, the vibration apparatus may further comprise an adhesive member between the vibration generating part and the base member.

According to one or more aspects of the present disclosure, each of the plurality of vibration transfer members may be configured to have a line shape.

According to one or more aspects of the present disclosure, each of the plurality of vibration transfer members may include at least one or more transfer portions.

According to one or more aspects of the present disclosure, the vibration transfer part may comprise a first vibration transfer member connected to a periphery portion of the vibration generating part, and a second vibration transfer member connected to a center portion of the base member and surrounded by the first vibration transfer member.

According to one or more aspects of the present disclosure, the second vibration transfer member may be connected to a middle portion between a center portion and a periphery portion of the base member.

According to one or more aspects of the present disclosure, the first vibration transfer member and the second vibration transfer member may have a same center point.

According to one or more aspects of the present disclosure, each of the first vibration transfer member and the second vibration transfer member may include at least one or more transfer portions.

According to one or more aspects of the present disclosure, the vibration transfer part may further may comprise a base member between the vibration generating part and the plurality of vibration transfer members, and an adhesive member between the base member and each of the plurality of vibration transfer members.

According to one or more aspects of the present disclosure, at least one of a material, area and thickness of the base member may be configured to correspond to a resonant frequency of a vibration object.

According to one or more aspects of the present disclosure, a size of a vibration layer of the vibration generating part may be configured to correspond to a resonant frequency of a vibration object.

According to one or more aspects of the present disclosure, at least one of a material, height and width of the vibration transfer member may be configured to correspond to a resonant frequency of a vibration object.

According to one or more aspects of the present disclosure, each of the plurality of vibration transfer members may be configured as a different material from the base member.

According to one or more aspects of the present disclosure, each of the plurality of vibration transfer members may be configured as a material having stiffness which is greater than the base member.

According to one or more aspects of the present disclosure, each of the plurality of vibration transfer members may be configured to have a thickness different from the base member.

According to one or more aspects of the present disclosure, the base member may comprise a metal material or a plastic material. Each of the plurality of vibration transfer members may comprise a metal material or a plastic material different from the base member.

According to one or more aspects of the present disclosure, the vibration transfer part further may comprise a first connection part configured at base member, and a second connection part configured at each of the plurality of vibration transfer members corresponding to the first connection part.

According to one or more aspects of the present disclosure, the first connection part may comprise a groove. The second connection part may comprise a protrusion accommodated in the groove.

According to one or more aspects of the present disclosure, the vibration generating part may comprise a first cover member, a second cover member, and a vibration part between the first cover member and the second cover member, the vibration part including a piezoelectric material.

According to one or more aspects of the present disclosure, the vibration generating part further may comprise a signal supply member electrically connected to the vibration part. A portion of the signal supply member may be accommodated between the first cover member and the second cover member.

According to one or more aspects of the present disclosure, the vibration generating part may comprise a first vibration generating part, a second vibration generating part stacked on the first vibration generating part, and an intermediate adhesive member between the first vibration generating part and the second vibration generating part. One of the first vibration generating part and the second vibration generating part may be connected to the vibration transfer part.

According to one or more aspects of the present disclosure, each of the first vibration generating part and the second vibration generating part may comprise a first cover member, a second cover member, and a vibration part between the first cover member and the second cover member, the vibration part including a piezoelectric material.

According to one or more aspects of the present disclosure, the vibration part may include a vibration layer, a first electrode layer and a second electrode layer. Each of the first electrode layer and the second electrode layer may be disposed at other portion, except a periphery portion of the vibration layer.

According to one or more aspects of the present disclosure, each of the first vibration generating part and the second vibration generating part further may comprise a signal supply member electrically connected to the vibration part. A portion of the signal supply member may be accommodated between the first cover member and the second cover member.

According to one or more aspects of the present disclosure, the signal supply member may be integrated into the vibration generating part.

According to one or more exemplary aspects of the present disclosure, the vibration generating part may comprise a first vibration generating part, a second vibration generating part stacked on the first vibration generating part, and an intermediate adhesive member between the first vibration generating part and the second vibration generating part. One of the first vibration generating part and the second vibration generating part may be connected to the vibration transfer part.

According to one or more exemplary aspects of the present disclosure, each of the first vibration generating part and the second vibration generating part may comprise a first cover member, a second cover member, and a vibration part between the first cover member and the second cover member, the vibration part including a piezoelectric material.

According to one or more exemplary aspects of the present disclosure, each of the first vibration generating part and the second vibration generating part further may comprise a signal supply member electrically connected to the vibration part. A portion of the signal supply member may be accommodated between the first cover member and the second cover member.

A display apparatus according to one or more aspects of the present disclosure may comprise a display member configured to display an image, one or more vibration generating apparatuses configured to vibrate the display member, and a connection member between the display member and the one or more vibration generating apparatuses. The one or more vibration generating apparatuses may comprise a vibration apparatus. The vibration apparatus may comprise a vibration generating part, and a vibration transfer part coupled to the vibration generating part, the vibration transfer part including a plurality of vibration transfer members spaced apart from one another. Each of the plurality of vibration transfer members may be configured to convert an in-plane vibration mode of the vibration generating part into an out-plane vibration mode.

According to one or more aspects of the present disclosure, the one or more vibration generating apparatuses may be driven simultaneously.

According to one or more aspects of the present disclosure, the one or more vibration generating apparatuses may vibrate the display member according to a driving signal to generate an ultrasonic vibration at a surface of the display member.

According to one or more aspects of the present disclosure, the driving signal may be an amplitude modulation signal of an ultrasonic signal based on a low frequency signal.

According to one or more aspects of the present disclosure, the low frequency signal may have one or more frequencies of 100 Hz to 600 Hz.

According to one or more aspects of the present disclosure, the vibration apparatus may be connected to a rear surface of the display member with an air gap therebetween.

According to one or more aspects of the present disclosure, the display member may comprise a display panel including a plurality of pixels configured to display the image, and a touch panel coupled to the display panel.

According to one or more aspects of the present disclosure, the display member may comprise a front member, a display panel at a rear surface of the front member, the display panel including q plurality of pixels configured to display the image, and a touch panel between the front member and the display panel.

According to one or more aspects of the present disclosure, the display apparatus may further comprise an acoustic apparatus including one or more sound generating apparatuses configured to vibrate the display member.

According to one or more aspects of the present disclosure, the one or more sound generating apparatuses may comprise a vibration generating part, and a vibration transfer part including a plurality of vibration transfer members configured to transfer a vibration of the vibration generating part to the display member.

According to one or more aspects of the present disclosure, a thickness of a vibration layer of the vibration apparatus included in the display apparatus may be larger than a thickness of a vibration layer of a vibration generating part of the acoustic apparatus.

A vehicular apparatus according to one or more aspects of the present disclosure may comprise a dashboard, an instrument panel module at the dashboard, the instrument panel module including a first display, a driver seat, a passenger seat, and an infotainment module at one or more of the dashboard, the driver seat, and the passenger seat, the infotainment module including one or more second displays. One or more of the first display and the one or more second displays may comprise a display member configured to display an image, one or more vibration generating apparatuses configured to vibrate the display member, and a connection member between the display member and the one or more vibration generating apparatuses. The one or more vibration generating apparatuses may comprise a vibration apparatus. The vibration apparatus may comprise a vibration generating part, and a vibration transfer part connected to the vibration generating part, the vibration transfer part including a plurality of vibration transfer members spaced apart from one another. Each of the plurality of vibration transfer members may be configured to convert an in-plane vibration mode of the vibration generating part into an out-plane vibration mode.

According to one or more aspects of the present disclosure, the one or more vibration generating apparatuses may vibrate the display member according to a driving signal to generate an ultrasonic vibration at a surface of the display member.

According to one or more aspects of the present disclosure, the driving signal may be an amplitude modulation signal of an ultrasonic signal based on a low frequency signal.

According to one or more aspects of the present disclosure, the display member may comprise a display panel including a plurality of pixels configured to display the image, and a touch panel coupled to the display panel.

According to one or more aspects of the present disclosure, the display member may comprise a front member, a display panel at a rear surface of the front member, the display panel including a plurality of pixels configured to display the image, and a touch panel between the front member and the display panel.

According to one or more aspects of the present disclosure, one or more of the first display and the one or more second display may further comprise an acoustic apparatus including one or more sound generating apparatuses configured to vibrate the display member.

According to one or more aspects of the present disclosure, the one or more sound generating apparatuses may comprise a vibration generating part, and a vibration transfer part including a plurality of vibration transfer members configured to transfer a vibration of the vibration generating part to the display member.

A vibration apparatus according to one or more aspects of the present disclosure may be applied to or included in an acoustic apparatus which is disposed in an apparatus or a display apparatus. The vibration apparatus or the display apparatus according to one or more aspects of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. Moreover, the vibration apparatus according to one or more aspects of the present disclosure may be applied to or included in an organic light-emitting lighting apparatus or an inorganic light-emitting lighting apparatus. When the vibration apparatus is applied to or included in the lighting apparatuses, the lighting apparatuses may act as lighting and a speaker. In addition, when the vibration apparatus according to one or more aspects of the present disclosure is applied to or included in the mobile apparatuses or the like, the vibration apparatus or an acoustic apparatus may be one or more of a speaker, a receiver, and a haptic device, but aspects of the present disclosure are not limited thereto.

It will be apparent to those skilled in the art that various modifications and variations can be made in the vibration apparatus, the display apparatus including the same, and the vehicular apparatus including the display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. A vibration apparatus, comprising:

a vibration generating part including a piezoelectric material; and a vibration conversion part coupled to the vibration generating part by an adhesive member, the vibration conversion part including a plurality of vibration conversion members spaced apart from one another, wherein the vibration generating part displaces in a horizontal-direction vibration based on a vibration of the piezoelectric material, wherein each of the plurality of vibration conversion members converts the horizontal-direction vibration of the vibration generating part into a vertical-direction vibration, wherein the vibration generating part includes:

a vibration part including the piezoelectric material;

a first cover member coupled to a first surface of the vibration part by a first adhesive layer; and a second cover member coupled to a second surface of the vibration part opposite to the first surface of the vibration part by a second adhesive layer, and wherein one of the first cover member and the second cover member is coupled to a rear surface of the vibration conversion part by the adhesive member.

2. The vibration apparatus of claim 1, wherein each of the plurality of vibration conversion members comprise a metal material or a plastic material.

3. The vibration apparatus of claim 1, further comprising an adhesive member between the vibration generating part and each of the plurality of vibration conversion members.

4. The vibration apparatus of claim 1, wherein each of the plurality of vibration conversion members includes a line shape.

5. The vibration apparatus of claim 1, wherein each of the plurality of vibration conversion members includes at least one or more conversion portions.

6. The vibration apparatus of claim 1, wherein the vibration conversion part comprises:

a first vibration conversion member connected to a periphery portion of the vibration generating part; and a second vibration conversion member connected to a center portion of the vibration generating part and surrounded by the first vibration conversion member.

7. The vibration apparatus of claim 6, wherein the first vibration conversion member and the second vibration conversion member have a same center point.

8. The vibration apparatus of claim 6, wherein each of the first vibration conversion member and the second vibration conversion member includes at least one or more conversion portions.

9. The vibration apparatus of claim 1, wherein the vibration conversion part further comprises a base member between the vibration generating part and the plurality of vibration conversion members.

10. The vibration apparatus of claim 9, wherein the base member and the plurality of vibration conversion members comprise a metal material or a plastic material.

11. The vibration apparatus of claim 9, wherein each of the plurality of vibration conversion members protrudes from the base member.

12. The vibration apparatus of claim 9, further comprising an adhesive member between the vibration generating part and the base member.

13. The vibration apparatus of claim 9, wherein each of the plurality of vibration conversion members includes a line shape.

14. The vibration apparatus of claim 9, wherein each of the plurality of vibration conversion members includes at least one or more conversion portions.

15. The vibration apparatus of claim 9, wherein the vibration conversion part comprises:

a first vibration conversion member connected to a periphery portion of the vibration generating part; and a second vibration conversion member connected to a center portion of the base member and surrounded by the first vibration conversion member.

16. The vibration apparatus of claim 15, wherein the first vibration conversion member and the second vibration conversion member have a same center point.

17. The vibration apparatus of claim 15, wherein each of the first vibration conversion member and the second vibration conversion member includes at least one or more conversion portions.

18. The vibration apparatus of claim 1, wherein the vibration conversion part further comprises:

a base member between the vibration generating part and the plurality of vibration conversion members; and an adhesive member between the base member and each of the plurality of vibration conversion members.

19. The vibration apparatus of claim 18, wherein each of the plurality of vibration conversion members is configured as a different material from the base member.

20. The vibration apparatus of claim 18, wherein each of the plurality of vibration conversion members is configured as a material having stiffness which is greater than the base member.

21. The vibration apparatus of claim 18, wherein each of the plurality of vibration conversion members is configured to have a thickness different from the base member.

22. The vibration apparatus of claim 18, wherein:

the base member comprises a metal material or a plastic material; and each of the plurality of vibration conversion members comprises a metal material or a plastic material different from the base member.

23. The vibration apparatus of claim 18, wherein the vibration conversion part further comprises:

a first connection part configured at base member; and a second connection part configured at each of the plurality of vibration conversion members corresponding to the first connection part.

24. The vibration apparatus of claim 23, wherein:

the first connection part comprises a groove; and the second connection part comprises a protrusion accommodated in the groove.

25. The vibration apparatus of claim 1, wherein the vibration part includes a vibration layer, a first electrode layer and a second electrode layer, and wherein each of the first electrode layer and the second electrode layer is disposed at other portion, except a periphery portion of the vibration layer.

26. The vibration apparatus of claim 1, wherein:

the vibration generating part further comprises a signal supply member electrically connected to the vibration part; and a portion of the signal supply member is accommodated between the first cover member and the second cover member.

27. The vibration apparatus of claim 26, wherein the signal supply member is integrated into the vibration generating part.

28. The vibration apparatus of claim 1, wherein:

the vibration generating part comprises:

a first vibration generating part;

a second vibration generating part stacked on the first vibration generating part; and an intermediate adhesive member between the first vibration generating part and the second vibration generating part, wherein each of the first vibration generating part and the second vibration generating part comprises the vibration part, the first cover member, the second cover member, and wherein one of the first vibration generating part and the second vibration generating part is connected to the vibration conversion part.

29. The vibration apparatus of claim 28, wherein:

each of the first vibration generating part and the second vibration generating part further comprises a signal supply member electrically connected to the vibration part; and a portion of the signal supply member is accommodated between the first cover member and the second cover member.

30. The vibration apparatus of claim 29, wherein the signal supply member is integrated into the first vibration generating part or the second vibration generating part.

31. A display apparatus, comprising:

a display member including a display panel having a plurality of pixels configured to display an image;

one or more vibration generating apparatuses connected to the display member and configured to vibrate the display member; and a connection member between the display member and the one or more vibration generating apparatuses, wherein the one or more vibration generating apparatuses comprise the vibration apparatus of claim 1.

32. The display apparatus of claim 31, wherein the one or more vibration generating apparatuses vibrates the display member according to a driving signal to generate an ultrasonic vibration at a surface of the display member.

33. The display apparatus of claim 32, wherein the driving signal is an amplitude modulation signal of an ultrasonic signal based on a low frequency signal.

34. The display apparatus of claim 33, wherein the low frequency signal has one or more frequencies of 100 Hz to 600 Hz.

35. The display apparatus of claim 31, wherein the vibration apparatus is connected to a rear surface of the display member with an air gap therebetween.

36. The display apparatus of claim 31, wherein the display member further comprises:

a touch panel coupled to the display panel.

37. The display apparatus of claim 31, wherein the display member further comprises:

a front member configured to cover the display panel; and a touch panel between the front member and the display panel.

38. A vehicular apparatus, comprising:

a dashboard;

an instrument panel module at the dashboard, the instrument panel module including a first display;

a driver seat;

a passenger seat; and an infotainment module at one or more of the dashboard, the driver seat, and the passenger seat, the infotainment module including one or more second displays, wherein one or more of the first display and the one or more second displays comprise:

a display member including a display panel having a plurality of pixels configured to display an image;

one or more vibration generating apparatuses connected to the display member and configured to vibrate the display member; and a connection member between the display member and the one or more vibration generating apparatuses, and wherein the one or more vibration generating apparatuses comprise the vibration apparatus of claim 1.

39. The vehicular apparatus of claim 38, wherein the one or more vibration generating apparatuses vibrates the display member according to a driving signal to generate an ultrasonic vibration at a surface of the display member.

40. The vehicular apparatus of claim 39, wherein the driving signal is an amplitude modulation signal of an ultrasonic signal based on a low frequency signal.

41. The vehicular apparatus of claim 38, wherein the display member further comprises:

a touch panel coupled to the display panel.

42. The vehicular apparatus of claim 38, wherein the display member further comprises:

a front member configured to cover the display panel; and a touch panel between the front member and the display panel.

* * * * *